US011721808B2

(12) United States Patent
Michot

(10) Patent No.: US 11,721,808 B2
(45) Date of Patent: Aug. 8, 2023

(54) POSITIVE ELECTRODE ACTIVE MATERIAL, POSITIVE ELECTRODE HAVING THE SAME AND LITHIUM SECONDARY BATTERY

(71) Applicant: Christophe Michot, Chateau Chinon (FR)

(72) Inventor: Christophe Michot, Chateau Chinon (FR)

(*) Notice: Subject to any disclaimer, the term of this patent is extended or adjusted under 35 U.S.C. 154(b) by 364 days.

(21) Appl. No.: 16/802,551

(22) Filed: Feb. 26, 2020

(65) Prior Publication Data
US 2020/0274161 A1  Aug. 27, 2020

Related U.S. Application Data

(60) Provisional application No. 62/810,872, filed on Feb. 26, 2019.

(51) Int. Cl.
| | |
|---|---|
| *H01M 4/587* | (2010.01) |
| *H01M 4/04* | (2006.01) |
| *H01M 10/0525* | (2010.01) |
| *H01M 4/02* | (2006.01) |

(52) U.S. Cl.
CPC ......... *H01M 4/587* (2013.01); *H01M 4/0428* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2007/0054187 A1\*  3/2007  Nuspl .................... C01B 25/45
                                                              429/218.1

\* cited by examiner

*Primary Examiner* — Wyatt P McConnell

(57) ABSTRACT

The invention relates to a process for the preparation of carbon-deposited alkali metal oxyanion and the use thereof as cathode material in lithium secondary batteries wherein the process comprises synthesis of partially reacted alkali metal oxyanion, a wet-based nanomilling step, a drying step and a subsequent carbon deposition step performed by a thermal CVD process. The invention also relates to carbon deposited alkali metal oxyanion with less than 80 ppm of sulfur impurities for the preparation of a cathode of lithium secondary batteries with exceptional high-temperature electrochemical properties.

20 Claims, 10 Drawing Sheets

POSITIVE ELECTRODE ACTIVE MATERIAL, POSITIVE ELECTRODE HAVING THE SAME AND LITHIUM SECONDARY BATTERY

CROSS-REFERENCE TO RELATED APPLICATION

This application claims the benefit of U.S. Provisional Application 62/810,872 filed Feb. 26, 2019, the contents of which are herein incorporated by reference in their entirety.

FIELD OF THE INVENTION

The present invention relates to a carbon-deposited alkali metal oxyanion, as well as to a multi-step process for preparing same, and the use thereof of said carbon-deposited alkali metal oxyanion as cathode material in lithium secondary batteries.

BACKGROUND OF THE INVENTION

Olivine-type $LiFePO_4$ has become an important cathode material for lithium ion batteries as a result of its superior capacity retention, thermal stability, nontoxicity and safety. But olivine $LiFePO_4$ suffers from significant disadvantages, such as low intrinsic and ionic conductivity. Coating with carbon can improve electrical conductivity, and poor lithium ion diffusion can be addressed by the synthesis of small particles.

In the specific case of a carbon-deposited lithium ferrous phosphate, referred to as C—$LiFePO_4$, several processes have been proposed to manufacture the material, either by pyrolysis of a carbon precursor on $LiFePO_4$ or by simultaneous reaction of lithium, iron and $PO_4$ sources and a carbon precursor. For example, EP 1 049 182 A3 and US 2002/0195591 A1 describe solid-state thermal processes allowing synthesis of C—$LiFePO_4$ including through the following reaction:

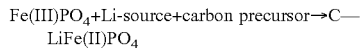

in which the carbon precursor is an organic material that forms a carbon deposit through pyrolysis while generating reducing gases that efficiently reduce the iron (III).

US 2007/0054187 A1 discloses the preparation of lithium metal phosphate $LiMPO_4$ through the reaction of a Li-source, at least one M-source (M can be Fe, Mn, Co, Ni) and at least one $PO_4$-source under hydrothermal conditions at a temperature between 100 and 250° C. and at a pressure from 1 to 40 bar. The disclosed process comprises mixing $LiMPO_4$ with a carbon precursor, drying and calcining the obtained mixture, allowing synthesis of C—$LiMPO_4$.

The implementation of such processes at an industrial scale presents challenges as they involve a number of simultaneously occurring chemical, electrochemical, gas-phase, gas-solid reactions, sintering, and carbon deposition. The electrochemical properties of an alkali metal oxyanion electrode material having a carbon deposit are thus dependent on numerous parameters such as surface properties, wettability, surface area, porosity, particle size distribution, water-content, crystal structure, carbon deposit conductivity, as well as the raw materials chemistry, reactor feed rate, flow of gas, etc. All those properties are difficult to control in a very precise fashion during the reaction, which results in the obtaining of non-stoichiometric materials, the incompleteness of the reaction and the remaining of impurities in the obtained materials.

Problems therefore remain to find a simple and optimized process for making higher quality cathode materials for battery applications.

SUMMARY OF THE INVENTION

Therefore it is the object of the present invention to provide an alternative process for manufacturing carbon-deposited alkali metal oxyanion as cathode material, which shows similar if not better electrochemical performance than materials of the prior art when the carbon-deposited alkali metal oxyanion according to the present invention is used as active electrode material in lithium secondary batteries. Furthermore, it is the object of the present invention to provide a versatile process for the preparation of carbon-deposited alkali metal oxyanion comprising only a few synthesis steps, which can be conducted easily for manufacturing various grades of high-performance and cost-effective cathode materials. Moreover, at each steps, process allows efficient control and optimization of the precursors, impurities susceptible to reactions that are detrimental to battery operation, particle morphology and quality of carbon deposit.

The object is achieved by a multi-step process for the preparation of a carbon-deposited alkali metal oxyanion. In the specific case of a carbon-deposited lithium ferrous phosphate, referred to as C—$LiFePO_4$, said process preferably comprising the steps:
 a) mixing, preferably milling, starting material compounds comprising at least one lithium source, at least one ferric phosphate source, and at least one organic carbon source, and heating the starting material to obtain a carbon-deposited lithium ferrous phosphate, preferably comprising a ferrous phosphate or pyrophosphate phase;
 b) subjecting the material obtained in step a):
   PROCESS A: to at least one water-based bead nanomilling step, preferably in presence of a reducing agent, to obtain a nanomilled suspension with a low level of iron containing impurities in water-based fluid carrier;
   PROCESS B: to at least one alcohol-based bead nanomilling step;
 c) drying the nanomilled suspension obtained in step b) to obtain a solid compound;
 d) heat treating the solid compound obtained in step c) in presence of a gas-phase organic carbon source to obtained a carbon-deposited lithium ferrous phosphate.

The invention further provides a carbon-deposited alkali metal oxyanion with a carbon deposit obtained by chemical vapor deposition process in presence of a gas-phase organic carbon source, and with a carbon deposit content according to the present invention less than 2.5 wt. %, preferably less than 2.0 wt. %, more preferably less than 1.6 wt. %, still more preferably less than 1.2 wt. %.

The invention further provides a carbon-deposited alkali metal oxyanion obtained by the process of the invention with a carbon deposit content less than 2.5 wt. %, and with a sulfur content of less than 80 ppm, preferably less than 60 ppm, more preferably less than 40 ppm, still more preferably less than 20 ppm.

The invention further provides a graphene-like carbon-deposited alkali metal oxyanion obtained by the process of the invention with 1 to 8 layers of said graphene-like carbon deposit.

The invention further provides a graphene-like carbon-deposited alkali metal oxyanion obtained by the process of the invention with 1 to 8 layers of said graphene-like carbon deposit, and with a sulfur content of less than 80 ppm, preferably less than 60 ppm, more preferably less than 40 ppm, still more preferably less than 20 ppm.

The invention further provides a carbon-deposited alkali metal oxyanion obtained by the process of the invention with a carbon deposit content less than 2.5 wt. %, and with alkali metal oxyanion primary particles having a median size to less than 500 nm, in a preferred embodiment less than 250 nm, in a more preferred embodiment less than 150 nm. In another preferred embodiment, primary particles have a median size comprised between 25 and 250 nm, preferably between 50 and 150 nm, more preferably between 70 and 130 nm.

The invention further provides a carbon-deposited alkali metal oxyanion obtained by the process of the invention with a carbon deposit content less than 2.5 wt. %, in the form of secondary agglomerates, preferably spherical, of primary particles with a median size between 50 and 250 nm, and with a BET value comprised between 3 and 13, preferably comprised between 5 and 11, more preferably between 5 and 9, still more preferably between 5 and 7 m$^2$/g. In another preferred embodiment, BET value is ≤13, preferably ≤11, more preferably ≤9, still more preferably ≤7 m$^2$/g.

The invention further provides a carbon-deposited alkali metal oxyanion obtained by the process of the invention with a carbon deposit content less than 2.5 wt. %, with a sulfur content of less than 80 ppm, preferably less than 60 ppm, more preferably less than 40 ppm, still more preferably less than 20 ppm, in the form of secondary agglomerates, preferably spherical, of primary particles with a median size between 50 and 250 nm, and with a BET value comprised between 3 and 13, preferably comprised between 5 and 11, more preferably between 5 and 9, still more preferably between 5 and 7 m$^2$/g. In another preferred embodiment, BET value is ≤13, preferably ≤11, more preferably ≤9, still more preferably ≤7 m$^2$/g.

The invention further provides a graphene-like carbon-deposited alkali metal oxyanion obtained by the process of the invention with 1 to 8 layers of said graphene-like carbon deposit, with a sulfur content of less than 80 ppm, preferably less than 60 ppm, more preferably less than 40 ppm, still more preferably less than 20 ppm, in the form of secondary agglomerates, preferably spherical, of primary particles with a median size between 50 and 250 nm, and with a BET value comprised between 3 and 13, preferably comprised between 5 and 11, more preferably between 5 and 9, still more preferably between 5 and 7 m$^2$/g. In another preferred embodiment, BET value is ≤13, preferably ≤11, more preferably ≤9, still more preferably ≤7 m$^2$/g.

The invention further provides the use of a carbon-deposited alkali metal oxyanion prepared by the process of the invention for the preparation of a cathode of a lithium secondary battery.

The invention further provides the use of a carbon-deposited alkali metal oxyanion obtained by the process of the invention with a carbon deposit content less than 2.5 wt. %, and with a sulfur content of less than 80 ppm, preferably less than 60 ppm, more preferably less than 40 ppm, still more preferably less than 20 ppm, for the preparation of a cathode of a lithium secondary battery with exceptional high-temperature electrochemical properties.

The invention further provides the use of a graphene-like carbon-deposited alkali metal oxyanion obtained by the process of the invention with 1 to 8 layers of said graphene-like carbon deposit, and with a sulfur content of less than 80 ppm, preferably less than 60 ppm, more preferably less than 40 ppm, still more preferably less than 20 ppm, for the preparation of a cathode of a lithium secondary battery with exceptional high-temperature electrochemical properties.

The invention further provides a lithium secondary battery comprising an anode, a cathode and an electrolyte, wherein the cathode comprises carbon-deposited alkali metal oxyanion manufactured by the process according to the present invention.

BRIEF DESCRIPTION OF THE FIGURES

A detailed description of examples of implementation of the present invention is provided hereafter with reference to the following figures, in which.

Process A Figures.

Process B Figures.

DESCRIPTION OF ILLUSTRATIVE EMBODIMENTS

Figure 1:
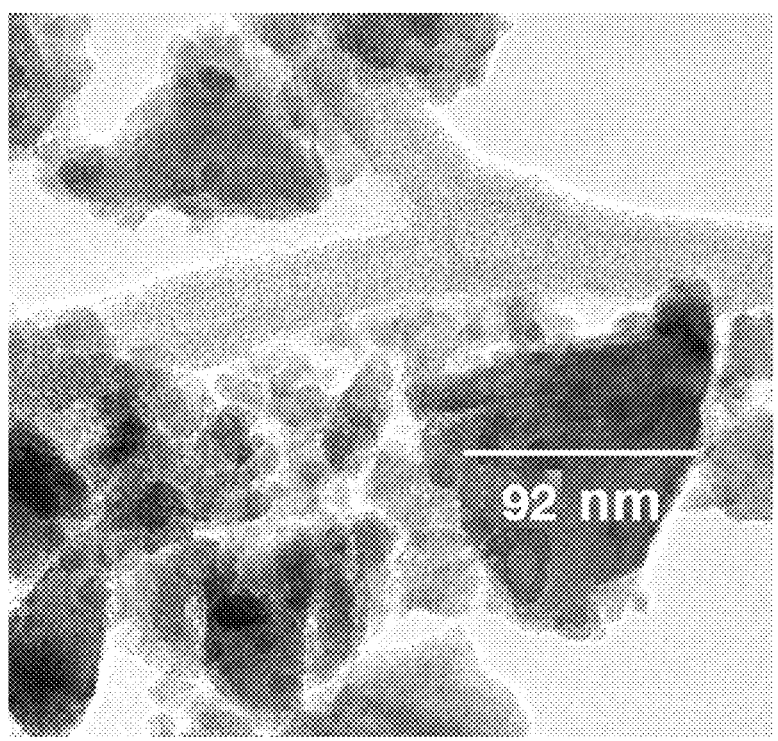
FIG. 1 represents the TEM microscopy image of primary particles after bead nanomilling in water as fluid carrier, as prepared in comparative example 1.

Despite a lower energy density than oxide cathode material, such as NMC and NCA, the need for a long-term perspective of advanced batteries with excellent safety, abuse tolerance electrochemistry, exceptionally efficiency over a wide operating temperature range, very long cycle life, low life weighted cost (price/kWh/cycle), outstanding high power/energy ratio, high-temperature performances, no use of cobalt critical raw material, implies carbon-deposited LiFePO$_4$ will remain in the future a key and cost-effective electrode material for fast growing market like drop-in replacement for lead-acid batteries, SLI batteries, mild hybrids 48 V automotive functions, electric vehicles market, large scale electricity storage, electric buses and trucks, automatic guide vehicles, forklifts, hybrid and fully electric train, or hybrid and fully electric marine battery systems (ferries, large vessels with MWh-size batteries).

For specific case of electric vehicles, intrinsic safety of battery using carbon-deposited LiFePO$_4$ allows to develop advanced generation of battery pack with less safety component, cooling and packaging material, especially with innovative cell-to-pack or blade battery technology. Moreover, the rapid growth of EV market in the last years has resulted in continuous improvement in EV energy efficiency (lower Wh/km from optimization of electric motor, power electronic, BMS, tire, heat pump heater, hardware, and software), making batteries using advanced carbon-deposited LiFePO$_4$ a viable solution for cost-effective EV with range large enough to fulfill needs of a substantial part of end users.

The inventors have discovered that to ensure those excellent performances in harshest conditions (high-temperature cycling and storage), synthesis of carbon-deposited alkali metal oxyanion, like C—LiFePO$_4$, obtained with a multistep process combining precursors sintering, water-based nanomilling and chemical vapor deposition of carbon deposit, it is surprisingly essential to control impurities and side reaction to unexpectedly low level at each step.

In one non-limiting embodiment, alkali metal oxyanion is a compound corresponding to the general nominal formula A$_a$M$_m$(XO$_4$)$_x$, wherein: A represents Li, alone or partially replaced by at most 20% as atoms of Na and/or K; M comprise at least 50% at. of Fe(II) or Mn(II) or mixture thereof; and XO$_4$ represents PO$_4$, alone or partially replaced by at most 30 mol % of at least one group chosen from SO$_4$ and SiO$_4$; a, m, and x being such that 0<a≤8, 1≤m≤3, 0<x≤3, and wherein M, X, a, m and x are selected as to maintain electroneutrality of said compound.

In another non-limiting embodiment, alkali metal oxyanion is a compound corresponding to the general nominal formula A$_a$M$_m$(XO$_4$)$_x$, wherein: A represents Li, alone or partially replaced by at most 20% as atoms of Na and/or K; M comprise at least 95% at. of Fe(II) or Mn(II) or mixture thereof; and XO$_4$ represents PO$_4$, alone or partially replaced by at most 30 mol % of at least one group chosen from SO$_4$ and SiO$_4$; a, m, and x being such that 0<a≤8, 1≤m≤3, 0<x≤3, and wherein M, X, a, m and x are selected as to maintain electroneutrality of said compound.

In another non-limiting embodiment, alkali metal oxyanion is a compound corresponding to the general nominal formula A$_a$M$_m$(XO$_4$)$_x$, wherein: A represents Li, alone or partially replaced by at most 20% as atoms of Na and/or K; M is selected from the group consisting of Fe(II), Mn(II), or mixture thereof, alone or partially replaced by at most 5% as atoms of one or more metals comprising Ni, or Co, or aliovalent or isovalent metals selected from the group consisting of Mg, Mo, Nb, Ti, Al, Ta, Ge, La, In, Y, Yb, Cu, Sm, Sn, Pb, Ag, V, Ce, Hf, Cr, Zr, Bi, Zn, Ca, Cd, Ru, Ga, Sr, Ba, B and W; and XO$_4$ represents PO$_4$, alone or partially replaced by at most 30 mol % of at least one group chosen from SO$_4$ and SiO$_4$; a, m, and x being such that 0<a≤8, 1≤m≤3, 0<x≤3, and wherein M, X, a, m and x are selected as to maintain electroneutrality of said compound.

In another non-limiting embodiment, alkali metal oxyanion is a compound which has an olivine structure corresponding to the general nominal formula LiMPO$_4$, wherein M comprises at least 95% at., preferably at least 97% at., most preferably at least 99% at. of Fe(II), or Mn(II), or mixture thereof, metal balance is optionally one or more other metals, comprising Ni, or Co, or aliovalent or isovalent metals selected from the group consisting of Mg, Mo, Nb, Ti, Al, Ta, Ge, La, In, Y, Yb, Cu, Sm, Sn, Pb, Ag, V, Ce, Hf, Cr, Zr, Bi, Zn, Ca, Cd, Ru, Ga, Sr, Ba, B and W.

In another non-limiting embodiment, alkali metal oxyanion is a compound which has an olivine structure corresponding to the general nominal formula LiMPO$_4$, wherein M comprises at least 60% at. of Mn(II) and at least 20% at. of Fe(II), alone or partially replaced by at most 5% as atoms of one or more other metals, comprising Ni, or Co, or aliovalent or isovalent metals selected from the group consisting of Mg, Mo, Nb, Ti, Al, Ta, Ge, La, In, Y, Yb, Cu, Sm, Sn, Pb, Ag, V, Ce, Hf, Cr, Zr, Bi, Zn, Ca, Cd, Ru, Ga, Sr, Ba, B and W.

In another non-limiting embodiment, alkali metal oxyanion is a compound which has an olivine structure corresponding to the general nominal formula LiMPO$_4$, wherein M comprises at least 97% at., preferably at least 98% at., most preferably at least 99% at. of Fe(II), metal balance is optionally one or more other metals, comprising Ni, or Co, or aliovalent or isovalent metals selected from the group consisting of Mg, Mo, Nb, Ti, Al, Ta, Ge, La, In, Y, Yb, Cu, Sm, Sn, Pb, Ag, V, Ce, Hf, Cr, Zr, Bi, Zn, Ca, Cd, Ru, Ga, Sr, Ba, B and W.

In another non-limiting embodiment, alkali metal oxyanion is a compound which has an olivine structure corresponding to the general nominal formula LiFePO$_4$.

By "general nominal formula" one means that the stoichiometry of the material of the invention can vary by a few percent from stoichiometry due to substitution or other defects present in the structure, including anti-sites structural defects such as, without any limitation, cation disorder between iron and lithium in LiFePO$_4$ crystal, see for example Maier et al. [Defect Chemistry of LiFePO$_4$, Journal of the Electrochemical Society, 155, 4, A339-A344, 2008] and Nazar et al. [Proof of Supervalent Doping in Olivine LiFePO$_4$., Chemistry of Materials, 2008, 20 (20), 6313-6315].

a) Sintering of Precursors Step

Olivine structure alkali metal oxyanion to be synthesized is preferably LiMPO$_4$, wherein M comprises at least 95% at., preferably at least 97% at., most preferably at least 99% at. of Fe(II), or Mn(II), or mixture thereof, metal balance (referred as "additional metal") is optionally one or more other metals.

In a non-limiting embodiment, additional metal is optionally one or more other metals comprising Ni, or Co, or aliovalent or isovalent metals selected from the group consisting of Mg, Mo, Nb, Ti, Al, Ta, Ge, La, In, Y, Yb, Cu, Sm, Sn, Pb, Ag, V, Ce, Hf, Cr, Zr, Bi, Zn, Ca, Cd, Ru, Ga, Sr, Ba, B and W.

Starting material compounds for the synthesis of LiMPO$_4$, comprising at least one lithium source, at least one iron and/or manganese metal source, optionally at least one additional metal source, at least one phosphate source, and at least one organic carbon source are subjected to at least one mixing, preferably milling step, performed as a dry or wet process. The sources can be in the form of compounds having more than one source element.

Wet milling is performed in presence of a liquid acting as fluid carrier, for example water or an organic solvent, and mixture thereof. Preferably fluid carrier is chosen among water or alcohol, and mixture thereof. In a preferred embodiment, alcohol is selected among aliphatic alcohols having 1 to 10 carbon atoms like methanol, ethanol, propanols, for example n-propanol or iso-propanol, butanols, for example n-butanol or iso-butanol, and mixture thereof.

In a non-limiting embodiment, water is preferably deionized.

In a non-limiting embodiment, wet milling is performed in alcohol.

In a non-limiting embodiment, alcohol contains less than 2 wt. % of water, preferably less than 1 wt. %, more preferably less than 0.5 wt. %.

In a non-limiting embodiment, a degasification of fluid carrier can be performed prior wet milling step by any method well known to a person of ordinary skill in the art.

During the development of the process, inventors realized that when milling is performed without fluid carrier as a dry milling, process might be less efficient in some implementation, particularly at large scale. Moreover, dry milling may in some implementation generate local overheating of the precursors with potential undesired impurities formation, contrarily to wet milling wherein fluid carrier can contribute to evacuate heat. It is why in a non-limiting mode of operation, milling is preferably performed as a wet milling.

Any known dry or wet milling technique can be employed, such as, but without being limited to, ball or bead mills, planetary ball mills, colloid mills, vibration mills, mixer mills, rotor-stator mills, shaker ball mills, disc mills, sand mills, pebble mills, jar mills, ultrasonic and ultrasonic assisted mills, submersible basket mills, basket sand mills, high-kinetic rotor ball mills, stirred bead mills, attritors, and equivalent milling equipment. Preferred dry or wet milling is ball or bead milling, more preferably high-energy ball or bead milling.

Available laboratory and industrial equipment can be used to perform the at least one dry and/or wet high-energy ball or bead milling step. Suitable high-energy milling equipment is available from Union Process (Akron, Ohio 44313), Zoz GmbH (Weeden, Germany), Netzsch-Feinmahltechnik GmbH (Selb, Germany), Retsch GmbH (Haan, Germany), Fritsch GmbH (Idar-Oberstein, Germany), Bühler AG (Uzwil, Switzerland), SPEX SamplePrep (Metuchen, N.J. 08840), Shandong Longxing Chemical Machinery Group Co, (Yantai, Shandong, China) among other possible suppliers. Specific examples of such suitable high-energy milling equipment include, but without being limited thereto, the Attritor® 1-S having 7.6 L process vessel, the Attritor® SD-30 having 200 L process vessel, and the Attritor® SD-50 having 300 L process vessel (Union process), the Simoloyer CM08 (Zoz), the MasterMill 30 submersible basket mill (Netzsch), the Centex™ T3 agitated bead mill (Bühler), the LMJ-37 basket sand mill (Shandong Longxing Chemical Machinery Group), and the SPEX 8000D Mixer/Mill (SPEX SamplePrep). The person skilled in the art will be able to select suitable equipment to perform wet and/or dry milling without departing from the spirit of the invention.

In one non-limiting implementation, duration time of the milling step of the invention is between 5 minutes to 4 hours, preferably between 10 minutes and 2 hours, more preferably between 15 minutes and 1 hour. In another non-limiting implementation, milling step is performed in less than 2 hours, preferably in less than 1 hour, more preferably in less than 30 mn, still more preferably in less than 15 mn.

After milling, and optional separation step when milling is performed as wet milling (e.g. without any limitation by filtration, centrifugation, evaporation, drying, agitating media drying, filter press, or spray drying), milled material is subjected to at least one heat treatment.

In a non-limiting mode of operation, optionally at least one compacting process step can be added, which can take place as mechanical compaction e.g. by means of a roll compactor or a tablet press, but can also take place as rolling, build-up or granulation or by means of any other technical method appearing suitable for the purpose to a person skilled in the art.

In a broad non-limiting implementation, the heating of the milled material is performed in a chemical reactor allowing controlling the atmosphere and/or the heat treatment temperature.

In one non-limiting embodiment the heating of the milled material is performed at a temperature between 300 and 800° C., in a preferred embodiment between 500 and 700° C., in a more preferred embodiment between 550 and 650° C., in a still more preferred embodiment between 575 and 625° C.

In a non-limiting implementation, performed at a laboratory scale, the process of the invention is conveniently operated in a tubular furnace or an airtight metallic container placed into a furnace, both with a gas inlet and outlet allowing control of the atmosphere in contact with the milled precursors.

In a non-limiting implementation, performed at an industrial scale, the process of the invention is preferably carried out continuously, preferably in a reactor that promotes the equilibrium of the mil led material with the gaseous phase, e.g. from among those reactors, rotary kilns, push kilns, roller hearth kilns, mesh belt kilns, belt-driven kilns, fluidized beds, that allow control of the composition and the circulation of the gaseous atmosphere. Utilization of large batch kiln, such as baking kiln, is not excluded. The person skilled in the art will be able to identify suitable alternative reactors without undue effort and without departing from the present invention.

In one non-limiting embodiment, the heating of the milled material is performed under a protective atmosphere, preferably non-oxidizing or inert, such as, but without being limited thereto, nitrogen, argon, carbon dioxide, helium, other inert gases, and one of their mixtures. A externally applied reducing atmosphere, other than the one obtained from thermal decomposition of organic carbon source, which participates in the reduction or prevents the oxidation of the oxidation state of iron and/or manganese atoms without full reduction to an elemental state, is optionally used if desired. Externally applied reducing atmosphere comprises a gas such as, but without being limited thereto, $CO$, $H_2$, $NH_3$ or HC, wherein HC refers to any hydrocarbon and its derivatives or carbonaceous product in gas or vapor form, atmosphere can also comprise an inert gas such as, but without being limited thereto, nitrogen, argon, carbon dioxide, helium, other inert gases, and one of their mixtures. In one non-limiting embodiment, the heating of the milled material is optionally performed under a humid atmosphere, such as a gas, or a mixture of gases, having particular water content. In a specific implementation, the gas or mixture of gases is selected from the group consisting of $N_2$, argon, helium, $H_2$, $NH_3$, $CO$, $CO_2$, and any mixtures thereof.

In another non-limiting implementation, duration time of the heating step of the invention is between 10 minutes to 4 hours, preferably between 20 minutes and 2 hours, more preferably between 30 minutes and 1 hour.

In a further non-limiting implementation, combined duration time of the milling and heating step of the invention is less than 180 mn, preferably less than 150 mn, more preferably less than 120 mn, still more preferably less than 90 mn.

In a broad non-limiting implementation, the duration time of the milling step, and the duration time and temperature of the heating step of the invention are chosen as a function of the nature of the precursors and other parameters, such as reasonable time-constraints. The person skilled in the art will be able to identify suitable alternative parameters without undue effort and without departing from the present invention.

Iron and/or manganese metal sources are commonly, in whole or in part, in their oxidation state Fe(III) and/or Mn(III), all iron and/or manganese are preferably reduced to their Fe(II) and/or Mn(II) oxidation state during the heat treatment to ensure quality of final cathode material. However, starting material compounds are preferably not fully converted to the olivine structure lithium metal phosphate, to conveniently fine-tuned crystallite size, and to optimize energy efficiency of the heat treatment. Moreover, partial conversion can avoid undesirable formation of impurities remaining in the material even after subsequent thermal CVD step, for example, in the case of $LiFePO_4$, higher heat treatment temperature and/or longer reaction tune under reducing condition can lead to the formation of phosphide-based ($FeP$, $Fe_2P$, or $Fe_3P$) impurities with potential deleterious impact on cathode material, especially cyclability at high temperature. Remaining phases in suitable stoichiometric ratio are converted to the desired olivine structure lithium metal phosphate during the subsequent thermal CVD step, with enhanced reaction kinetic due to prior nanomilling of the material comprising them. For example in the case of $LiFePO_4$, remaining phases can comprise ferrous phosphate $Fe_3(PO_4)_2$ in presence of $Li_3PO_4$ (1:1 molar ratio) or at lower heating temperature can comprise ferrous pyrophosphate $Fe_2P_2O_7$ in presence of $Li_2CO_3$ (1:1 molar ratio), subsequently converted into olivine structure $LiFePO_4$ during thermal CVD step.

It is why it is another object of the instant invention, a heat treatment step of milled starting material compounds with a conversion rate as olivine structure $LiMPO_4$ between 30 and 99 mol %, preferably between 40 and 90 mol %, more preferably between 50 and 80 mol %, and wherein all iron and/or manganese atoms in the heat treated material are present in their Fe(II) and/or Mn(II) oxidation state.

Organic carbon source is used to provide a reducing atmosphere, and control crystallite size by avoiding or limiting sintering of precursors, while leaving a carbon deposit in the material. During subsequent nanomilling step, carbon deposit will be abraded from the surface of the material, and will remain in the composition as a lower quality carbon residue, it is therefore preferable to limit the quantity of aforementioned carbon residue.

It is why it is another object of the instant invention, heat treated starting material compounds comprising less than 1 wt. % of carbon deposit residue, preferably less than 0.7 wt. %, more preferably less than 0.4 wt. %, still more preferably less than 0.1 wt. %. In other preferred modes of the invention, the carbon deposit residue is preferably in the range of 0.01 to 1 wt. %, more preferably 0.05 to 0.75 wt. %, still more preferably 0.1 to 0.5 wt. %.

In one non-limiting embodiment, the lithium source is a compound selected, for example, from the group consisting of lithium oxide, lithium hydroxide, lithium carbonate, the neutral phosphate $Li_3PO_4$, $LiPO_3$, the hydrogen phosphate $LiH_2PO_4$, $Li_2HPO_4$, lithium oxalate, lithium acetate, lithium polyacrylate, lithium stearate, and one of their mixtures. The person skilled in the art will be able to select any alternative suitable source compound or any from the above without departing from the spirit of the invention. Preferably, lithium source is selected among lithium hydroxide and lithium carbonate, more preferably lithium source is lithium carbonate.

In one non-limiting implementation, lithium source is in the form of particles, or in the form of agglomerates or aggregates of particles, with a $D_{90}$ preferably less than 40 µm, more preferably less than 20 µm, more preferably less than 10 µm, still more preferably less than 5 µm.

In one non-limiting embodiment, the metal source is an iron-containing and/or manganese-containing compound selected, for example, from the group consisting of $Fe_2O_3$, $Fe_3O_4$, $FeCl_2$, $FeCl_3$, FeOOH, trivalent iron nitrate, $FeCO_3$, FeO, iron acetate $(CH_3COO)_2Fe$, iron sulfate $(FeSO_4)$, iron oxalate, MnO, $MnO_2$, $Mn_2O_3$, manganese acetate, manganese oxalate, manganese carbonate, manganese sulfate, manganese nitrate, and one of their mixtures. The person skilled in the art will be able to select any alternative suitable source compound or any from the above without departing from the spirit of the invention. Preferably, iron source is selected among $Fe_2O_3$, $Fe_3O_4$, and FeOOH, more preferably iron source is $Fe_2O_3$.

In one non-limiting embodiment, the phosphorous source is a compound selected, for example, from the group consisting of phosphoric acid and its esters, hydrogen phosphate, monoammonium or diammonium phosphates, polyphosphates, and one of their mixtures. The person skilled in the art will be able to select any alternative suitable source compound or any from the above without departing from the spirit of the invention. Preferably, phosphorous source is phosphoric acid.

In another non-limiting embodiment, the metal and phosphate sources are preferably provided in the same source, and is a compound selected, for example, from the group consisting of hydrated or non-hydrated $FePO_4$, $MnPO_4$, $(Fe,Mn)PO_4$, $FeHPO_4$, $MnHPO_4$, $(Fe,Mn)HPO_4$, $Fe_3(PO_4)_2$, $Mn_3(PO_4)_2$, $(Fe,Mn)_3(PO_4)_2$, $Fe_2P_2O_7$, $Mn_2P_2O_7$, $(Fe,Mn)P_2O_7$, $NH_4FePO_4$, $NH_4MnPO_4$, $NH_4(Fe,Mn)PO_4$, and one of their mixtures. As used herein (Fe,Mn) means any composition of Fe and Mn. The person skilled in the art will be able to select any alternative suitable source compound or any from the above without departing from the spirit of the invention. The metal phosphate source is preferably selected among hydrated or non-hydrated $FePO_4$, $MnPO_4$, $(Fe,Mn)PO_4$, and one of their mixtures. When $LiMPO_4$ is $LiFePO_4$, source is preferably selected among ferric phosphate Fe(III)$PO_4$ and hydrated ferric phosphate Fe(III)$PO_4.xH_2O$, x is ≤4 and preferably x is 2. Metal phosphate source can be in amorphous, amorphized or crystalline state (comprising, without any limitation, strengite, metastrengite I, metastrengite II, or orthorhombic crystalline structures).

Iron phosphate is cost-effective precursor for synthesis of price sensitive C—$LiFePO_4$, according to market analysis battery-grade iron phosphate was expected to cost under US$2.5/kg in 2020, see [Renard F (2014) 2020 cathode materials cost competition for large scale application and promising LFP best-in-class performer in terms of price per kWh. In: Oreba 1.0, Session: O-8.01, Montreal, QC, Canada].

In one non-limiting implementation, aforementioned metal phosphate source is in the form of particles, agglomerates or aggregates of particles, or platelet-shaped morphology, with a $D_{90}$ preferably less than 40 µm, more preferably less than 20 µm, more preferably less than 10 µm, still more preferably less than 5 µm, in another non-limiting embodiment, metal phosphate source is in the form of agglomerates or aggregates of primary particles with a median primary particle size less than 500 nm, preferably less than 200 nm, more preferably less than 100 nm, still more preferably less than 50 nm.

In a further non-limiting embodiment, additional metal source is a compound selected, without any limitation, in the form of additional metal carbonate, oxalate, acetate, stearate, nitrate, phosphate, hydroxide, oxide, organo-metal, eventually halide or sulfate even if not preferred, and one of their mixtures. Introduction of additional metal as part of other sources is not excluded, for example as $(Fe,Mg)PO_4$ with 2% at. Fe replaced by Mg, the person skilled in the art will be able to select any alternative suitable combination without departing from the spirit of the invention.

With the rapid growth of numerous hydrometallurgical projects dedicated to Li-Ion batteries component recycling (e.g. Li, Co, Ni, Mn, Fe, P, and carbon), source compounds may be replaced in whole or in part by suitable stream of recycled chemicals (e.g. $Li_2CO_3$, $FePO_4$, $Fe_3(PO_4)_2$, $MnPO_4$, $Mn_3(PO_4)_2$, $PO_4$ salt, $Fe_2O_3$, and FeOOH), allowing a substantial reduction of C—$LiFePO_4$ raw material cost in a foreseeable future.

The person skilled in the art will be able to produce other alkali metal oxyanion through selection of suitable source compounds for alkali, metal and oxyanion without departing from the spirit of the invention.

In yet a further non-limiting embodiment, the organic carbon source can be chosen, without any limitation, from any liquid, semi-solid, waxy or solid organic compounds comprising carbon atoms, for example from, polycyclic aromatic entities, such as tar and pitch, polyhydric compounds, such as sugars and carbohydrates, lactose, glucose, fructose, glycerol, fatty acids, aminopolycarboxylic acid, such as ethylenediaminetetraacetic acid, glycols, oligomers, polymers, copolymers, block copolymers, cellulose, starch and their esters and ethers, and any derivatives of the aforementioned organic carbon sources, and one of their mixtures. Mention may be made, as examples of polymers or oligomers, of polymers or oligomers comprising polyolefins, polybutadienes, polyglycols, polyvinyl alcohol, polyvinylpyrrolidone, polyvinyl butyral, polyethylene glycol, polypropylene glycol, polyethylene, polypropylene, polyacrylates, condensation products of phenols (including those obtained from reaction with aldehydes), polymers or oligomers derived from furfuryl alcohol, ethylene oxide and/or propylene oxide, maleic anhydride, styrene, divinylbenzene, benzene, naphthalene, perylene, acrylonitrile, acrylate, acrylamide, vinyl, vinyl ether, ethylene, propylene, butene, butadiene, vinyl acetate, and any derivatives of the aforementioned polymers or oligomers, and mixture thereof. Replacement in whole or in part of liquid, semi-solid or solid organic carbon source with an external gas-phase carbon source is not excluded.

b) Nanomilling Step

Process A:

Material obtained in step a) (referred as "material_a") is subjected to at least one water-based bead nanomilling step, preferably in presence of at least one reducing agent, to obtain a nanomilled suspension with a low level of metallic containing impurities in water-based fluid carrier.

As used herein, "metallic containing impurities" means impurities containing iron and/or manganese resulting from a partial leaching of material_a during high-energy nanomilling step.

As used herein, "water-based bead nanomilling" means performing the bead nanomilling step in a fluid carrier comprising at least 50% by volume of water, preferably deionized water, in addition to water, further solvents that are miscible with water can also be present. Examples of these solvents are aliphatic alcohols having 1 to 10 carbon atoms like methanol, ethanol, propanols, for example n-propanol or iso-propanol, butanols, for example n-butanol or iso-butanol, and their mixture. Water is preferred fluid carrier, more preferably deionized water.

As used herein, "low level of metallic containing impurities" means a content after nanomilling of less than 100 ppm of iron and/or manganese present in water-based fluid carrier relatively to the mass of nanomilled material_a, in a preferred embodiment less than 50 ppm, in a more preferred embodiment less than 25 ppm, in a still more preferred embodiment less than 10 ppm.

Nanomilled material, resulting from particles breakage and abrasion mechanism during nanomilling process, tends to produce morphologies with fracturated surfaces and edges (more or less well defined depending on level of abrasion of particles), for example as illustrated on TEM picture in FIG. 1.

Process B:

Material obtained in step a) (referred as "material_a") is subjected to at least one liquid-based bead nanomilling step in presence of a fluid carrier. During the development of the process, inventors realized that when water is used as fluid carrier, in some implementation metallic-based impurities containing iron and/or manganese might be present in fluid carrier (in the order of 100 ppm or more), with a negative impact on electrochemical performances of carbon-deposited cathode material. Without being bound to any theory, the inventors believe that impurities formation may results from a partial leaching of material_a during high-energy water-based bead nanomilling step.

It is why nanomilling is performed with an alcohol as fluid carrier. Material obtained in step a) (referred as "material_a") is subjected to at least one alcohol-based nanomilling step."

As used herein, "alcohol-based nanomilling" means performing the nanomilling step in a fluid carrier selected among aliphatic alcohols having 1 to 10 carbon atoms like methanol, ethanol, propanols, for example n-propanol or iso-propanol, butanols, for example n-butanol or iso-butanol, and their mixture. Methanol, ethanol and isopropanol are preferred fluid carrier.

In a non-limiting embodiment, alcohol contains less than 2 wt. % of water, preferably less than 1 wt. %, more preferably less than 0.5 wt. %.

Process A and B:

As used herein, "nanomilling" means a top-down step of milling a compound in order to obtain primary particles of the compound having a median size (corresponding to $D_{50}$) to less than 500 nm, in a preferred embodiment less than 250 nm, in a more preferred embodiment less than 150 nm. In another embodiment, nanomilled primary particles have a median size comprised between 25 and 250 nm, preferably between 50 and 150 nm, more preferably between 70 and 130 nm.

In one non-limiting embodiment, particle size distribution of nanomilled material_a of the present invention is characterized by a span (defined as $(D_{90}-D_{10})/D_{50}$) less than 2.5, preferably less than 1.5, more preferably less than 1, still more preferably less than 0.75.

In one non-limiting embodiment, the nanomilling is performed under an inert atmosphere, for example, but without being limited thereto, nitrogen, argon, carbon dioxide, helium, other inert gases, and one of their mixtures. The term "inert atmosphere" usually refers to a gaseous mixture that contains little or no oxygen.

In another non-limiting embodiment, a degasification of water-based fluid carrier is performed prior nanomilling step by any method well known to a person of ordinary skill in the art, such as for example pressure reduction, deareator, membrane degasification, and substitution by inert gas.

In yet another non-limiting embodiment, the wet bead nanomilling device may be selected from stir bead mills well known to a person of ordinary skill in the art, which can reduce the particles size down to nanometer range. Particularly, mention may be made of Ultra APEX Mill by Kotobuki industries of Japan, High speed Netzsch Zeta and Neos agitator bead mill by Netzsch of Germany, Hosokawa Alpine AHM mill by Hosokawa of Japan, Horizontal Nano mill PHN series by Püehler of China, Nanometer Sand Mill ZBW/5L by Shandong Longxing Chemical Machinery Group of China, and MicroMedia® L & MicroMedia® X series bead mill by Büehler of Switzerland.

In a further non-limiting embodiment, the milling compartment and the milling unit are covered by a protective material layer and/or made of wear resistant and corrosion resistant material, to avoid contamination of the formulation, in particular to avoid metallic contamination. Preferably, the material to perform metal-free grinding are made of or comprise a polymer, for example polyurethane or polyethylene, or a ceramic like zirconia, tungsten carbide, silicon nitride or silicon carbide.

In yet a further non-limiting embodiment, the milling energy introduced into the suspension is preferably set between 200 kWh/t and 2500 kWh/t while the reference mass (t) refers to the mass of material_a in the suspension. The introduced energy generates heat so that the suspension has to be cooled by a suitable cooling device.

The grinding beads may be made of alumina, zirconia, yttrium or cerium stabilized zirconia or carbides for example. Zirconia may also comprise hafnium oxide $HfO_2$ ($ZrO_2$+$HfO_2$). In a preferred embodiment, grinding beads are made of cerium or yttrium-stabilized zirconia, optionally containing hafnium oxide $HfO_2$.

In one non-limiting embodiment, for the conduction of the water-based bead nanomilling step according to the present invention beads having a mean diameter between 50 and 800 µm are used. In a preferred embodiment, beads having a mean diameter between 100 and 400 µm are used, in a more preferred embodiment, beads having a mean diameter between 100 and 200 µm are used. Since stirred media milling is an energy-intensive process, energy efficiency should be optimized, use of finer beads allows more efficient milling process, reduced milling energy (kwh/t), shorter milling time, and in addition may reduced particle size distribution span. Reduced milling energy and/or shorter milling time are beneficial to the quality of cathode material of the present invention, allowing limiting potential deleterious side reaction concomitant to harsh high-energy milling process.

Filling ratio of grinding media in the milling chamber had a great influence on grinding results. With increasing filling ratio the number of media contacts increases and the distance between the individual grinding media decreases, leading to an improvement of the grinding results. But above a certain filling ratio of grinding media the grinding result brings negative effects because too small distance between grinding media limit the freedom of motion. Optimization of grinding beads filling allows to optimize process efficiency and also to narrow particle size distribution.

It is why it is another object of the instant invention a filling ratio of the grinding chamber with grinding beads between 50 and 90 vol. %, in a preferred embodiment between 60 and 85 vol. %, in a more preferred embodiment between 70 and 85 vol. %.

Nanomilling may be conducted, without any limitation, in one of four modes, single-pass mode, multipass mode wherein the suspension passes through the same mill multiple time, cascade mode wherein the suspension passes through two connected mills, and circulation mode wherein the suspension can be continuously pumped through the mill multiple times. Cascade mode allows the use of two mills with different grinding media sizes, a larger size in the first mill takes a coarse feed material to a size that allows the next mill to use finer media to reach the final desired particle size, in addition to optimize process operation (milling energy, milling time, and/or particle size distribution), cascade mode allows to reduce wearing of expensive finer beads. In a preferred embodiment, first mill uses beads having a mean diameter between 300 and 800 µm, and second mill beads having a mean diameter between 100 and 300 µm.

Flexibility of process allows production of various grades of the nanomilled material_a and in fine of the cathode material according to the present invention. For example, it is possible to produce suspensions stored in product tanks with different particle size distributions and/or with different chemical compositions, and mixed them prior to drying step c) to modify cathode material characteristics. In one non-limiting embodiment, a first nanomilled material_a suspension with a median particle size between 50 and 200 nm (10 to 90 wt. % of the total) is mixed with a second nanomilled material_a suspension with a median particle size between 250 and 500 nm to optimize cathode material press density. In yet a further non-limiting embodiment, at least two nanomilled material_a with different chemical compositions are mixed, for example, without limitation, a nanomilled $LiFe_{0.28}Mn_{0.70}Mg_{0.02}PO_4$ with a 64 nm median particle size (87 wt. % of the total) is mixed with a nanomilled $LiFePO_4$ cathode material with a 103 nm median particle size to optimize cathode material energy density. Any others combinations are part of the present invention, such as production of core-shell structures, including by encapsulation during subsequent drying step, for example $LiFePO_4$ coated Mn-rich $LiMPO_4$ or reverse core-shell structure.

Process A:

In a preferred embodiment, water-based bead nanomilling is performed in presence of at least one reducing agent to hinder formation of metallic containing impurities with detrimental effect on electrochemical properties of the cathode material according to the present invention, in one non-limiting embodiment the reducing agent is a compound selected from the group consisting of hydrazine or derivatives thereof, hydroxyl amine or derivatives thereof, ascorbic acid, citric acid, oxalic acid, formic acid, thiols, dithionites, thiosulfates, phosphites, hypophosphites, phosphorous acid, alcohols, pyrrole, polyphenols, hydroquinone, compounds comprising easily oxidisable double bonds, and mixture thereof. In a preferred embodiment, reducing agent is selected among hydrazine, hydroquinone, formic acid, and ascorbic acid. In a more preferred embodiment, reducing agent is ascorbic acid.

In one non-limiting embodiment, the amount of reducing agent used during nanomilling to hinder formation of metallic containing impurities is less than 10000 ppm relatively to the mass of nanomilled material_a, in a preferred embodiment less than 5000 ppm, in a more preferred embodiment less than 2500 ppm, in a still more preferred embodiment less than 1000 ppm. In a further non-limiting embodiment, reducing agent can be added prior to nanomilling or continuously during nanomilling process.

Process B:

Alcohol-based nanomilling can optionally be performed in presence of at least one reducing agent to avoid eventual partial oxidation of material_a during nanomilling process, in one non-limiting embodiment the optional reducing agent is a compound selected from the group consisting of hydrazine or derivatives thereof, hydroxyl amine or derivatives thereof, ascorbic acid, citric acid, oxalic acid, formic acid, thiols, dithionites, thiosulfates, phosphites, hypophosphites, phosphorous acid, alcohols, pyrrole, polyphenols, hydroquinone, compounds comprising easily oxidisable double bonds, and mixture thereof. In a preferred embodiment, reducing agent is selected among hydrazine, hydroquinone, formic acid, and ascorbic acid. In a preferred embodiment, reducing agent is ascorbic acid.

In one non-limiting embodiment, the amount of optional reducing agent used during nanomilling is less than 10000 ppm relatively to the mass of nanomilled material_a, in a preferred embodiment less than 5000 ppm, in a preferred embodiment less than 2500 ppm, in a still preferred embodiment less than 1000 ppm. Reducing agent can be added prior to nanomilling or continuously during nanomilling process.

Process A and B:

At least one stabilizing agent is preferably added during nanomilling, lubricating the suspension to increase milling efficiency by increasing particles dispersion, and reducing agglomeration, mainly through the particles surface charge modification and the repulsive force between particles increase to counter the Van der Waals force. Consequently, through dispersion stabilization and control of nanoparticles agglomeration, milling more concentrated suspensions, increasing specific throughput, reducing effective grinding energy, and reducing the span of nanomilled particle size distribution is possible.

In yet another non-limiting embodiment, the at least one stabilizing agent is an organic compound, which can be selected from organic electrostatic or electrosteric stabilizers, surfactants, dispersant agents and encapsulant agents, many of them being available commercially. The amount of the at least one stabilizing agent is usually between 0.05 and 2 wt. % based on the weight of material_a in the suspension, preferably between 0.1 and 1 wt. %, more preferably between 0.1 and 0.5 wt. %, still more preferably between 0.1 and 0.25 wt. %

In yet a further non-limiting embodiment, the at least one stabilizing agent may be selected for example from fatty acid salts (for example oleic acid, stearic acid and their lithium salts), fatty acid esters, fatty alcohol esters, alkoxylated alcohols, alkoxylated amines, fatty alcohol sulfate or phosphate esters, imidazolium and quaternary ammonium salts, ethylene oxide/propylene oxide copolymer, and ethylene oxide/butylene oxide copolymer.

Some derivatives of fatty acid are also of particular interest. First of all, sugar-ester compounds composed of a hydrophilic sugar part, especially sucrose, sorbitol and sorbitan, a hydrophobic fatty acid part, and optionally a polyethylene oxide segment. For example, mention can be made of the Tween® surfactants produced by Croda, and especially Tween® 20 (polyoxyethylene (20) sorbitan monolaurate), Tween® 65 (polyoxyethylene (20) sorbitan tristearate), Tween® 80 (polyoxyethylene (20) sorbitan monooleate), and Tween® 85 (polyoxyethylenesorbitan trioleate).

Alkoxylated alcohols may be selected from those that are obtained from ethylene oxide and/or propylene oxide. Most common alcohol precursors are fatty alcohols and alkylphenols (for example octyl or nonylphenol), especially the alkoxy alcohols available under the trade name Igepal® from Solvay, Brij® surfactants from Croda, TERGITOL™ (TMN, NP, or 15-S series) and TRITON™ (X series, CA, HW-1000, N-57, or X-207) from Dow Chemical. Alkoxylated amines are provided by Huntsman under the trade names Jeffamine® and Surfonamine™ (EO/PO amine). Fatty alcohol sulfate or phosphate esters, including their zwiterrionic form, are available for example from Stepan Company.

Ethylene oxide/propylene oxide copolymer surfactants are available for example as Pluronic® produced by BASF or TERGITOL™ produced by Dow Chemicals (TERGITOL™ TERGITOL™ XD, XH, and XJ). Modification of the EO/PO ratio and of the molecular weight provides a large choice of cost-effective surfactant agents with tunable properties in terms of solubility, surface tension, and wettability. Polyvinyl butyrals, polyvinyl alcohols, polyvinylpyrrolidone, polyethylene glycols, polyanhydride resins obtained by alternate copolymerization of maleic anhydride with an alkylene, carboxylic, sulfonic, or phosphonic acid and their salts, tartaric acid and their salts, glycolic acid and their salts, polyacrylic acid and their salts, and ethylenediaminetetraacetic acid and their salts can also be used as surfactants, as any of their derivatives and mixture thereof. When salts are used, they are preferably lithium salts.

In one non-limiting embodiment, the at least one stabilizing agent may be selected from reactive surfactants so called "Surfmer", which are non-ionic, cationic and anionic compounds. "Reactive surfactant" means a surfactant containing a polymerizable group through anionic, cationic or radical polymerization (for instance an epoxyde, allyl, vinyl, acrylate, methacrylate, vinylether, or maleimide group), a condensable group (for example an amine, carboxylic acid, or alcohol group) or a chemically reactive group (for example an isocyanate, blocked isocyanate, carbodiimide, or epoxy group).

In another non-limiting embodiment, the at least one stabilizing agent may be selected from silicone surfactants (available for example from Evonik, Dow Corning, Wacker Chemie, or BYK-Chemie), having the ability to reduce the surface tension of polar liquids to values lower than commonly achieved with organic-based surfactants. Mention could be made as non-limitative example of BYK-345 polyether modified polymethyl siloxane (BYK-Chemie), and TEGOSTAB® silicones (Evonik).

The person skilled in the art will be able to select any alternative suitable stabilizing agent without departing from the spirit of the invention.

In a further non-limiting embodiment, as disclosed stabilizing agents may also be used in whole or in part as organic carbon source for sintering of precursors step a).

In one non-limiting embodiment, solid content of the suspension is comprised between 20 and 70 wt. %, in a preferred embodiment between 30 and 65 wt. %, in a more preferred embodiment between 40 and 60 wt. %, in a still more preferred embodiment between 45 and 55 wt. %.

Nanomilling step may in some circumstances benefit from ultrasonic assistance applied directly in the milling chamber, for example with an ultrasound horn, potentially improving efficiency of process, especially allowing higher loading of material to be milled and shorter reaction time.

In one non-limiting embodiment, the herein described nanomilling step is performed during a time period selected from the following time ranges of between about 5 minutes to about 4 hours, about 10 minutes to about 4 hours, about 30 minutes to about 4 hours, about 60 minutes to about 4 hours, about 90 minutes to about 4 hours, about 120 minutes to about 4 hours, about 150 minutes to about 4 hours, about 180 minutes to about 4 hours, about 210 minutes to about 4 hours, or about 230 minutes to about 4 hours. The person skilled in the art will be able to select any alternative suitable time period or any time period falling within any of the ranges above without departing from the spirit of the invention.

In yet another non-limiting embodiment, the nanomilling step is performed in less than 4 hours, preferably in less than 2 hours, more preferably in less than 1 hour, still more preferably less than 30 mn.

Nanomilling devices are expensive equipment, additionally wearing renders necessary regular replacement of costly fine beads to maintain high efficiency. During the development of the process of the present invention, the inventors discovered that the nanomilling step may in some circumstances benefit from a cost-effective preliminary wet or dry micron size grinding of the material_a. Such preliminary grinding limits wearing of nanomilling beads, can increase throughput, reduce nanomilling time, and can also improve nanomilled particles quality, in particular to produce narrower particle size distribution and to reduce exposure of material to harsh high-energy milling process. Moreover, as most of the energy input is dissipated into heat during nanomilling step, preliminary grinding significantly improves overall energy efficiency of the process. Use of a preliminary grinding also allows process to be less sensitive to granulometry of as-synthesized material_a, especially regarding particle size distribution after nanomilling step at equivalent operating conditions.

Process A:

In a preferred embodiment, the herein described preliminary grinding is a wet high-energy milling, preferably a stir ball milling performed in a batch, single-pass, multipass, circulation or continuous mode. Attritor can be used as cost-effective preliminary grinding equipment, specific examples include, but without being limited thereto, the Attritor® "SL" series having 34 to 2200 L process vessel, the Attritor® "Q" or "QL" series circulation attritor, and the Attritor® "C", "H" or "CLS" series continuous attritor (Union process), and equivalent equipment from alternative suppliers. Preferably, attritor part are lined or made with wear and corrosion resistant material, such as alumina, carbide, zirconium oxide, and polyurethane, to avoid contamination of the formulation, in particular to avoid metallic contamination. The grinding beads may be made of alumina, steatite, zirconium silicate, zirconia, yttrium or cerium-stabilized zirconia or carbides for example, in a preferred embodiment, grinding beads are made of cerium or yttrium-stabilized zirconia, preferably spherical beads of 2 to 20 mm diameter. As used herein, "micron size grinding" means a step of milling a compound in order to obtain a particle size distribution of the compound having a median size comprised between 1 and 5 μm, preferably between 1 and 3 μm, more preferably between 1 and 2 μm. In another non-limiting embodiment, the preliminary grinding step is performed in less than 1 hour, preferably in less than 30 mn, more preferably in less than 15 mn. Water is preferred fluid carrier, more preferably deionized water. Preliminary milling may be optionally performed in presence of at least one reducing agent and/or in presence of at least one stabilizing agent. In one non-limiting embodiment, the nanomilling is performed under an inert atmosphere, for example nitrogen, argon, carbon dioxide, and helium. In yet another non-limiting embodiment, a degasification of water-based liquid is performed prior nanomilling. In one non-limiting embodiment, the milling energy introduced into the attritor is preferably set between 30 kWh/t and 300 kWh/t while the reference mass (t) refers to the mass of material_a in the attritor, preferably between 50 and 200 kWh/t, more preferably between 50 and 150 kWh/t. The introduced energy can generate heat so that a suitable cooling device may cool the attritor.

Process B:

In a preferred embodiment, the herein described preliminary grinding is an alcohol-based high-energy milling, preferably a stir ball milling performed in a batch, single-pass, multipass, circulation or continuous mode. Attritor can be used as cost-effective preliminary grinding equipment, specific examples include, but without being limited thereto, the Attritor® "SL" series having 34 to 2200 L process vessel, the Attritor® "Q" or "QL" series circulation attritor, and the Attritor® "C", "H" or "CLS" series continuous attritor (Union process), and equivalent equipment from alternative suppliers. Preferably, attritor part are lined or made with wear and corrosion resistant material, such as alumina, carbide, zirconium oxide, and polyurethane, to avoid contamination of the formulation, in particular to avoid metallic contamination. The grinding beads may be made of alumina, steatite, zirconium silicate, zirconia, yttrium or cerium-stabilized zirconia or carbides for example. In a preferred embodiment, grinding beads are made of cerium or yttrium-stabilized zirconia, preferably spherical beads of 2 to 20 mm diameter. As used herein, "micron size grinding" means a step of milling a compound in order to obtain a particle size distribution of the compound having a $D_{50}$ size comprised between 1 and 5 μm, preferably between 1 and 3 μm, more preferably between 1 and 2 μm. In another non-limiting embodiment, the preliminary grinding step is performed in less than 1 hour, preferably in less than 30 mn, more preferably in less than 15 mn. Preliminary milling may be optionally performed in presence of at least one reducing agent and/or in presence of at least one stabilizing agent. In one non-limiting embodiment, the nanomilling is performed under an inert atmosphere, for example nitrogen, argon, carbon dioxide, and helium. In yet another non-limiting embodiment, a degasification of alcohol-based liquid is performed prior nanomilling. In one non-limiting embodiment, the milling energy introduced into the attritor is preferably set between 30 kWh/t and 300 kWh/t while the reference mass (t) refers to the mass of material_a in the attritor, preferably between 50 and 200 kWh/t, more preferably between 50 and 150 kWh/t. The introduced energy can generate heat so that a suitable cooling device may cool the attritor.

Process A and B:

In yet another non-limiting embodiment, the preliminary micron size grinding is performed with an attritor operating in circulation mode combined with a holding tank. After completion of the preliminary grinding, holding tank is then connected instead to nanomilling device.

In one non-limiting embodiment, it is also possible to add functional additives in the nanomilling formulation to improve quality of the cathode material according to the present invention, specific examples include, but without being limited thereto, electronically conductive additives, ionicaliy conductive additives, and surface treatment agents. Additives can be added in the formulation before, during or after nanomilling, preferably, without any limitation, before or during nanomilling process.

Electronically conductive additives can be selected, without any limitation, among carbon particles, carbon fibers and nanofibers, carbon nanotubes, fullerenes, graphene, graphene oxide, and mixture thereof. Carbon-based electronically conductive additives may be difficult to disperse within nanomilled formulation and often tend to stick on nanomilling equipment surfaces and parts. Use of carbon-based electronically conductive additives in the form of stable inks, optionally with the addition of suitable surfactants, can lead to more efficient dispersions.

Process A:

In a preferred embodiment, electronically conductive additives are in the form of self-dispersible pigments (for example carbon particles, nanotubes, or vapor grown carbon fibers) with stabilizing groups attached to their surfaces, preferably ionic species such as carboxylic (—$CO_2M$) and sulfonic (—$SO_3M$) acid salts, with M preferably selected among H, Li, Na, or K, more preferably among H or Li when available. Self-dispersible carbon particles commonly used as ink or paint pigments are a cost-effective solution. In a non-limiting implementation, as disclosed carbon particles have a mean size less than 100 nm, preferably less than 50 nm, more preferably less than 25 nm, still more preferably less than 15 nm. For example, mention can be made of the CAB-O-JET® 200 and 300 aqueous black pigments dispersions produced by Cabot Corporation, LITX® 200 and LITX® 300 produced by Cabot Corporation, Colour Black FW 200 produced by Orion Engineered Carbons GmbH, Aqua-Black® 162 aqueous dispersion produced by Tokai Carbon, TOKABLACK® #8500/F produced by Tokai Carbon, and High Color Furnace #2650 produced by Mitsubishi Chemical.

Process B:

In a preferred embodiment, electronically conductive additives are in the form of easily-dispersible pigments with stabilizing groups attached to their surfaces, preferably ionic species such as carboxylic ($-CO_2M$) and sulfonic ($-SO_3M$) acid salts, with M preferably selected among H, Li, Na, or K, more preferably among H or Li when available. Easily-dispersible carbon particles commonly used as ink or paint pigments are preferred and a cost-effective solution. In a non-limiting implementation, as disclosed carbon particles have a mean size less than 100 nm, preferably less than 50 nm, more preferably less than 25 nm, still more preferably less than 15 nm. For example, mention can be made of the LITX® 200 and LITX® 300 produced by Cabot Corporation, Colour Black FW 200 produced by Orion Engineered Carbons GmbH, TOKABLACK® #8500/F produced by Tokai Carbon, and High Color Furnace #2650 produced by Mitsubishi Chemical.

Process A and B:

In addition to potentially improve electrochemical properties of the cathode material according to the present invention, especially at high current density and during low temperature operation, such carbon particles may increase press density of the cathode material. In one non-limiting embodiment, the amount of electronically conductive additive is less than 4 wt. % relatively to the mass of nanomilled material_a, preferably less than 2 wt. %, more preferably less than 1 wt. %, still more preferably less than 0.5 wt. %.

Ionically conductive additives can be selected, without any limitation, among lithium conductive solid electrolytes such as NASICON-type, garnet-type, perovskite-type, LISICON-type, LiPON-type, sulfide-type, argyrodite-type, anti-perovskite-type. Ionically conductive additives can also be introduced as their precursors. In one non-limiting embodiment, the amount of ionically conductive additive is less than 10 wt. % relatively to the mass of nanomilled material_a, preferably less than 5 wt. %, more preferably less than 2.5 wt. %.

Surface treatment agents can be selected, without any limitation, among phosphorus-derived additives, organometallic compounds, such as metal alkoxides, including titanium, zirconium, aluminum, and organosilanes, including silicon alkoxides, and mixture thereof. Surface treatment agents may behave as passivating agents onto fresh and highly reactive surface created during nanomilling process, resulting in electrochemical properties improvement of the cathode material according to the present invention.

Specifically, Dorf Ketal offers a broad range of organometallic Tyzor® titanate and zirconate products, as a pure chemical, and as organic or water-based solution. The person skill in the art is able to identify suitable surface treatment agent without departing from the present invention.

For example, without any limitation, Dorf Tyzor® could be selected among Tyzor® 1 AM (titanium alkyl phosphate solution), Tyzor® IBAY (titanium ethylacetoacetate), Tyzor® OGT (octylene glycol titanate), Tyzor® PITA (titanium ethylacetoacetate), Tyzor® LA (aqueous titanium lactate solution), Tyzor® NBZ (n-butyl zirconate in alcohol), Tyzor® NPZ (n-propyl zirconate in alcohol), Tyzor® PC-64 (titanium phosphate glycol solution), Tyzor® TEAZ (zirconium triethanolamine complex), Tyzor® TNBT (n-butyl titanate), Tyzor® TOT (2-ethylhexyl titanate), Tyzor® JT-1 (titanium acetylacetonate polymer dispersed in water), Tyzor® TPT (iso-propyl titanate), Tyzor® TE (titanium triethanolamine solution), Tyzor® TEP (triethanolamine titanate in glycol), Tyzor® 212 (zirconate complex), Tyzor® 217 (aqueous zirconium chelate), Tyzor® 223 (zirconate complex), Tyzor® 115 (zirconate complex), Tyzor® 131 (aqueous titanium chelate), Tyzor® NPT (n-propyl titanate), Tyzor® TPT (iso-propyl titanate), Tyzor® PITA-SM (Tyzor PITA solution in silane), Tyzor® BTP (poly-n-butyl titanate), Tyzor® DEA (titanium diethanolamine solution), Tyzor® ET (ethyl titanate), Tyzor® TPT-15B (85:15 blend of Tyzor TPT and TnBT), or Tyzor® TPT-20B (80:20 blend of Tyzor TPT and TnBT).

In one non-limiting embodiment, the amount of surface treatment agent is less than 2 wt. % relatively to the mass of nanomilled material_a, preferably less than 1 wt. %, more preferably less than 0.5 wt. %, still more preferably less than 0.25 wt. %.

Process A:

In one non-limiting embodiment, high-energy nanomilling step can be performed in presence of chemical additives able to efficiently react with impurities unexpectedly present in material_a, such as, without any limitation, iron particles, iron oxides, lithium, transition metal and phosphorus containing impurities. For example, iron particles or iron oxides can be reacted in presence of $LiH_2PO_4$ to produce by mechanosynthesis a compound with suitable $Li:Fe:PO_4$ balance ratio. In one specific example, a batch of $C-LiFePO_4$ with unexpected high magnetic impurities content has been related to the presence of metallic iron impurities in a specific $FePO_4.2H_2O$ batch, thus in a preliminary experiment, nanomilling of same material_a batch in presence of stoichiometric quantities of $LiH_2PO_4$ and nanosized $Fe_2O_3$, relatively to Fe metallic impurities, allows to obtain $C-LiFePO_4$ with around 600 ppb of magnetic impurities instead of around 3000 ppm.

Process B:

In one non-limiting embodiment, high-energy nanomilling step can be performed in presence of chemical additives able to efficiently react with impurities unexpectedly present in material_a, such as iron particles, iron oxides, lithium, transition metal and phosphorus containing impurities. For example, iron particles or iron oxides can be reacted in presence of $LiH_2PO_4$ to produce by mechanosynthesis a compound with suitable $Li:Fe:PO_4$ balance ratio. In one specific example, a batch of $C-LiFePO_4$ with unexpected high magnetic impurities content has been related to the presence of $Fe_2O_3$ impurities in a specific $FePO_4.2H_2O$ batch, thus in a preliminary experiment, nanomilling of same material_a batch in presence of stoichiometric quantities of $LiH_2PO_4$ allows to obtain $C-LiFePO_4$ with around 300 ppb of magnetic impurities instead of around 4000 ppm.

c) Drying Step

After nanomilling, the fluid carrier is drawn off from the suspension to obtain nanomilled material_a as a solid compound, any process can be used per se. For example, filter press, freeze drying, evaporation, flash drying, disc drying, paddle drying, fluid bed drying, conical screw drying, agitating media drying, and spray drying can remove the solvent.

Spray drying is a widely use method of producing dry powder from a suspension by rapidly drying with a hot gas, and preferred drying device in the present invention. Suspension is first atomized to create droplets, subsequently brought in contact with hot gas in the spray dry chamber, after leaving the chamber moisture content could be further reduced during a second stage drying, for example in a fluidized bed or a vibrating bed dryer. The atomization of the suspension is carried out with a rotary atomizer, a hydraulic nozzle, a pneumatic nozzle, a combined hydraulic and pneumatic nozzle with pressure on the suspension and a gaseous spraying medium, or an ultrasonic atomizer. Nozzle can be selected for example among single fluid pressure, two-fluid, four-fluid, in-line intermixing, ink-jet, twinjet, compound and ultrasonic nozzles. Spray dryer chamber designs can be co-current, mixed flow, or counter-current atomization. Gaseous spraying medium can be air or an inert gas such as nitrogen.

Process A:

Use of non-flammable water as fluid carrier allows use of cost-effective air as gaseous spraying medium and to operate spray dryer in non-classified zone of industrial unit with a favorable economic impact, and in consequence a preferred mode of operation. Nevertheless, use of nitrogen as gaseous spraying medium may in some circumstances benefit quality of carbon-deposited cathode material of the present invention.

Process B:

Extra cost to use inert gas as spraying medium, instead of air with water-based fluid carrier, is partially compensate by the superior solvent evaporation rates with alcohol at equivalent operating conditions, typically 2-3 times more with methanol, ethanol, or isopropanol than with water. Moreover, spray drying alcohol-based suspension with an inert gas is beneficial to the purity of the dry material.

Process A and B:

A great variety of spray dryer designs are available to meet various product specifications, allowing control of particles morphology, from weakly agglomerated primary particles to secondary agglomerates of primary particles, preferably in the form of spherical secondary agglomerates of primary particles.

Prior spray drying step a dispersion treatment of nanomilled suspension obtained in step b) can be carried out. This treatment may be performed by any commercially available dispersing equipment, e.g. a rotor/stator disperser or a colloid mill, and can be useful for suspensions re-agglomerating before spray drying in order to prevent the atomizer from clogging and to decrease the viscosity of the suspension prior to atomization. Any suitable additives can be also optionally added during dispersion treatment prior spray drying, such as previously mentioned surface treatment agents, electronically conductive, and ionically conductive additives.

In some circumstances, additives able to improve agglomerates strength after drying through formation of chemical bonding, beneficial to mechanical integrity of agglomerates during their subsequent processing, can be used prior spray drying step (less than 2 wt. % relatively to the mass of nanomilled material_a, preferably less than 1 wt. %, more preferably less than 0.5 wt. %, still more preferably less than 0.25 wt. %). Additives can include, without any limitation, previously disclosed surface treatment agents, lithium metaphosphate $LiPO_3$, lithium silicate ($Li_2O.nSiO_2$, such as water-based Lithium Silicate 45 from Nippon Chemical Industrial), or colloidal silica (such as water-based SILICADOL 20 from Nippon Chemical Industrial).

In one non-limiting embodiment, the drying of the suspension is carried out at gas entry temperature in the spray drying apparatus of 120-500° C., usually between 200-370° C. The exit temperatures are usually in the range of 60-150° C., preferably 80 to 120° C. The separation of the solid product from the gas can be done with any commercially available gas-solid separation system, e.g. a cyclone, an electrostatic precipitator or a filter, preferably with a bag filter equipped with a pulsed jet dedusting system (pulse-jet bag filter).

Optionally at least one classifying process steps can be added after spray drying, e.g. screening, sifting or sieving. In particular a sieving and/or sifting step may be carried out with a nominal mesh size of 20 to 40 μm, preferably of 30 to 40 μm.

Optionally at least one compacting process step can be added after spray drying, which can take place as mechanical compaction e.g. by means of a roll compactor or a tablet press, but can also take place as rolling, build-up or granulation or by means of any other technical method appearing suitable for the purpose to a person skilled in the art.

Process A:

During the development of the process, the inventors discovered also that surprisingly even low content of water, remaining after drying of nanomilled material_a, may have a deleterious impact on electrochemical performances of cathode material according to the present invention. For example lithium ion batteries using C—$LiFePO_4$ of the present invention with similar characteristics (same raw materials and nanomilling conditions, secondary agglomerates with $D_{50}$ of ca. 8 μm, $D_{30}$ of primary particle size of ca. 160 nm, carbon content of ca. 0.9 wt. % from CVD with benzene precursor) but with respectively ca. 10000 ppm water content present after spray drying under air instead of ca. 1000 ppm, provide after 400 cycles at 60° C. a remaining capacity of 91% instead of 94%. Without being bound to any theory, the inventors believe that even low content of water can deteriorate the quality of the subsequent carbon deposit by chemical vapor deposition, maybe through formulation of metallic impurities embedded in carbon deposit and/or oxidation of carbon during deposit process. In consequence, in one non-limiting embodiment, water content in the material after drying and prior to chemical vapor deposition of carbon deposit is less than 4000 ppm, preferably less than 2000 ppm, more preferably less than 1000 ppm, still more preferably less than 500 ppm.

Process B:

During the development of the process, the inventors discovered also that in some implementation even low content of moisture, remaining after drying of nanomilled material_a, may have a deleterious impact on electrochemical performances of cathode material according to the present invention. In consequence, in one non-limiting embodiment, moisture content in the material after drying and prior to chemical vapor deposition of carbon deposit is less than 4000 ppm, preferably less than 2000 ppm, more preferably less than 1000 ppm, still more preferably less than 500 ppm.

d) Chemical Vapor Deposition of Carbon Deposit

Chemical vapor deposition (CVD) is a chemical process used to produce carbon deposit on various substrates exposed to one or more gas-phase carbon source such as gases containing carbon, or thermal decomposition products of organic matters. In the present invention, a thermal CVD process is used to produce a continuous, adherent, homogeneous highly-crystalline and low resistivity carbon deposit, preferably graphene-like carbon deposit, on nanomilled particles obtained in step c).

As used herein, "graphene-like carbon deposit" means a carbon deposit with an $I_D/I_G$ ratio less than 0.9, preferably less than 0.8, more preferably less than 0.7, still more preferably less than 0.6. $I_D/I_G$ ratio is commonly determined by ratio of peaks at 1360 $cm^{-1}$ ($I_D$, related to amorphous carbon) on peak at 1580 cm$^{-1}$ ($I_G$, related to crystalline carbon) obtained by Raman analysis.

The process for the preparation of the carbon-deposited cathode material according to the present invention is typically carried out in a reactor, preferably wherein the reactor is a continuously driven or batch rotary furnace, tumbling bed reactor, fluidized bed reactor (bed types can include, without any limitation, bubbling, circulating, vibratory, and annular fluidized beds), fixed bed reactor, or multiple hearth furnace, although it is readily apparent that other reactor types are generally possible as well as long as they are suitable to carry out the process steps as described herein (and allow the contact of the reactive media with the particles to be coated).

In another non-limiting embodiment, in order to make sure all particle surfaces are exposed to gas-phase carbon source, the powder is preferably stirred, rotated in a rotary kiln, or floated by gas-phase in a fluid bed furnace, optionally with pulsation-assisted technic to effectively fluidize the material to process. The kiln part in contact with material to process are preferably covered and/or made of materials eliminating metal contamination, like ceramic or carbon tubes in a rotary kiln. Metallic tubes coated with internal protective coating like ceramic or oxide coating (for example BASF Qtech Inc. CAMOL™ oxide coating) are not excluded. Utilization of continuous kilns, like push kilns, roller hearth kilns, mesh belt kilns, or belt-driven kilns is not excluded. The person skilled in the art will be able to identify suitable alternative reactors without undue effort and without departing from the present invention.

When the process according to the present invention is carried out in a rotary furnace, a suitable inclination of the rotary furnace during the CVD coating step is preferably range from 3 to 9°, or from 5 to 8°, or 5 to 7.5°.

As the carbon source for thermal CVD process, without any limitation, a gas like methane, ethane, propane, butane, ethylene, propene, butene, natural gas, liquefied petroleum gas (LPG), or acetylene, a vaporized liquid like an alkane compound such as pentane, hexane, or cyclohexane, an aromatic hydrocarbon compound such as benzene, toluene, xylene, styrene, diphenylmethane, or ethylbenzene, or an alcohol like methanol, ethanol, propanol, butanol, or cresol or a vaporized solid like phenol, quinone, hydroxyquinone, naphthalene, anthracene, phenanthrene, terphenyls, or biphenyl can be used, and combinations thereof. Carbon source could also be obtained by cracking of organic matters to generate complex gas stream of decomposition products, any carbon containing organic matters like, without any limitation, polypropylene, polyethylene, polystyrene, polyvinyl alcohol, polyolefins, polybutadiene, tar, starch, carbohydrates, or cellulose and their derivatives can be used. In one non-limiting embodiment, carbon source is composed only of carbon and hydrogen. Preferably carbon source is benzene, toluene, propene, ethylene, or acetylene. Optionally, addition of nitrogen (like urea, ammonia, aliphatic amine, or nitrile) or boron (like borane, or boric acid) derivatives allows synthesis of nitrogen or boron-doped carbon deposit. Optionally, carbon deposit process may be plasma-enhanced or laser-activated CVD.

During the development of the process of the present invention, the inventors discovered also that when using carbon source obtained by cracking of organic matters, a catalytic reforming of gas stream increasing the concentration of aromatic compounds is beneficial to the carbon deposit properties, especially reduction of $I_D/I_G$ ratio and conductivity increase. Upgrading of gas stream can be performed, for example, without any limitation, with zeolite catalysts (like Y-zeolite or zeolite ZSM-5 catalysts) at a temperature between 300 and 900° C., preferably between 400 and 700° C. It is why it is another object of the instant invention a thermal CVD carbon source obtained by cracking of organic matters, subjected to a further reforming step with at least one catalyst to upgrade concentration of aromatic compounds. Use of a catalytic reforming step for others carbon sources to upgrade content of aromatic compounds is not excluded. For example, without any limitation, mention could be made of hydrocarbons to aromatics process, like $C_2$-$C_3$ hydrocarbons to aromatics (UOP Cyclar™ process), $C_6$-$C_8$ hydrocarbons to aromatics (Chevron Phillips Chemical Aromax® process), or alcohols to aromatics process (like methanol-to-aromatics). As disclosed catalytic reforming step of carbon source, to perform carbon coating by a CVD thermal process, can be of interest for any anode or cathode material including alkali metal oxyanion (e.g. natural or synthetic graphite, silicon-based anode, and $Li_4Ti_5O_{12}$).

The carbon deposit thermal CVD process could be operated during a one-step or a multiple-step thermal process, for example in one non-limiting embodiment, CVD could be done in a first rotary kiln whereas a thermal treatment could be done in a second continuous kiln (for example under an inert atmosphere), or a first CVD could be done in a first rotary kiln whereas a second CVD could be done in a second continuous kiln, with the same or a different carbon source. The total reaction time is usually between 10 minutes to 4 hours, preferably between 10 minutes and 2 hours, more preferably between 10 minutes to 1 hour, still more preferably between 20 to 40 minutes.

In one non-limiting embodiment, in a single step or in at least one step of a multi-step process the reaction temperature is preferably between 600 and 750° C., in a preferred embodiment between 625 and 725° C., in a more preferred embodiment between 625 and 700° C., in a still more preferred embodiment between 625 and 675° C.

In one non-limiting embodiment, a first thermal CVD step is performed at a temperature between 200 and 600° C., preferably between 300 and 500° C., more preferably between 300 and 400° C. There could be several benefits to perform a first low-temperature step, for example to limit sintering of nanomilled particles, and also to limit formation of impurities with deleterious effect on electrochemical properties. During the development of the process of the present invention, the inventors discovered also that when using compound with low dehydrogenation time (less than 1 mn at 400° C.) as carbon source, like benzene, a first low-temperature thermal CVD is beneficial to obtained a well-organized graphene-like carbon deposit with a lower defect density. A second thermal treatment is then preferably performed at a temperature between 600 and 750° C., in a preferred embodiment between 625 and 725° C., in a more preferred embodiment between 625 and 700° C., in a still more preferred embodiment between 625 and 675° C.

In one non-limiting embodiment, the process of the invention optionally includes a subsequent flash thermal treatment on the end product in order to improve the graphitization of carbon deposit while avoiding partial decomposition of the material. The flash thermal treatment can be operated at a temperature between 750° C. and 950° C., preferably between 800 and 900° C. The flash thermal treatment is preferably operated during a period of time between 10 seconds and ten minutes, preferably between 1 minute and 5 minutes.

The thickness and carbon content of the carbon deposit can be controlled by the exposure time of the nanomilled particles to the gas-phase carbon source, and/or by adjusting the flow of gas-phase carbon source in the kiln, and/or by adjusting the concentration of the organic atmosphere carbon source. To control the concentration of the carbon source in the gas stream, organic species can be mixed with an inert carrier gas like nitrogen, argon, $CO_2$. or helium, or with reducing gas like CO, or $H_2$, and mixture thereof.

Suitable gas-phase carbon source flow rates for the thermal CVD step are generally dependent on the particular circumstances (reactor type, load, residence time, and type of starting material), and can be determined by those of skill in the art using the information contained herein. In some embodiments, good results were obtained with a flow rate of around 0.1 to 5 L/min, of around 0.1 to 3 L/min, or of around 0.1 to 2 L/min, optionally in combination with an inert carrier gas with a flow rate of around 0.5 to 10 L/min, of around 0.5 to 8 L/min, of around 1 to 5 L/min, or 1 to 3 L/min although the exact flow rate depends on the reactor type, material to be treated and other process parameters. In other embodiments, a pre-prepared mixture of gas-phase carbon source with nitrogen or argon carrier gas can be used for the thermal CVD step. For example, in a fluidized bed reactor the coating is achieved with higher flow rates, for example with a flow rate of around 1 to 50 L/min, 10 to 25 L/min, or 20 to 25 L/min. In some embodiments, the ratio of gas-phase carbon source to the inert carrier gas in the mixture is about 1:20 to 1:1, preferably about 1:20 to 1:5.

The thermal CVD step is generally carried out at a slight overpressure. Thus, in certain embodiments, the thermal CVD step is carried out at a pressure of 0 to 80 mbar, 0 to 60 mbar, 0 to 50 mbar, 10 to 60 mbar, 10 to 50 mbar, or 0 to 40 mbar above atmospheric pressure.

Raman analysis spectrum of lithium metal phosphate shows multiple peaks, for example peaks at 900 to 1200 $cm^{-1}$ for $LiFePO_4$ (referred as $I_V$). Quality of carbon deposit could be monitored by the ratio $I_V/(I_G+I_D)$, as when the surface is totally covered with carbon deposit, there is no appearance of a peak at 900 to 1200 $cm^{-1}$.

It is why it is another object of the instant invention a carbon-deposited cathode material with a carbon deposit obtained by chemical vapor deposition process in presence of a gas-phase organic carbon source, with $I_V/(I_G+I_D)$ dimensionless ratio in the range of 0 to 0.05, more preferably 0 to 0.03, more preferably 0 to 0.01.

In one non-limiting embodiment, carbon deposit obtained by thermal CVD process of the present invention is composed of at least 99.95 wt. % of carbon, preferably at least 99.97 wt. %, still more preferably at least 99.99 wt. %, still more preferably at least 99.995 wt. %.

In one non-limiting embodiment, the carbon deposit content from thermal CVD process of the carbon-deposited cathode material according to the present invention is less than 2.5 wt. % based on its total weight, preferably less than 2.0 wt. %, more preferably less than 1.6 wt. %, still more preferably less than 1.2 wt. %. In other preferred modes of the invention, the carbon deposit content from thermal CVD process of the carbon-deposited cathode material according to the invention is preferably in the range of 0.2 to 1.2 wt. %, more preferably 0.5 to 1 wt. %, still more preferably 0.6 to 0.95 wt. %.

In another non-limiting embodiment, the carbon deposit thickness is between about 0.3 nm and 3.7 nm, preferably between about 0.8 and 2.2 nm.

In another non-limiting embodiment, the carbon deposit is in the form of a graphene-like carbon deposit with 1 to 8 layers, preferably with 2 to 5 layers of said graphene-like carbon deposit.

In a further non-limiting embodiment, BET value of carbon-deposited cathode material of the present invention with a carbon deposit less than 2.5 wt. % in the form of secondary agglomerates, preferably spherical, of primary particles is comprised between 3 and 13, preferably comprised between 5 and 11, more preferably between 5 and 9, still more preferably between 5 and 7 $m^2/g$. In yet another preferred embodiment, BET value is ≤13, preferably ≤11, more preferably ≤9, still more preferably ≤7 $m^2/g$.

In one non-limiting implementation, BET value of carbon-deposited cathode material obtained by the process of the invention with a carbon deposit content less than 2.5 wt. %, in the form of secondary agglomerates, preferably spherical, of primary particles with a median size between 50 and 250 nm, is comprised between 3 and 13, preferably comprised between 5 and 11, more preferably between 5 and 9, still more preferably between 5 and 7 $m^2/g$. In yet another preferred embodiment, BET value is ≤13, preferably ≤11, more preferably ≤9, still more preferably ≤7 $m^2/g$.

Cathode material in the form of secondary agglomerates of primary particles has preferably a minimum porosity to allow solvated lithium ion of the secondary battery electrolyte to penetrate agglomerates and reach primary particles, especially to support high charge or discharge currents, while excessive porosity is detrimental to electrode density. It is why porosity is preferably between 5 and 40%, more preferably between 10 and 35%, still more preferably between 15 and 30%. Pore-size distribution can be obtained by mercury intrusion porosimetry, in a non-limiting embodiment, cathode material preferably exhibits an average pore diameter of 50 nm to 500 nm.

In one non-limiting embodiment, $D_{50}$ of carbon-deposited cathode material of the present invention in the form of secondary agglomerates, preferably spherical, of primary particles is comprised between 1 and 30 µm, preferably between 2 and 20 µm, more preferably between 3 and 10 µm, still more preferably between 3 and 7 µm. In yet another preferred embodiment, $D_{50}$ of secondary agglomerates, preferably spherical, of primary particles is ≤9, preferably ≤7, more preferably ≤5 µm.

In another non-limiting embodiment, particle size distribution of carbon-deposited cathode material of the present invention in the form of secondary agglomerates, preferably spherical, of primary particles is characterized by a span (defined as $(D_{90}-D_{10})/D_{50}$) less than 3, preferably less than 2.5, more preferably less than 2, still more preferably less than 1.5.

In yet a further non-limiting embodiment, particle size distribution of carbon-deposited cathode material of the present invention in the form of secondary agglomerates, preferably spherical, of primary particles is characterized by a $D_{30}/D_{70}$ ratio more than 0.45, preferably more than 0.6, even more preferably more than 0.75.

Controlling of particle size distribution characteristics allows optimization of packing density of the cathode material of the present invention, leading to higher press density.

As already discussed, carbon deposit, preferably graphene-like carbon deposit, present low resistivity, in consequence powder resistivity of carbon-deposited cathode material obtained by the process according to the invention is about less than 20, preferably less than 10, more preferably less than 7, still more preferably less than 4 Ω·cm. The lower limit of the powder resistivity is more than 0.05, preferably more than 0.5, more preferably more than 1 Ω·cm. Low powder resistivity of material of the present invention is favorable to their use in batteries with outstanding high power/energy ratio.

Low powder resistivity can also allows optimization of conductive agent amount commonly added in battery cathode composition, for example, such as reducing quantity or even suppressing it in some circumstances, or changing properties such as use of lower BET conductive agent, beneficial to battery energy density.

The press density of the material is more or less correlated with the electrode density or the density of the so-called active material and in the end is also correlated with the battery capacity. The higher the press density, the higher is also the capacity of the battery. In one non limiting embodiment of the present invention, carbon-deposited cathode material obtained by the process according to the invention has a powder press density of more than 2, preferably more than 2.2, more preferably more than 2.4 g/cm$^3$.

In one non-limiting embodiment, powder press density of carbon-deposited cathode material of the present invention in the form of spherical secondary agglomerates of primary particles is comprised between 2.4 and 3, preferably comprised between 2.5 and 2.9, more preferably between 2.6 and 2.8 g/cm$^3$.

In one non-limiting embodiment, carbon-deposited cathode material in the form of spherical secondary agglomerates of primary particles has preferably a spherical shape with an aspect ratio (L/D) of 0.7 to 1.5, preferably of 0.8 to 1.3, more preferably 0.9 to 1.1, still more preferably 0.95 to 1.05. Press density of the cathode material decreases with higher aspect ratio, especially when the aspect ratio is more than 1.5.

The carbon-deposited cathode material according to the present invention display also excellent bulk and tap densities improving the processing of these materials in the manufacturing process of electrodes since the machines used for fabricating electrodes can be filled with material to be processed to a much larger degree, enabling a much higher throughput. The bulk density is in the range of 1-1.4 g/cm$^3$. The tap density is in the range of 1.4-2 g/cm$^3$.

During the development of the process of the present invention, the inventors discovered also that surprisingly even very low content of sulfur impurities have a deleterious impact on electrochemical performances of carbon-deposited cathode material with a carbon deposit obtained from thermal CVD process, especially graphene-like carbon deposit, at high temperature (60° C. cycling and 85° C. storage), in consequence to produce those carbon-deposited cathode material with excellent performances at high temperature, sulfur content in the material is less than 80 ppm, preferably less than 60 ppm, more preferably less than 40 ppm, still more preferably less than 20 ppm.

Without being bound to any theory, the inventors believe that surprisingly even traces of sulfur in carbon deposit obtained from thermal CVD process, especially graphene-like carbon deposit, can induce electrocatalytic reaction of carbon-deposited cathode material surface with battery electrolyte, kinetically enhanced at high temperature, with a detrimental effect on electrochemical properties. Traces of sulfur can also induce an increase of BET value potentially due to more disordered carbon deposit.

It is why it is another object of the instant invention a low sulfur content carbon-deposited cathode material with a carbon deposit content, obtained by chemical vapor deposition process in presence of a gas-phase organic carbon source, less than 2.5 wt. %, and with a sulfur content of less than 80 ppm, preferably less than 60 ppm, more preferably less than 40 ppm, still more preferably less than 20 ppm.

It is why it is another object of the instant invention, a low sulfur content carbon-deposited cathode material, wherein carbon deposit is in the form of 1 to 8 layers graphene-like carbon deposit, and wherein sulfur content is less than 80 ppm, preferably less than 60 ppm, more preferably less than 40 ppm, still more preferably less than 20 ppm.

It is why it is another object of the instant invention a carbon-deposited cathode material, preferably graphene-like carbon-deposited, with a carbon deposit content less than 1.2 wt. % and with a sulfur content on carbon deposit content dimensionless ratio (referred as "S/C") less than 0.8%, preferably less than 0.6%, more preferably less than 0.4%, still more preferably less than 0.2%.

It is why it is another object of the instant invention a carbon-deposited cathode material obtained by the process of the invention with a carbon deposit content less than 2.5 wt. %, with a sulfur content of less than 80 ppm, preferably less than 60 ppm, more preferably less than 40 ppm, still more preferably less than 20 ppm, in the form of secondary agglomerates, preferably spherical, of primary particles with a median size between 50 and 250 nm, and with a BET value comprised between 3 and 13, preferably comprised between 5 and 11, more preferably between 5 and 9, still more preferably between 5 and 7 m$^2$/g. In yet another preferred embodiment, BET value is ≤13, preferably ≤11, more preferably ≤9, still more preferably ≤7 m$^2$/g.

It is why it is another object of the instant invention a graphene-like carbon-deposited cathode material obtained by the process of the invention with 1 to 8 layers of said graphene-like carbon deposit, with a sulfur content of less than 80 ppm, preferably less than 60 ppm, more preferably less than 40 ppm, still more preferably less than 20 ppm, in the form of secondary agglomerates, preferably spherical, of primary particles with a mean size between 50 and 250 nm, and with a BET value comprised between 3 and 13, preferably comprised between 5 and 11, more preferably between 5 and 9, still more preferably between 5 and 7 m$^2$/g. In yet another preferred embodiment, BET value is ≤13, preferably ≤11, more preferably ≤9, still more preferably ≤7 m$^2$/g.

It is why it is another object of the instant invention the use of a carbon-deposited cathode material obtained by the process of the invention with a carbon deposit content less than 2.5 wt. %, and with a sulfur content of less than 80 ppm, preferably less than 60 ppm, more preferably less than 40 ppm, still more preferably less than 20 ppm, for the preparation of a cathode of a lithium secondary battery with exceptional high-temperature electrochemical properties.

It is why it is another object of the instant invention the use of a graphene-like carbon-deposited cathode material obtained by the process of the invention with 1 to 8 layers of said graphene-like carbon deposit, and with a sulfur content of less than 80 ppm, preferably less than 60 ppm, more preferably less than 40 ppm, still more preferably less than 20 ppm, for the preparation of a cathode of a lithium secondary battery with exceptional high-temperature electrochemical properties.

Optionally at least one particle classifying process steps can be added to remove either a coarse or a fine fraction of the carbon-deposited cathode material of the invention. This can be done by any commercially available equipment for particle classifying e.g. a cyclone, an air classifier, a screen, a sieve, a sifter or a combination thereof. In one embodiment of the invention fraction of carbon-deposited cathode material in the form of spherical secondary agglomerates with a particle size less than 2 μm, preferably less than 1 μm, is rejected with a classifying process. In another embodiment of the invention the carbon-deposited cathode material is sieved on a tumbler screening machine with combined ultrasonic and air brush cleaning at a nominal mesh size of 30 to 40 µm, preferably 40 µm. The fine fraction is taken as the product the coarse fraction is then rejected. Coarse and/or fine fractions of the rejected materials can be recycle as raw materials in the process.

Jet mill, commonly equipped with an integrated classifier, is a convenient tool to reduce carbon-deposited cathode material particle size distribution, but it is preferably not used when the cathode material is in the form of secondary agglomerates, preferably spherical, to avoid breaking the agglomerates.

Optionally at least one compacting process step can be added, which can take place as mechanical compaction e.g. by means of a roll compactor or a tablet press, but can also take place as rolling, build-up or granulation or by means of any other technical method appearing suitable for the purpose to a person skilled in the art.

In a preferred mode of operation, after thermal CVD step, carbon-deposited cathode material, preferably graphene-like carbon-deposited, can be obtained with a water content of less than 200 ppm, preferably less than 100 ppm, more preferably less than 50 ppm, still more preferably less than 25 ppm.

Nevertheless, it can be optionally useful to reduce moisture quantity of as-obtained material through a subsequent drying step, carried out without any limitation with a vacuum drying device, a cyclone vacuum dryer, a rotary vacuum dryer, a conical paddle dryer, a fluidized bed dryer, a vibrating bed dryer, or a conical screw dryer. The person skilled in the art will be able to identify suitable alternative drying device without undue effort and without departing from the present invention.

In a further non-limiting implementation, combined duration time of steps a) to d) is less than 8 hours, preferably less than 6 hours, more preferably less than 4 hours.

Any step after thermal CVD process such as classifying, compacting, jet-milling, drying, blending, handling or storing, is performed under a dry atmosphere, preferably inert, to maintain product quality up to packaging in suitable sealed containers, especially in plastic aluminum foil packaging bags.

Process of the invention allows synthesis of carbon-deposited cathode material substantially free of metallic or magnetic impurities, very low content of sulfur impurities and water are beneficial to achieve it. In some embodiments, one or more magnetic traps are optionally used during any step of the process to further remove potential remaining magnetic impurities.

It is why it is another object of the instant invention the use of a carbon-deposited cathode material obtained by the process of the invention with a carbon deposit content less than 2.5 wt. %, with a sulfur content of less than 80 ppm, preferably less than 60 ppm, more preferably less than 40 ppm, still more preferably less than 20 ppm, with a water content less than 100 ppm, and with a content of magnetic impurities less than 300 ppb, preferably less than 200 ppb, more preferably less than 100 ppb.

It is why it is another object of the instant invention the use of a graphene-like carbon-deposited cathode material obtained by the process of the invention with 1 to 8 layers of said graphene-like carbon deposit, with a sulfur content of less than 80 ppm, preferably less than 60 ppm, more preferably less than 40 ppm, still more preferably less than 20 ppm, with a water content less than 100 ppm, and with a content of magnetic impurities less than 300 ppb, preferably less than 200 ppb, more preferably less than 100 ppb.

Ferromagnetic impurities in the carbon-deposited cathode material according to the present invention, are correlated to their specific magnetization level, very low content of sulfur impurities and water are beneficial to achieve low specific magnetization characteristic.

It is why it is another object of the instant invention the use of a carbon-deposited cathode material obtained by the process of the invention with a carbon deposit content less than 2.5 wt. %, with a sulfur content of less than 80 ppm, preferably less than 60 ppm, more preferably less than 40 ppm, still more preferably less than 20 ppm, with a water content less than 100 ppm, and with a specific magnetization less than 0.1 emu/g, preferably less than 0.01 emu/g, more preferably less than 0.001 emu/g, still most preferably less than 0.0001 emu/g.

It is why it is another object of the instant invention the use of a graphene-like carbon-deposited cathode material obtained by the process of the invention with 1 to 8 layers of said graphene-like carbon deposit, with a sulfur content of less than 80 ppm, preferably less than 60 ppm, more preferably less than 40 ppm, still more preferably less than 20 ppm, with a water content less than 100 ppm, and with a specific magnetization less than 0.1 emu/g, preferably less than 0.01 emu/g, more preferably less than 0.001 emu/g, still most preferably less than 0.0001 emu/g.

Sulfur impurities in the carbon deposit can generate hygroscopic species, in consequence a very low sulfur content is favorable to limit water-uptake, it is why it is another object of the instant invention the use of a carbon-deposited cathode material obtained by the process of the invention with a carbon deposit content less than 2.5 wt. %, with a water content less than 100 ppm, and with a sulfur content of less than 80 ppm, preferably less than 60 ppm, more preferably less than 40 ppm, still more preferably less than 20 ppm.

Sulfur impurities in the carbon deposit can generate hygroscopic species, in consequence a very low sulfur content is favorable to limit water-uptake, it is why it is another object of the instant invention the use of a graphene-like carbon-deposited cathode material obtained by the process of the invention with 1 to 8 layers of said graphene-like carbon deposit, with a water content less than 100 ppm, and with a sulfur content of less than 80 ppm, preferably less than 60 ppm, more preferably less than 40 ppm, still more preferably less than 20 ppm.

Sulfur impurities in the carbon deposit can generate ionic species at the surface of the carbon deposit rendering material pH-sensitive as determined by zeta potential (measuring surface charge of the material), resulting in detrimental effects, such as non-optimal electrode porosity, tortuosity, density, resistivity, or cyclability. Without being bound to any theory, the inventors believe that when the particles of carbon-deposited cathode material, preferably graphene-like carbon deposit, are dispersed in an aqueous and/or organic solution, a phenomenon of inter-particles repulsion occurs, which is directly related to the surface charges of the particles in the aqueous and/or organic solution, when the particles are very close to each other. Indeed, when the particles of carbon-deposited cathode material become very close to each other, their surface charges begin to act by repulsing the neighboring particles thereby preventing a tighter packing of the particles and therefore preventing maximum compaction of the electrodes. Very low sulfur content allows carbon-deposited cathode material, preferably in the form of spherical secondary agglomerates, to be less sensitive to the environmental pH and therefore more appropriate for being processed via solvent-based coating slurries, including water-based coating slurries.

It is why it is another object of the instant invention the use of a carbon-deposited cathode material obtained by the process of the invention with a carbon deposit content less than 2.5 wt. %, preferably in the form of spherical secondary agglomerates of primary particles, with a sulfur content of less than 80 ppm, preferably less than 60 ppm, more preferably less than 40 ppm, still more preferably less than 20 ppm, and with an absolute zeta potential determined at neutral pH in water less than 20 mV, preferably less than 15 mV, more preferably less than 10 mV, still more preferably less than 5 mV.

It is why it is another object of the instant invention the use of a graphene-like carbon-deposited cathode material obtained by the process of the invention with 1 to 8 layers of said graphene-like carbon deposit, preferably in the form of spherical secondary agglomerates of primary particles, with a sulfur content of less than 80 ppm, preferably less than 60 ppm, more preferably less than 40 ppm, still more preferably less than 20 ppm, and with an absolute zeta potential determined at neutral pH in water less than 20 mV, preferably less than 15 mV, more preferably less than 10 mV, still more preferably less than 5 mV.

Lithium-containing metal composite oxide cathode materials (referred as "oxide(s) cathode"), for example layered-structure or spinel oxides, surface modification and coating have been reported to improve their performances through, for example, limiting capacity fade, resistance growth, transition metal dissolution, surface amorphization and passivation. Coating of oxides cathode with lithium metal phosphate, preferably carbon-deposited, is used to improve both their thermal stability and electrochemical performance, particular mention should be made of carbon-deposited $LiFePO_4$ as coating material.

During the development of the process of the present invention, the inventors discovered also that carbon-deposited cathode material of the present invention used as a coating for oxides cathode benefit as well of very low content of sulfur impurities, especially to maintain excellent performances at high temperature, including cycling capabilities and optimal area specific impedance (ASI) evolution.

The term "coating" should not be understand in a restrictive mode and encompass electrode of a battery comprising an intimate blend of at least one carbon-deposited cathode material of the present invention with at least one oxide cathode. Carbon-deposited cathode material coated oxide cathode could be obtained during preparation of electrode coating or during a prior blending process with suitable mixing techniques.

It is why it is another object of the instant invention a cathode of a lithium secondary battery comprising at least one oxide cathode and at least one carbon-deposited cathode material obtained by the process of the invention with a carbon deposit content less than 2.5 wt. %, and with a sulfur content of less than 80 ppm, preferably less than 60 ppm, more preferably less than 40 ppm, still more preferably less than 20 ppm, for the preparation of a cathode of a lithium secondary battery comprising oxide cathode with exceptional high-temperature electrochemical properties and improved thermal stability.

It is why it is a further object of the instant invention a cathode of a lithium secondary battery comprising at least one oxide cathode and at least one graphene-like carbon-deposited cathode material obtained by the process of the invention with 1 to 8 layers of said graphene-like carbon deposit, and with a sulfur content of less than 80 ppm, preferably less than 60 ppm, more preferably less than 40 ppm, still more preferably less than 20 ppm, for the preparation of a cathode of a lithium secondary battery comprising oxide cathode with exceptional high-temperature electrochemical properties and improved thermal stability.

In addition to low sulfur impurities content, the inventors discovered also that high conductivity of carbon deposit, preferably graphene-like, is beneficial for the preparation of a cathode of a lithium secondary battery comprising at least one oxide cathode coated with at least one carbon-deposited cathode material of the present invention. Without being bound to any theory, the inventors believe that high conductivity of carbon deposit allows a more homogeneous current flow avoiding excessive interfacial reaction resistance build-up, and optimal area specific impedance (ASI), while maintaining beneficial effect on thermal safety provide by intrinsically safe phosphate-based cathode chemistry. Oxides cathode, such as $LiCoO_2$, $LiNi_{1/3}Mn_{1/3}Co_{1/3}O_2$, or $LiNi_{0.8}Co_{0.15}Al_{0.05}$ present a conductivity in the order of $10^{-4}$ to $10^{-2}$ S/cm, and carbon deposit cathode material of the present invention a conductivity superior to $5.10^{-2}$ S/cm, preferably superior to $10^{-1}$ S/cm.

It is why it is another object of the instant invention a cathode of a lithium secondary battery comprising at least one oxide cathode (powder conductivity $\sigma\_ox$) and at least one carbon-deposited cathode material (powder conductivity $\sigma\_carbon$) obtained by the process of the invention with a powder conductivity dimensionless ratio ($\sigma\_carbon/\sigma\_ox$) in the range of 1 to $10^4$, preferably in the range of 10 to $10^4$, more preferably in the range of 10 to $10^3$.

In addition to suitable $\sigma\_carbon/\sigma\_ox$ ratio benefits, low sulfur content further improves performances of batteries using $C-LiFePO_4$/oxide cathode.

It is why it is another object of the instant invention a cathode of a lithium secondary battery comprising at least one oxide cathode (powder conductivity $\sigma\_ox$) and at least one carbon-deposited cathode material (powder conductivity $\sigma\_carbon$) obtained by the process of the invention with a powder conductivity dimensionless ratio ($\sigma\_carbon/\sigma\_ox$) in the range of 1 to $10^4$, preferably in the range of 10 to $10^4$, more preferably in the range of 10 to $10^3$, and with a sulfur content of less than 80 ppm, preferably less than 60 ppm, more preferably less than 40 ppm, still more preferably less than 20 ppm, for the preparation of a cathode of a lithium secondary battery comprising oxide cathode with exceptional high-temperature electrochemical properties and optimal area specific impedance (ASI).

In one non-limiting embodiment, carbon-deposited cathode material of the present invention is present at a weight ratio between 0.5 and 30 wt. % relatively to the mass of oxide cathode, preferably between 2 and 20 wt. %, more preferably between 4 and 10 wt. %.

Carbon-deposited cathode material can also be blended at any ratio with any others electroactive material, preferably a lithium-containing metal composite oxide cathode, the motivation for blending cathode materials is to achieve a more balanced performance compared to what is possible with any individual compound. Use of cathode material of the present invention with low sulfur impurities content and high-conductivity carbon deposit is particularly beneficial for lithium secondary batteries using such cathode materials blend, and preferred implementation.

For example, $C-LiFePO_4$ of the present invention can be blend with NMC811 (50 wt. % of the total cathode material content, secondary agglomerates with a $D_{50}$ of 5.8 μm, primary particles $D_{50}$ of 138 nm) for the development of SLI (starting-lighting-ignition) lithium secondary batteries with high-energy density, high-power, improved cycle life, low-temperature performance, and safety. C—LiFePO$_4$ of the present invention can also be blend with NMC622 (20 wt. % of the total cathode material content, secondary agglomerates with a D$_{50}$ of 4.2 µm, primary particles D$_{50}$ of 184 nm) for the development of lithium secondary batteries with high-energy density, improved charge and discharge pulse power performances at low state of charge (SOC) as measured by lower ASI value, and improved high-temperature cycling capabilities for the development of PHEV batteries. C—LiFePO$_4$ of the present invention can also be blend with quaternary NCMA Li(Ni$_{0.89}$Co$_{0.05}$Mn$_{0.05}$Al$_{0.01}$)O$_2$ (90 wt. % of the total cathode material content, secondary agglomerates with a D$_{50}$ of 8.7 µm, primary particles D$_{50}$ of 193 nm) for the development of cost-effective C—LiFePO$_4$ lithium secondary batteries with higher-energy density (achieved ca. 15-20% energy density gain on machine build 200 Ah prismatic cells), improved low-temperature performance, and high-temperature cycling capabilities for the development of cost-effective EV batteries. Also C—LiFe$_{0.3}$Mn$_{0.7}$PO$_4$ of the present invention can be blend with Li(Ni$_{0.45}$Co$_{0.1}$Mn$_{1.45}$)O$_4$ (50 wt. % of the total cathode material content, secondary agglomerates with a D$_{50}$ of 6.8 µm, primary particles D$_{50}$ of 93 nm) for the development of lithium secondary batteries with improved stability against oxides Mn-dissolution, improved energy density at higher discharge rate (more than 1 C versus pure C—LiFe$_{0.3}$Mn$_{0.7}$PO$_4$), power density, tap density, and high-temperature cycling capabilities for the development of 3 C market batteries.

Non-limiting examples of oxides cathode which can be used comprise LiCoO$_2$, Li$_x$Co$_y$M'$_{1-y}$O$_2$ (in which M' is one or more metal elements other than Co, 0.2≤x≤1.1, and 0≤y≤0.8), Li$_a$Ni$_x$M$_y$M'$_z$O$_{2+b}$ (in which 0.8≤a≤1.2, 0.2≤x≤1, 0<y≤0.8, 0≤z≤0.2, −0.2≤b≤0.2, M is selected from the group consisting of Co, Mn and combinations thereof; and M' is selected from the group consisting of Mg, Al, V, Ti, B, Zr, Sr, Ca, Cu and Zn, and combinations thereof), NMC111 (LiNi$_{1/3}$Mn$_{1/3}$Co$_{1/3}$O$_2$), NMC433, NMC532, NMC622, NMC811, NCA (LiNi$_{0.8}$Co$_{0.15}$Al$_{0.05}$), NCMA Li(Ni$_{0.89}$Co$_{0.05}$Mn$_{0.05}$Al$_{0.01}$)O$_2$, LiNi$_{0.5}$Co$_{0.5}$O$_2$, LiNi$_{0.5}$Mn$_{1.5}$O$_4$, LiMn$_2$O$_4$, LiMn$_{1.9}$Al$_{0.1}$O$_4$, LiNi$_{0.43}$Mn$_{1.57}$O$_4$, lithium- and manganese-rich layered oxides xLi$_2$MnO$_3$·(1−x)Li(Ni,Mn,Co)O$_2$ (0≤x≤0.15), lithium-deficient oxides Li$_{1-x}$(Ni,Mn,Co)O$_2$, LiNiO$_2$, stabilized LiNiO$_2$ based cathode material (for example CAM-7 platform developed by CAMX Power LLC), Li$_x$Mg$_y$NiO$_2$ (0.9<x<1.3, 0.01<y<0.1, and 0.91<x+y<1.3), GEMX™ (CAMX Power LLC) high nickel cathode material with Co-enriched grain boundaries (including gNMC™, gNCA™, and gLNO™), Li$_{1.01}$Mg$_{0.024}$Ni$_{0.88}$Co$_{0.12}$O$_{2.03}$ or Li$_{1.01}$Mg$_{0.023}$Ni$_{0.93}$Co$_{0.07}$O$_{2.03}$ with Co-enriched grain boundaries, nickel-rich layered composite oxide Li(Ni$_{1-y-z}$Co$_y$Mn$_z$)O$_2$ (1-y-z≥0.8), core-shell or core-shell with concentration gradient structure oxides cathode, for example core-shell structure with a Li$_x$Mg$_y$NiO$_2$ core (0.9<x<1.3, 0.01<y<0.1, and 0.91<x+y<1.3) and a Li$_a$Co$_b$O$_2$ shell (0.7<a<1.3, and 0.9<b<1.2), full concentration gradient (FCG) oxides cathode, for example Li(Ni$_{0.65}$Co$_{0.08}$Mn$_{0.27}$)O$_2$ with a nickel-rich Li(Ni$_{0.89}$Co$_{0.01}$Mn$_{0.1}$)O$_2$ core and nickel-deficient and Mn-rich Li(Ni$_{0.61}$Co$_{0.09}$Mn$_{0.3}$)O$_2$ shell, or FCG Li(Ni$_{0.77}$Co$_{0.12}$Mn$_{0.11}$)O$_2$. Oxides cathode can also comprised a coating such as a ceramic-based coating, for example Al$_2$O$_3$, AlF$_3$, LiAlF$_4$, ZrO$_2$, TiO$_2$, LiCoPO$_4$, LiMnPO$_4$, LiFePO$_4$, CoPO$_4$, MnPO$_4$, FePO$_4$, Co$_3$(PO$_4$)$_2$, Mn$_3$(PO$_4$)$_2$, Fe$_3$(PO$_4$)$_2$, a functionalized organic coating, for example an organosilane, an organic compound subsequently heat treated to leave a carbonaceous coating, for example polyacrylonitrile, and any mixtures thereof. Coatings can be applied for example by liquid, sol-gel, mechanical process, sputtering, evaporation, gas phase, and atomic layer deposition. When coating is applied as a solid material, it is preferably nano-sized material. The person skilled in the art will be able to identify suitable alternative oxides cathode without undue effort and without departing from the present invention.

In a further non-limiting embodiment, D$_{50}$ of oxide cathode is between 5 and 20 µm, and carbon-deposited cathode material is composed of primary particles, optionally in the form of spherical secondary agglomerates, having a median size comprised between 25 and 250 nm, preferably between 50 and 150 nm, more preferably between 70 and 130 nm. Furthermore, the specific surface area of the oxide cathode is between 0.01 and 1 m$^2$/g, preferably between 0.05 and 0.7 m$^2$/g, more preferably between 0.1 and 0.4 m$^2$/g.

It is another object of the present invention lithium secondary batteries comprising at least two electrodes and at least one electrolyte, characterized in that at least one of these electrodes, preferably the cathode, contains at least one of the carbon-deposited alkali metal oxyanion of the present invention. Use of any specific lithium secondary batteries technology and component (e.g. binder, salt, separator, electrolyte, anode, and additives) disclosed thereunder, can be used by extension with any cathode material (e.g. oxides cathode).

The lithium secondary battery non-limiting examples include lithium metal secondary batteries, lithium ion secondary batteries, lithium metal polymer secondary batteries and lithium ion polymer secondary batteries.

A method for fabricating the cathode according to the present invention is not specifically limited and can be carried out using any conventional method known in the art. In one embodiment, the cathode of the present invention is fabricated by applying, on a current collector, a cathode slurry comprising at least one carbon-deposited alkali metal oxyanion of the present invention, and then drying the applied slurry. In this case, a small amount of a conductive agent and/or a binder may be added. Cathode can also be prepared by dry mixing, blending, and/or coating of the components, including extrusion, compaction, mechanofusion, fluidized beds, lamination, spray and electrospray techniques.

In one non-limiting embodiment, the conductivity agent is a carbon-based material, such as, without any limitation, carbon particles, carbon fibers and nanofibers, vapor grown carbon fibers, carbon nanotubes, graphene, graphene oxides, any of their derivatives, including grafting of organic functionalities (such as -carboxylate, -sulfonate, or -phosphonate ionic groups) facilitating their dispersion, and mixture thereof. In another embodiment, the conductivity agent comprises at least one ionically conductive ceramic, preferably nanosized.

According to one advantageous method, the electrolyte is a polar liquid immobilized in a microporous separator and containing one or several metallic salts in solution. Preferably at least one of these metallic salts is a lithium salt. Microporous separators are commonly fabricated from polymer films (e.g. polyolefin, polyethylene (PE), polypropylene (PP), PE/PP, fluorinated-based, poly(tetrafluoroethylene) (PTFE), nitrile-based, and polyimide porous membranes), optionally coated with ceramic particles (e.g. Al$_2$O$_3$, ZrO$_2$, SiO$_2$, BaTiO$_3$, and ionically conductive ceramics), from non-woven fibers (e.g. cellulose, PET, aramid, $^i$glass, and polyolefin non-woven fabric) supporting ceramic materials (e.g. alumina, silica, zirconia, and ionically conductive ceramics).

In another embodiment, the electrolyte is a polymer, solvating or not, optionally plasticized or gelled by a polar liquid containing one or more metallic salts in solution, and optionally comprising particulate or fiber additives $Al_2O_3$, $ZrO_2$, $SiO_2$, $BaTiO_3$, ionically conductive ceramics, cellulose, micro and nanocrystalline cellulose, or polymer whiskers). Among previously mentioned polymer electrolyte, those using a solvating polymer electrolyte based on ethylene oxide monomer chemistry, i.e. polyethylene oxide and any derivative incorporating at least one other monomer (e.g. propylene oxide, butylene oxide, reticulating agents, grafted delocalized anions, and any mixture thereof) in the form of alternating copolymer, random copolymer, block copolymer (e.g. diblock, triblock), graft copolymer (and by extension terpolymer, quaterpolymer, and so on) are commonly used in lithium metal polymer (LMP) technology. All-solid-state lithium ion batteries under development use an inorganic material as solid electrolyte, many types of solid electrolytes have been investigated, including NASICON-type, garnet-type, perovskite-type, LISICON-type, UPON-type, $Li_3N$-type, sulfide-type, argyrodite-type, anti-perovskite-type and many more.

The polymer, used to bond the electrodes or as electrolytes, is advantageously a polyether, a polyolefin, a polyester, a polymer based on acrylate, styrene, ethylene oxide, propylene oxide, vinyl, or vinyl ether units, an acrylonitrile-based polymer, a polymer comprising vinylidene fluoride ($CF_2\!=\!CH_2$), hexafluoropropylene ($CF_2\!=\!CF\!-\!CF_3$), or trifluoroethylene ($CF_2\!=\!CHF$) monomer units, and any of their derivatives.

According to another advantageous method, at least one of the negative electrodes is made of metallic lithium (optionally coated with a protective ionically conductive glass deposit), a lithium alloy, especially with aluminum, antimony, zinc, tin, possibly in nanomolecular mixture with lithium oxide, or a carbon-based insertion compound, especially synthetic or natural graphite, pyrolytic carbon-coated natural graphite, or a double nitride of lithium and iron, cobalt or manganese, or a silicon-based insertion compound (including nanoporous silicon), optionally embedded in a carbon matrix, silicon/graphene composite, SiC, a lithium titanate of the formula $Li_4Ti_5O_{12}$, carbon-coated $Li_4Ti_5O_{12}$, or a titanium niobium oxide (e.g. $TiNb_2O_7$ and carbon-coated $TiNb_2O_7$), and any of their derivatives.

The lithium secondary battery electrolyte can comprise a solvent that contains, ethylene or propylene carbonate, fluoroethylene carbonate, difluoroethylene carbonate, bis(2,2,2-trifluoroethyl) carbonate, 2,2,3,4,4,4-hexafluorobutyl methyl carbonate, vinylidene carbonate, an alkyl carbonate having 1 to 4 carbon atoms, dimethyl carbonate, γ-butyrolactone, methyl propionate, ethyl acetate, methyl butyrate, ethyl difluoroacetate, ethylene sulfite, ethylene sulfate, tris (trimethylsilyl)phosphite, a tetraalkylsulfamide, an α-ω dialkyl ether of a mono-, di-, tri-, tetra- or oligo-ethylene glycol with molecular weight less than or equal to 5000, a sultone, for example propane sultone, as well as mixtures of the above-mentioned solvents.

In one-non limiting embodiment, electrolyte comprises in full or in part an ionic liquid as an onium salt (e.g. ammonium, pyrrolidinium, piperidinium, guanidinium, sulfonium, phosphonium, and imidazolium, optionally polymerized, grafted, or comprising any reactive groups like, without any limitation, allyl, vinyl, vinyl ether, epoxy, maleimide, —OH, —COOH, —NH$_2$, and alkoxysilane) of a delocalized anions bis(oxalato)borate, difluoro(oxalato)borate, $PO_2F_2$, $N(SO_2F)_2$, $N(SO_2F)(SO_2CF_3)$, and $N(SO_2CF_3)_2$), preferably as an onium salt of $N(SO_2F)_2$ anion, for example 1-ethyl-3-methylimidazolium $N(SO_2F)_2$, 1-butyl-1-methylpyrrolidinium $N(SO_2F)2$, N-propyl-N-methylpyrrolidinium $N(SO_2F)_2$, N-2-methoxyethyl-N-methylpyrrolidinium $N(SO_2F)_2$, diallyldimethylammonium $N(SO_2F)_2$, and poly(diallyldimethylammonium) $N(SO_2F)_2$.

Electrolytes usually comprise $LiPF_6$, substituted in whole or in part by salts of anions, preferably lithium salts, improving lithium secondary battery performances, especially safety, low-temperature performances, high-temperature cyclability, limiting impedance growth, improving swelling properties, enhancing anode passivation layer formation, preferably selected among lithium bis(oxalato)borate, lithium difluoro(oxalato)borate, $LiPO_2F_2$, $LiN(SO_2F)_2$, $FSO_2N(Li)SO_2N(Li)SO_2F$, $FSO_2N\!=\!S(\!-\!F)(\!=\!O)N(Li)SO_2F$, $LiN(SO_2CF_3)_2$, $LiN(SO_2F)(SO_2C_nF_{2n+1})$ with n between 1 and 4, $LiN(SO_2C_nF_{2n+1})(SO_2C_mF_{2m+1})$ with n and m independently chosen between 1 and 4, preferably 1 and 2, $C_nF_{2n+1}SO_2N(Li)SO_2N(Li)SO_2C_mF_{2m+1}$, with n and m independently chosen between 0 and 4, preferably 0 and 2, lithium salts of reactive delocalized anions and polymers comprising them (by extension including delocalized anions grafted on any surface, for example silica particle, nanocrystalline cellulose, and delocalized anions fixed on a polymer backbone), for example, without any limitation, styrene-$SO_2N(Li)SO_2C_nF_{2n+1}$ with n between 0 and 4, preferably 0 and 2 (by extension including R—$SO_2N(Li)SO_2C_nF_{2n+1}$ with R comprising any reactive groups like, without any limitation, allyl, vinyl, vinyl ether, epoxy, maleimide, —OH, —COON, —NH$_2$, and alkoxysilane), as well as mixtures of the above-mentioned lithium salt. Except for battery of lithium metal dry polymer technology not commonly using it, $LiPF_6$ is commonly substituted by 1 to 30 mol % of those salts, preferably 5 to 25 mol %, more preferably 5 to 20 mol %, still more preferably 10 to 20 mol %. Use of any aforementioned lithium salt in substitution of salt other than $LiPF_6$ or as pure compounds, and any mixtures thereof is not excluded.

Preferably $LiPF_6$ substitute is selected among $LiPO_2F_2$, $LiN(SO_2F)_2$, $LiN(SO_2F)(SO_2CF_3)$, $LiN(SO_2CF_3)_2$, and $LiN(SO_2C_2F_5)_2$, and mixture thereof, more preferably among $LiN(SO_2CF_3)_2$, $LiPO_2F_2$, and $LiN(SO_2F)_2$, and mixture thereof, still more preferably $LiN(SO_2F)_2$.

Lithium metal polymer batteries using as electrolyte a solvating polymer, especially comprising —$CH_2CH_2O$— units, can comprised as lithium salt in whole or in part, $LiN(SO_2F)_2$, $FSO_2N(Li)SO_2N(Li)SO_2F$, $FSO_2N\!=\!S(\!-\!F)(\!=\!O)N(Li)SO_2F$, $LiN(SO_2CF_3)_2$, $LiN(SO_2F)(SO_2C_nF_{2n+1})$ with n between 1 and 4, $LiN(SO_2C_nF_{2n+1})(SO_2C_mF_{2m+1})$ with n and m independently chosen between 1 and 4, preferably 1 and 2, $C_nF_{2n+1}SO_2N(Li)SO_2N(Li)SO_2C_mF_{2m+1}$, with n and m independently chosen between 0 and 4, preferably 0 and 2, lithium salts of reactive delocalized anions and polymers comprising them (by extension including delocalized anions grafted on any surface, for example silica particle, nanocrystalline cellulose, and delocalized anions fixed on a polymer backbone), for example, without any limitation, styrene-$SO_2N(Li)SO_2C_nF_{2n+1}$ with n between 0 and 4, preferably 0 and 2 (by extension including R—$SO_2N(Li)SO_2C_nF_{2n+1}$ with R comprising any reactive groups like, without any limitation, allyl, vinyl, vinyl ether, epoxy, maleimide, —OH, —COOH, —NH$_2$, and alkoxysilane), as well as mixtures of the above-mentioned lithium salt.

In a specific implementation, lithium metal polymer batteries use as electrolyte a solvating polymer, preferably comprising cross-linking functions, comprising an ionic liquid (1 to 99 wt. % respectively to solvating polymer), and containing one or more metallic salts in solution, preferably lithium salt (e.g. $LiN(SO_2F)_2$, and $LiN(SO_2CF_3)_2$).

In a specific implementation, lithium metal polymer batteries use as electrolyte a macroporous separator (e.g. PE, PP, and PE/PP polymer films) or a non-woven fibers (e.g. PET, aramid, glass, and polyolefin fibers), coated with particulate ionically conductive ceramic (e.g. NASICON-type, garnet-type, perovskite-type, LISICON-type, LiPON-type, $Li_3N$-type, sulfide-type, argyrodite-type, anti-perovskite-type), preferably nanosized, and impregnated with an ionic liquid containing one or more metallic salts in solution, preferably lithium salt (e.g. $LiN(SO_2F)_2$, and $LiN(SO_2CF_3)_2$). Ionic liquid can optionally incorporate a polymer (0.5 to 20 wt. % respectively to ionic liquid, preferably 1 to 10 wt. %), preferably solvating, and polymer optionally comprising cross-linking functions.

In a specific implementation, lithium metal polymer batteries use as electrolyte a non-porous composite, comprising particulate ionically conducting ceramic (e.g. NASICON-type, garnet-type, perovskite-type, LISICON-type, UPON-type, $Li_3N$-type, sulfide-type, argyrodite-type, anti-perovskite-type), preferably nanosized, impregnated by at least one ionic liquid to reduce ionically conductive ceramic interfacial resistance (0.5 to 50 wt. % respectively to ionically conductive ceramic, preferably 1 to 20 wt. %, more preferably 2 to 10 wt. %). Ionic liquid comprise one or more metallic salts in solution, preferably lithium salt (e.g. $LiN(SO_2F)_2$, and $LiN(SO_2CF_3)_2$). Ionic liquid can also comprised at least one polymer, solvating or not, to provide mechanical cohesion to composite electrolyte, polymer optionally comprising cross-linking functions. Ionic liquid can also comprised at least one monomer, preferably miscible in ionic liquid, subsequently polymerized, for example an acrylate-based polymer thermally polymerized after preparation of electrolyte film.

During high-temperature lithium secondary battery test comprising carbon-deposited cathode material of the present invention blend with high-voltage lithium-containing metal composite oxide, wherein metal comprised at least 95 at. % of a metal selected from the group consisting of nickel, cobalt, manganese, and mixture thereof, the inventors realized that excessive content of sulfur impurities may in some circumstances alter performances of liquid electrolytes comprising $LiPF_6$ partly substituted with delocalized anions bearing at least one $F_2PO—$ or $FSO_2—$ radical, especially $LiPO_2F_2$ or $LiN(SO_2F)_2$, with a negative impact on electrode gas generation and impedance.

It is why it is another object of the instant invention a lithium secondary battery with a liquid electrolyte comprising delocalized anions bearing at least one $F_2PO—$ or $FSO_2—$ radical, especially selected among $LiPO_2F_2$ and $LiN(SO_2F)_2$, and comprising at least one lithium-containing metal composite oxide, wherein metal comprised at least 95 at. % of a metal selected from the group consisting of nickel, cobalt, manganese, and mixture thereof, and at least one carbon-deposited cathode material obtained by the process of the invention with a carbon deposit content less than 2.5 wt. %, and with a sulfur content of less than 80 ppm, preferably less than 60 ppm, more preferably less than 40 ppm, still more preferably less than 20 ppm, for the preparation of a lithium ion secondary battery with improved high-temperature electrochemical properties.

It is why it is a further object of the instant invention a lithium secondary battery with a liquid electrolyte comprising delocalized anions bearing at least one $F_2PO—$ or $FSO_2—$ radical, especially selected among $LiPO_2F_2$ and $LiN(SO_2F)_2$, and comprising at least one lithium-containing metal composite oxide, wherein metal comprised at least 95 at. % of a metal selected from the group consisting of nickel, cobalt, manganese, and mixture thereof, and graphene-like carbon-deposited cathode material obtained by the process of the invention with 1 to 8 layers of said graphene-like carbon deposit, and with a sulfur content of less than 80 ppm, preferably less than 60 ppm, more preferably less than 40 ppm, still more preferably less than 20 ppm, for the preparation of a lithium ion secondary battery with improved high-temperature electrochemical properties.

In a specific implementation liquid electrolytes comprise $LiPF_6$ substituted by at most 30 mol % with delocalized anions bearing at least one $F_2PO—$ or $FSO_2—$ radical, especially $LiPO_2F_2$ or $LiN(SO_2F)_2$, and mixture thereof.

During high-temperature lithium secondary battery test comprising carbon-deposited cathode material of the present invention, the inventors realized that excessive content of sulfur impurities may in some circumstances alter performances of liquid electrolytes comprising $LiPF_6$ partly substituted with delocalized anions bearing at least one $F_2PO—$ or $FSO_2—$ radical, especially $LiPO_2F_2$ or $LiN(SO_2F)_2$, with a negative impact on battery performances.

It is why it is another object of the instant invention a lithium secondary battery with a liquid electrolyte comprising delocalized anions bearing at least one $F_2PO—$ or $FSO_2—$ radical, especially selected among $LiPO_2F_2$ and $LiN(SO_2F)_2$, comprising at least one carbon-deposited cathode material obtained by the process of the invention with a carbon deposit content less than 2.5 wt. %, and with a sulfur content of less than 80 ppm, preferably less than 60 ppm, more preferably less than 40 ppm, still more preferably less than 20 ppm, for the preparation of a lithium ion secondary battery with improved performances.

It is why it is another object of the instant invention a lithium secondary battery with a liquid electrolyte comprising delocalized anions bearing at least one $F_2PO—$ or $FSO_2—$ radical, especially selected among $LiPO_2F_2$ and $LiN(SO_2F)_2$, comprising at least one graphene-like carbon-deposited cathode material obtained by the process of the invention with 1 to 8 layers of said graphene-like carbon deposit, and with a sulfur content of less than 80 ppm, preferably less than 60 ppm, more preferably less than 40 ppm, still more preferably less than 20 ppm, for the preparation of a lithium ion secondary battery with improved performances.

In a specific implementation liquid electrolytes comprise $LiPF_6$ substituted by at most 30 mol % with delocalized anions bearing at least one $F_2PO—$ or $FSO_2—$ radical, especially $LiPO_2F_2$ or $LiN(SO_2F)_2$, and mixture thereof.

During high-temperature lithium metal secondary battery test comprising carbon-deposited cathode material of the present invention, optionally blend with lithium-containing metal composite oxide, the inventors realized that excessive content of sulfur impurities may in some circumstances alter performances of electrolytes comprising at least one ionic liquid as an onium salt (e.g. ammonium, pyrrolidinium, piperidinium, guanidinium, sulfonium, phosphonium, and imidazolium, optionally polymerized or grafted) of a delocalized anions comprising a $FSO_2—$ radical, preferably as an onium salt of $N(SO_2F)_2$ anion.

It is why it is another object of the instant invention a lithium secondary battery with an electrolyte comprising at least one ionic liquid as an onium salt (e.g. ammonium, pyrrolidinium, piperidinium, guanidinium, sulfonium, phosphonium, and imidazolium, optionally polymerized or grafted) of a delocalized anions comprising a $FSO_2-$ radical, preferably as an onium salt of $N(SO_2F)_2$, comprising at least one carbon-deposited cathode material obtained by the process of the invention with a carbon deposit content less than 2.5 wt. %, and with a sulfur content of less than 80 ppm, preferably less than 60 ppm, more preferably less than 40 ppm, still more preferably less than 20 ppm, for the preparation of a lithium ion secondary battery with improved performances.

It is why it is another object of the instant invention a lithium secondary battery with an electrolyte comprising at least one ionic liquid as an onium salt (e.g, ammonium, pyrrolidinium, piperidinium, guanidinium, sulfonium, phosphonium, and imidazolium, optionally polymerized or grafted) of a delocalized anions comprising a $FSO_2-$ radical, preferably as an onium salt of $N(SO_2F)_2$, comprising at least one graphene-like carbon-deposited cathode material obtained by the process of the invention with 1 to 8 layers of said graphene-like carbon deposit, and with a sulfur content of less than 80 ppm, preferably less than 60 ppm, more preferably less than 40 ppm, still more preferably less than 20 ppm, for the preparation of a lithium ion secondary battery with improved performances.

In addition, although the shape of the secondary battery fabricated according to the above method is not limited to any particular shape, it can have a cylindrical shape, a polygonal shape, a pouch shape or a win shape.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

All of the references cited supra and infra herein are hereby incorporated by reference in their entirety.

The advantageous effect of the invention herein described has also been confirmed with other carbon-deposited alkali metal oxyanion including, without any limitation, $C-LiFe_{0.65}Mn_{0.3}Mg_{0.05}PO_4$, $C-LiMn_{0.675}Fe_{0.275}Mg_{0.05}PO_4$, $C-Li_{0.9}Na_{0.1}FePO_4$, $C-LiFe_{0.95}Al_{0.05}(PO_4)_{0.95}(SiO_4)_{0.05}$, $C-LiFe_{0.9}Zr_{0.1}(PO_4)_{0.8}(SiO_4)_{0.2}$, $C-LiFe_{0.95}Mg_{0.05}PO_4$, $C-LiFe_{0.9}Ti_{0.1}(PO_4)_{0.8}(SiO_4)_{0.2}$, and $C-LiFe_{0.35}Mn_{0.35}Co_{0.3}PO_4$, while improving electrochemical performances of those materials.

Suitable methods for determining the various properties and parameters used to define the products described herein are set out in more detail below.

Measurement Methods

The determination of the BET surface is carried according to DIN ISO 9277.

The particle size distribution data by laser diffraction quoted herein are measured with a MALVERN Mastersizer S. For determining the PSD, a small sample of a carbon material is mixed with a few drops of wetting agent and a small amount of water. The sample prepared in the described manner is introduced in the storage vessel of the apparatus (MALVERN Mastersizer S) and after 5 minutes of ultrasonic treatment at intensity of 100% and the pump and stirrer speed set at 40%, a measurement is taken.

References: ISO 13320 (2009)/ISO 14887.

The carbon measurements are carried out as so-called LECO measurements with a Leco CR12 carbon analyzer from LECO Corp., St. Joseph, Mich., USA or on a C/S analyzer ELTRA CS2000 (ELTRA measurements).

Sulfur measurements are carried out with a C/S analyzer ELTRA CS2000. Sulfur is determined in wt. % relatively to the mass of carbon-deposited alkali metal oxyanion sample and subsequently converted in the sulfur content in ppm.

Water content measurements are carried out with a Computrac® Vapor Pro® XL from Arizona Instruments LLC.

The Raman analyses are performed using LabRAM-ARAMIS Micro-Raman Spectrometer from HORIBA Scientific with a 632.8 nm HeNe LASER. Ratio $I_D/I_G$ is based on the ratio of intensities of as called band D and band G. These peaks are characteristic for carbon materials, measured at 1350 $cm^{-1}$ and 1580 $cm^{-1}$ respectively.

The determination of magnetic contaminants is carried out on 150 g carbon deposited cathode material, added to a clean 1l plastic flask and 400 g isopropanol added to it. To this is added a completely clean, teflon-coated Fe—Nd—B bar magnet approx. 1.5 cm in diameter and approx. 5 cm long and with a magnetic field strength of over 5000 gauss. The flask is sealed and rolled for 30 min at 100 rpm on a roller table. After this period, the magnet is removed from the flask without coming into contact with contaminating materials, rinsed briefly with isopropanol and transferred to a sealable, new and clean 50 ml PP or PE test tube. The bar magnet is rinsed further with isopropanol in the test tube which is finally filled with isopropanol and sealed. The sealed test tube, with magnet, is then treated for 20 min in an ultrasound bath with a sound frequency of at least 50 kHz and a specific sound power between 20 W and 40 W per liter bath contents, which cleans the surface of the magnet thoroughly but gently, without damaging the teflon coating. After fresh rinsing of the magnet with isopropanol inside the test tube, the tube is treated once more for 20 min in the ultrasound bath and a final rinsing is carried out once more and the isopropanol drained off. The aim of this treatment is to remove all paramagnetic lithium transition metal phosphate particles adhering through surface forces to the magnet itself and to the magnetic particles, without removing the ferromagnetic contaminant particles adhering tightly to the magnet and without exposing the magnet to contamination by magnetic particles from the environment. The magnet is then heated to between 80 and 90° C. in the test tube for 2 hours under reflux with a mixture of 4.5 ml of a 35% hydrochloric acid and 1.5 ml of a 65% nitric acid. After cooling, the magnet is removed from the extraction solution, rinsed with demineralized water into the inside of the tube, which is finally filled with demineralized water up to the 50 ml mark. The iron content of the extraction solutions is then determined with ICP-OES using suitable dilutions and expressed in ppm or ppb back-calculated relative to the 150 g starting sample.

The determination of the press density and powder resistivity was carried out simultaneously with a Mitsubishi MCP-PD51 tablet press apparatus with a Loresta-GP MCP-T610 resistivity measurement apparatus which is installed in a glovebox under nitrogen to avoid potential disturbing effects of oxygen and humidity. The hydraulic operation of the tablet press was carried out with a manual hydraulic press Enerpac PN80-APJ (max. 10,000 psi/700 bar).

The measurements of a sample according to the invention of 4 g were carried out with the settings as recommended by the manufacturer of the above-mentioned apparatuses.

The powder resistivity is calculated according to the following equation:

$$\text{powder resistivity } [\Omega \cdot \text{cm}] = \text{resistivity } [\Omega] \times \text{thickness } [\text{cm}] \times RCF$$

The RCF value is a value depending on the apparatus and has been determined for each sample according to the recommendations of the manufacturer.

The press density is calculated according to the following formula:

$$\text{press density } (g/\text{cm}^3) = \frac{\text{mass of sample (g)}}{\pi x r^2 (\text{cm}^2) \times \text{thickness of sample (in cm)}}$$

$r$ = radius of the sample pill

HPPC (hybrid pulse power capability) test is an internationally standardized method and specified by the US Department of Energy (DOE) (FreedomCAR Battery Test Manual for Power-Assist Hybrid Electric Vehicles, DOE/ID-11069, 2003).

The invention will now be further illustrated by the following non-limiting examples.

EXAMPLES

Process A Examples

Comparative Example 1

Carbon-deposited $LiFePO_4$ (product of Pulead Technology Industry Co., grade P600A, 1.37 wt. % carbon content, $D_{90}$ of 4.9 µm) is nanomilled in deionized and deaerated water as carrier fluid with a Netschz MiniCer® stirred media mill, connected to a circulation tank, equipped with a ceramic grinding chamber to avoid metallic contamination, and filled with 400 µm yttria-stabilized zirconia beads. Water contains 0.5 wt. % Tween® 20 surfactant (polyoxyethylene (20) sorbitan monolaurate, product of Croda) relatively to P600A. After 120 mn with a grinding energy of 0.48 kWh per kg P600A (heat is removed through the walls of its milling compartment by cooling water), a sample of slurry (AC-1) transfer to a PSD analyzer demonstrate that $LiFePO_4$ particles with a median primary particle size of 187 nm are obtained, subsequent TEM analysis demonstrate that original carbon deposit is abraded from $LiFePO_4$ surface during nanomilling and remained in the material as a carbon residue. Water is evaporated under vacuum with a rotary evaporator and nanomilled $LiFePO_4$ is then subjected to drying in a vacuum oven at a temperature of 100° C. overnight. Then, the $LiFePO_4$ is deagglomerated in a laboratory rotor mill (Fritsch Pulverisette 14 equipped with "iron-free" conversion kit).

Experiment is repeated by replacing Tween® 20 surfactant with 0.6 wt. % of Ketjenlube® 522 (alternate maleic anhydride α-olefin copolymer with lipophobic poly(ethylene glycol) and lipophilic polyolefin side chains, product of Italmatch Chemicals S.p.a). $LiFePO_4$ particles with a median primary particle size of 159 nm are obtained.

A sample of slurry AC-1 is centrifuged and a chemical analysis of iron-containing species (ICP-OES analysis method) performed on supernatant water phase determined a content of 147 ppm iron content relatively to P600A.

A liquid electrolyte battery with a metallic lithium anode is assembled as disclosed in example 5, cathode composition is $LiFePO_4$/binder/Ketjenblack EC-300J 70/10/20 wt. %, it is necessary to add relatively high amount of high surface area carbon to ensure percolation of conductive network with nanomilled low conductivity $LiFePO_4$. The capacity of the cathode of the battery expressed in mg of electroactive material per $cm^2$ of the surface of the cathode is 2.73 $mg/cm^2$. Electrochemical measurement at C/25 and 25° C. shows that 124 mAh/g of reversible capacity is realized.

30 g of nanomilled $LiFePO_4$ are placed in the furnace tube of a rotary kiln (product of Zhengzhou CY Scientific Instrument Co., type CY-R1200X-100IC), the mixture is then treated as disclosed in US 2002/0195591 A1 (example 2), therefore tube is flushed with dry argon and heat up to 200° C. at 10° C./mn, keeping the temperature for 30 mn and then subjected to thermal CVD process by flushing furnace tube with a mixture of 6% propene gas in argon. After heating up to 675° C. at 10° C./mn, keeping the temperature for 1 hour, carbon-deposited $LiFePO_4$ is obtained with 2.78 wt. % carbon, as determined by LECO measurement.

A liquid electrolyte battery with a metallic lithium anode is assembled, as disclosed in example 5, cathode composition is C—$LiFePO_4$/binder/carbon 88/6/6 wt. % (capacity 4.6 $mg/cm^2$). Electrochemical measurement at C/5 and 25° C. shows that 156 mAh/g of initial specific discharge capacity is realized. A liquid electrolyte lithium ion battery with a carbon anode and same cathode is also assembled (battery 1) as disclosed in example 5.

Comparative Example 2

P600A nanomilling is repeated as in comparative example 1, by replacing 0.5 wt. % Tween® 20 surfactant with a mixture of 0.25 wt. % Tween® 20 and 0.25 wt. % ascorbic acid relatively to P600A (slurry AC-2, $LiFePO_4$ particles with a $D_{50}$ of 181 nm are obtained, 6 ppm iron content in supernatant water phase), followed by subsequent thermal CVD process with propene gas to form carbon-deposited $LiFePO_4$ (2.84 wt. % carbon).

TEM image of slurry AC-2 particles after nanomilling is provided in FIG. 1.

A liquid electrolyte battery with a metallic lithium anode is assembled, as disclosed in example 5, cathode composition is C—$LiFePO_4$/binder/carbon 88/6/6 wt. % (capacity 4.7 $mg/cm^2$). Electrochemical measurement at C/5 and 25° C. shows that 158 mAh/g of initial specific discharge capacity is realized. A liquid electrolyte lithium ion battery a carbon anode and same cathode is also assembled (battery 2) as disclosed in example 5.

Figure 2:
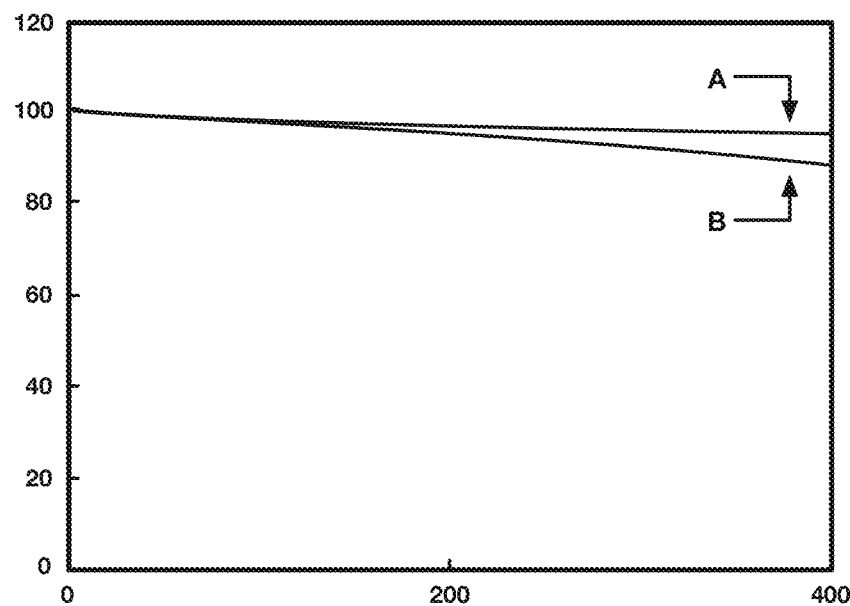
FIG. 2 represents cycling capability, determined at 60° C. and C/4 intentiostatic cycling, for two liquid electrolyte batteries with a carbon anode and C—LiFePO$_4$ as cathode material, as prepared in comparative example 1 and 2. Battery capacity (in mAh/g) is indicated on Y axis and cycle number is indicated on X axis, initial capacity is determined at C/5 and 25° C. with a lithium metal battery. Battery 1 is prepared with C—LiFePO$_4$ comprising a bead nanomilling step in water (curve B), battery 2 with C—LiFePO$_4$ comprising a bead nanomilling step in water in presence of a reductant (curve A).

Batteries 1 and 2 are then subjected to C/4 intentiostatic cycling at 60° C. between 2 and 3.6 Volt, cycling curves are represented in FIG. 2. The results demonstrate that capacity fading at 60° C. is reduced for the C—$LiFePO_4$ comprising a nanomilling synthesis step in water in presence of ascorbic acid (curve A, curve B without reductant).

Without being bound to any theory, the inventors believe that nanomilling synthesis step in water may induce the formation of iron-containing impurities, the addition of ascorbic acid reducing agent limits their formation, resulting in better electrochemical properties.

Example 1

$FePO_4 \cdot 2H_2O$ (200 g, product of Changsha Hecom Chemical Co., battery grade, $D_{90}$ of 2.92 µm) and $Li_2CO_3$ (2:1 molar ratio, product of Chengdu Chemphys Chemical Industry Co., battery grade, $D_{90}$ of 2.84 µm), Brij® 35 (3.5 wt. % relatively to $FePO_4.2H_2O$, product of Croda), and deaerated isopropanol (50 wt. % of $FePO_4.2H_2O$ content) are weighed and placed in a zirconia cylindrical container with 5 mm zirconia ball (ball-to-powder weight ratio of 2:1) and ground in a Retsch planetary ball mill PM 100 for 30 mn under an argon atmosphere at a rotation speed of 400 rpm. After grinding, the slurry is evaporated and dried under vacuum at 80° C. The mixture is then treated, as disclosed in US 2002/0195591 A1 (example 10), under a stream of dry, oxygen-free nitrogen in the furnace tube of a kiln (product of Zhengzhou CY Scientific Instrument Co., type OTF-1200X-III-SHG) with heating rate of 10° C./mn up to 600° C., keeping the temperature for 60 minutes.

Carbon-deposited material is obtained with 0.37 wt. % of carbon (as determined by LECO) and is composed as determined by XRD analysis of 76.4 wt. % of $LiFePO_4$ with remaining phases of $Li_3PO_4$ and $Fe_3(PO_4)_2$ with 1:1 molar ratio, Fe(III) is not detected by Mössbauer analysis, material is referred as material_a1. $LiFePO_4$ content can be express as dimensionless conversion rate ratio of as-obtained $LiFePO_4$ versus the theorical amount, in present case conversion rate is 76.4%.

Synthesis is repeated by performing a dry milling under nitrogen of precursors in a tungsten carbide vial with 10 mm tungsten carbide balls (ball-to-powder weight ratio of 3:1) in Retsch planetary ball mill PM 100 for 60 mn under an argon atmosphere at a rotation speed of 300 rpm. After similar heat treatment, carbon-deposited material is obtained with 0.32 wt. % of carbon (as determined by LECO), $LiFePO_4$ conversion rate is 71.2%, with remaining phases of $Li_3PO_4$ and $Fe_3(PO_4)_2$ with 1:1 molar ratio, material is referred as material_al_1.

A liquid electrolyte battery with a metallic lithium anode is assembled as disclosed in example 5, cathode composition is material_a1/binder/carbon 88/6/6 wt. % (capacity 4.4 mg/cm$^2$). Electrochemical measurement at C/5 (assuming a capacity equal to $LiFePO_4$ theorical capacity) and 25° C. shows that 63 mAh/g of initial specific discharge capacity is realized with a medium discharge voltage of 2.83 Volt. The results demonstrate that material_a1 present poor electrochemical properties.

Material_a1 is nanomilled as in comparative example 1 with 300 µm yttria-stabilized zirconia beads (Tween® 20 surfactant, 90 mn nanomilling, 0.46 kWh per kg material_a1 grinding energy, non carbon-deposited nanomilled particles with a median primary particle size of 189 nm are obtained, slurry A) and as in comparative example 2 with 300 µm yttria-stabilized zirconia beads (Tween® 20 with ascorbic acid reducing agent, 90 mn nanomilling, 0.42 kWh per kg material_a1 grinding energy, non carbon-deposited nanomilled particles with a median primary particle size of 191 nm are obtained, slurry B). In both cases, abraded carbon from $LiFePO_4$ surface remains in the composition as a carbon residue.

Samples of slurry A and B are centrifuged and a chemical analysis of iron-containing species (ICP-OES analysis method) performed on supernatant water phase determined a content of respectively 371 ppm and 7 ppm iron content relatively to material_a1.

The results demonstrate that material_a1 is more sensitive than P600A (olivine $C-LiFePO_4$) to water-based nanomilling side reaction, without being bound to any theory, the inventors believe that it is link to higher sensitivity of not fully reacted material_a1 to deleterious chemical reaction.

Slurries A and B are spray dried with compressed air via a two fluid nozzle (product of Shanghai Pilotech, spray dryer model YC-015A), during spray drying the gas inlet temperature is 200° C., the outlet temperature is 96° C. Gas phase carbon deposition is then performed on spray dried nanomilled material from slurries A and B, as in comparative example 1, but with a mixture of 3% acetylene gas in nitrogen instead of propylene/argon gas mixture, to obtained samples C-A and C-B. Carbon-deposited olivine $LiFePO_4$ (as determined by XRD) are obtained with carbon deposit content as resumed in Table 1 (as determined by LECO). Carbon deposit content is easily corrected of carbon residue content obtained during material_a1 synthesis by performing LECO measurement prior and after thermal CVD process.

TABLE 1

| Sample | C-A | C-B |
| --- | --- | --- |
| C-deposit wt. % | 1.36 | 1.13 |
| $I_D/I_G$ ratio | 0.84 | 0.76 |

Thermal CVD processes are repeated on sample B (spray dried nanomilled material_a1 in presence of ascorbic acid) with different concentration of acetylene, propylene, and vaporized benzene in nitrogen and various flow of gas mixture flushing the tube. LECO measurements demonstrate that $C-LiFePO_4$ with carbon deposit content between 0.23 and 2.47 wt. % are obtained. Thermal CVD processes are repeated on sample B (spray dried nanomilled material_a1 in presence of ascorbic acid) with different concentration of acetylene, propylene, and vaporized benzene in nitrogen and various flow of gas mixture flushing the tube. LECO measurements demonstrate that $C-LiFePO_4$ with carbon deposit content between 0.23 and 2.47 wt. % are obtained.

Carbon deposit process is also repeated on sample B (spray dried nanomilled material_a1 in presence of ascorbic acid) in a rotary batch reactor, suitable amount of propylene gas is injected in tube kiln, tube inlet/outlet gas valve closed, and thermal CVD process performed for 1 hour at 725° C. ($C-LiFePO_4$ with 1.09 wt. % carbon deposit).

Figure 3:
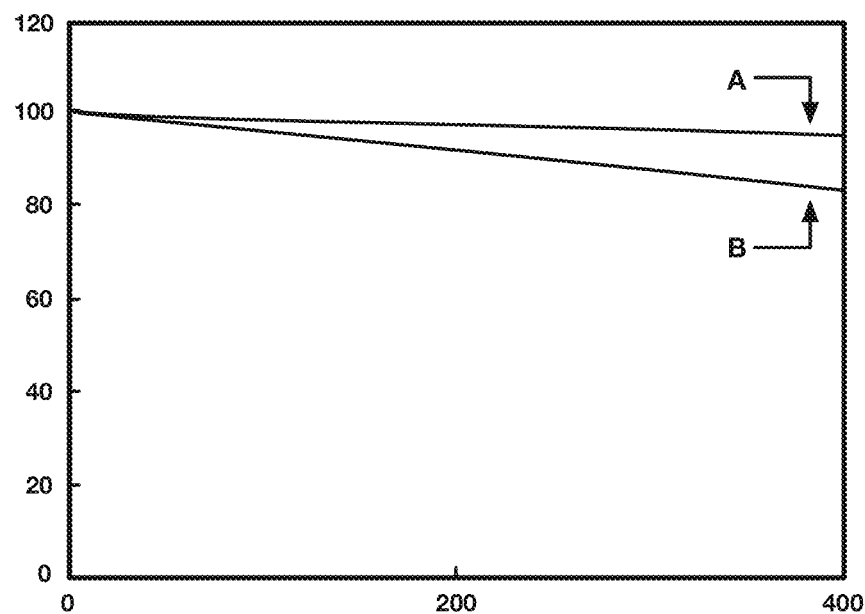
FIG. 3 represents cycling capability, determined at 60° C. and C/4 intentiostatic cycling, for two liquid electrolyte batteries with a carbon anode and C—LiFePO$_4$ as cathode material, as prepared in example 1. Battery capacity (in mAh/g) is indicated on Y axis and cycle number is indicated on X axis, initial capacity is determined at C/5 and 25° C. with a lithium metal battery. Battery 3 is prepared with C—LiFePO$_4$ comprising a bead nanomilling step in water (curve B), battery 4 with C—LiFePO$_4$ comprising a bead nanomilling step in water in presence of a reductant (curve A).

Liquid electrolyte batteries with a metallic lithium anode are assembled as disclosed in example 5, cathode compositions are $C-LiFePO_4$/binder/carbon 88/6/6 wt. %. Electrode capacity and initial specific discharge capacity (1$^{st}$ discharge) determined by electrochemical measurement at C/5 are provided in Table 2. Liquid electrolyte lithium ion battery with a carbon anode and same cathode are also assembled (battery 3 with sample C-A and battery 4 with sample C-B) as disclosed in example 5. Batteries 3 and 4 are then subjected to C/4 galvanostatic cycling at 60° C. between 2 and 3.6 Volt, cycling curves are represented in FIG. 3, The results demonstrate that capacity fading at 60° C. is reduced for the $C-LiFePO_4$ comprising a nanomilling step in water in presence of ascorbic acid (curve A, curve B without reductant)

TABLE 2

| Sample | C-A | C-B |
| --- | --- | --- |
| Battery | 3 | 4 |
| Capacity (mg/cm$^2$) | 4.9 | 4.8 |
| 1$^{st}$ discharge (mAh/g) | 163 | 162 |

Without being bound to any theory, the inventors believe that material_a1 nanomilling step in water can induce the formation of iron-containing impurities with a detrimental effect on electrochemical properties, and that the addition of ascorbic acid reducing agent can avoid formation of deleterious iron-containing impurities, resulting in better electrochemical properties.

Batches of slurry B1 equivalent to previously disclosed slurry B are spray dried with compressed air via a two fluid nozzle (product of Shanghai Pilotech, spray dryer model YC-015A) and with compressed dry nitrogen instead of air. Gas phase carbon deposition is then performed on both spray dried nanomilled material with a mixture of 20% acetylene gas in nitrogen. Liquid electrolyte lithium ion batteries with a carbon anode, and respectively air dried and argon dried cathode materials, are assembled as disclosed in example 5. Batteries are then subjected to C/4 galvanostatic cycling at 60° C. between 2 and 3.6 Volt. After 300 cycles, capacity relatively to initial specific discharge capacity is 1.6% lower for cathode material comprising air as spray drying gas versus nitrogen. The results demonstrate that use of nitrogen as gaseous spraying medium may in some circumstances benefit quality of carbon-deposited cathode material of the present invention.

Synthesis equivalent to material_a1 are repeated with suitable precursors and stoichiometries to obtained C—LiFe$_{0.97}$Mg$_{0.03}$PO$_4$ (FePO$_4$.2H$_2$O, Li$_2$CO$_3$, and MgHPO$_4$, conversion rate 77%, 0.32 wt. % carbon), C—LiFe$_{0.3}$Mn$_{0.7}$PO$_4$ (Fe$_{0.3}$Mn$_{0.7}$PO$_4$.2H$_2$O, Li$_2$CO$_3$, conversion rate 73%, 0.35 wt. % carbon), C—LiMnPO$_4$ (Mn$_3$(PO$_4$)$_2$, Li$_3$PO$_4$, conversion rate 67%, 0.28 wt. % carbon), with subsequent nanomilling and thermal CVD process. Chemical analysis and batteries test at 60° C. similarly conclude that reducing agent addition during nanomilling allows limiting formation of iron- and/or manganese-containing impurities concomitant to nanomilling process in water-based carrier fluid, resulting in better electrochemical properties.

Material_a1_1 (dry milling of precursors) is treated as material C-B (nanomilling in presence of ascorbic acid, spray drying, followed by thermal CVD process with acetylene as carbon source) to produce a material with similar characteristic, further used as a cathode material in a liquid electrolyte lithium ion battery with a carbon anode (cathode capacity 4.85 mg/cm$^2$, 1$^{st}$ discharge 163 mAh/g), Battery is subjected to C/4 galvanostatic cycling at 60° C. between 2 and 3.6 Volt. After 400 cycles, capacity relatively to initial specific discharge capacity is 5% lower for cathode material comprising a dry milling versus a wet milling of precursors.

Example 2

Material_a1 synthesis is repeated as in example 1, with various FePO$_4$.2H$_2$O batches (500 g FePO$_4$.2H$_2$O per synthesis), followed by water-based nanomilling during 90 mn with 200 μm yttria-stabilized zirconia beads, in presence of ascorbic acid, and spray drying of suspension.

For each batch, 300 g of nanomilled material is placed in the furnace tube of a rotary kiln (product of Zhengzhou CY Scientific Instrument Co., type CY-R1200X-100IC), tube is flushed with dry nitrogen and heat up to 200° C. at 10° C./mn, keeping the temperature for 60 mn and then continuously flushed with a gas mixture of vaporized benzene and argon (containing 30% by volume of benzene). After heating up to 640° C. at 20° C./mn, keeping the temperature for 1 hour, carbon-deposited LiFePO$_4$ is obtained. Sulfur and carbon content in each batch is carried out by combustion analysis in a carbon/sulfur analyzer (sold by LECO Corporation), results are provided in table 3.

Liquid electrolyte lithium ion batteries with a carbon anode are assembled (battery 5a-9a and 5b-9b) as disclosed in example 5, using C—LiFePO$_4$ samples of table 3 as cathode material, cathode composition is C—LiFePO$_4$/binder/carbon 88/6/6 wt. %. Batteries 5a-9a are subjected to high temperature storage test, allowing accelerated degradation mechanism of batteries components and to evaluate influence of key-parameters.

Initial specific discharge capacities before storage are determined by electrochemical measurement at C/5 and 25° C. as provided in table 3. Then after charging up to 3.6 V at C/10 rate and 25° C., batteries are stored for 3 days at 85° C. and recovery discharge capacities after storage are determined at C/5 rate and 25° C., as provided in table 3.

TABLE 3

| Samples | C1 | C2 | C3 | C4 | C5 |
|---|---|---|---|---|---|
| Nanomilled material D$_{50}$ (nm) | 142 | 144 | 143 | 141 | 144 |
| C—LiFePO$_4$ D$_{50}$ (μm) | 12 | 12.2 | 12.4 | 12.1 | 12.3 |
| C—LiFePO$_4$ sulfur content (ppm) | 764 | 318 | 73 | 36 | 15 |
| C-deposit wt. % | 1.28 | 1.09 | 1.04 | 1.02 | 1.03 |
| S/C ratio (%) | 5.97 | 2.92 | 0.75 | 0.35 | 0.15 |
| BET | 7.6 | 6.9 | 6.3 | 6.2 | 6.2 |
| Battery | 5a/b | 6a/b | 7a/b | 8a/b | 9a/b |
| Capacity (mg/cm$^2$) | 4.6 | 4.7 | 4.6 | 4.7 | 4.6 |
| Specific capacity before storage (mAh/g) | 161 | 162 | 162 | 163 | 161 |
| Recovery capacity after storage (mAh/g) | 91 | 103 | 140 | 142 | 144 |

The results demonstrate that unexpectedly very low level of sulfur impurities in C—LiFePO$_4$ of the present invention is critical to ensure excellent C—LiFePO$_4$ electrochemical properties.

Figure 4:
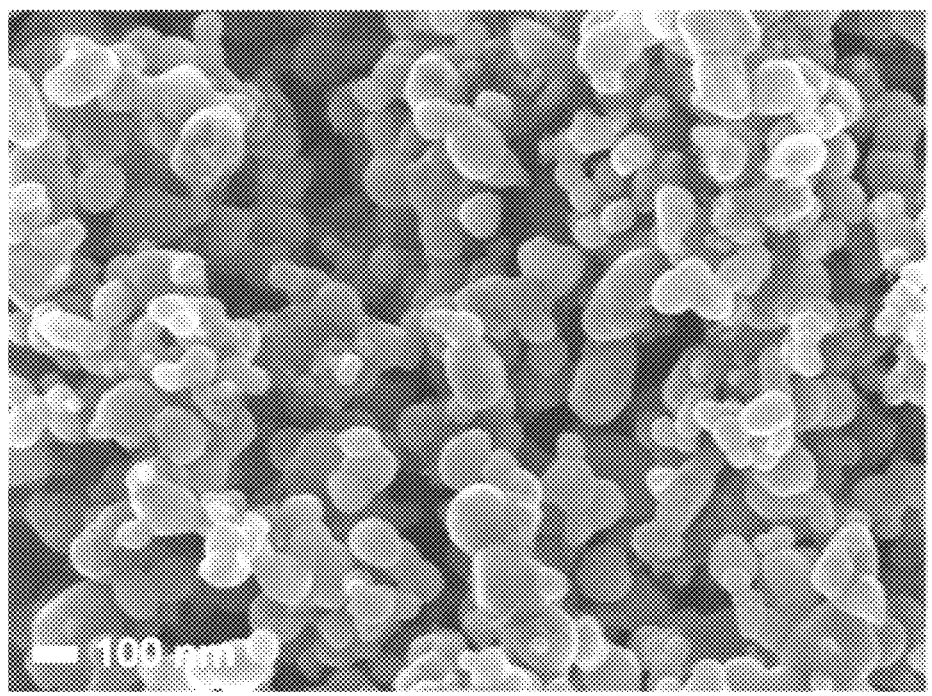
FIG. 4 represents the SEM microscopy observation of primary particles after bead nanomilling in water as fluid carrier, as prepared in example 2.
Figure 5:
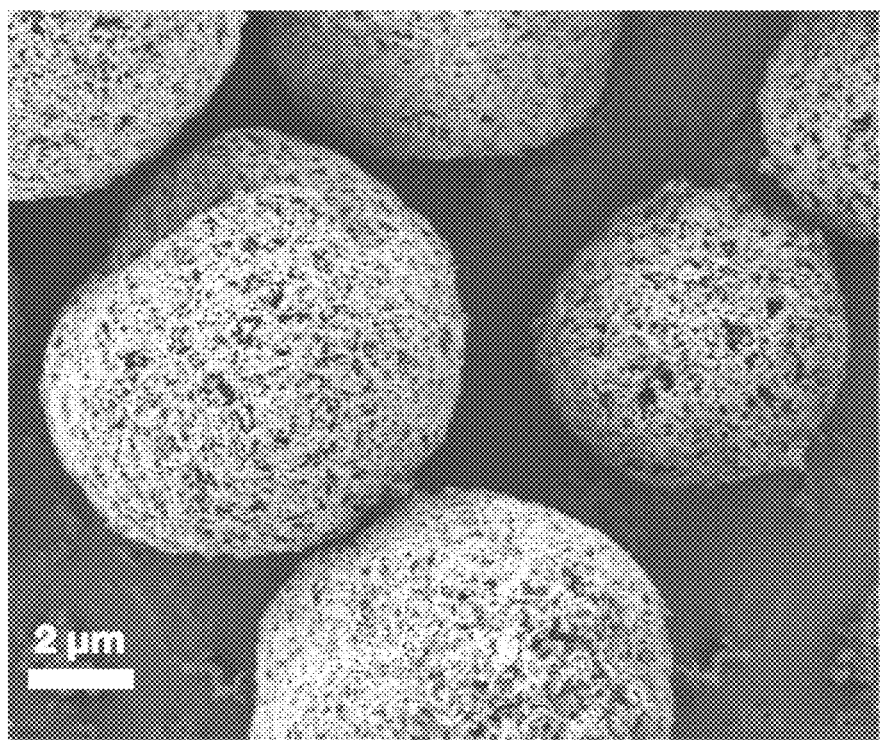
FIG. 5 represents the SEM microscopy observation of a carbon deposited secondary agglomerates of primary particles, as prepared in example 2.
Figure 6:
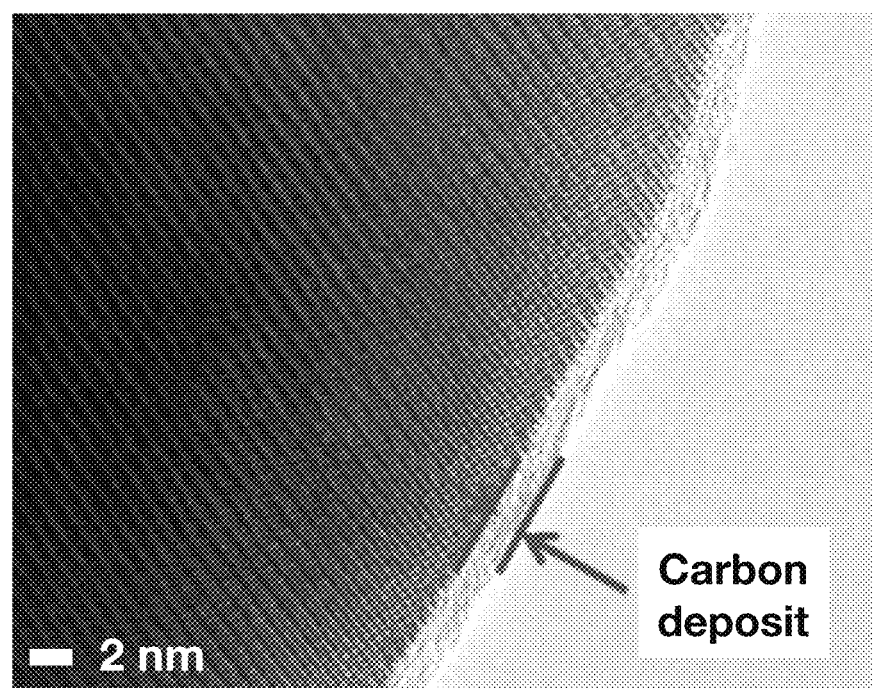
FIG. 6 represents the TEM image of a C—LiFePO$_4$ carbon deposit layer obtained by thermal CVD process with a gas-phase carbon source, as prepared in example 2.

For sample C5, SEM image of primary particles after nanomilling is provided in FIG. 4, SEM image of C—LiFePO$_4$ secondary agglomerates of primary particles in FIG. 5, and TEM image of carbon deposit in FIG. 6.

Carbon deposit purity of sample C5 as estimated by Raman analysis is superior to 99.9 wt. %.

Batteries 5b-9b are subjected to C/1 intentiostatic cycling at 60° C. between 2 and 3.6 Volt, capacities after 3000 cycles, relatively to initial specific discharge capacity, are provided in table 4. The results confirm that to produce carbon-deposited cathode material of the present invention with excellent performances at high temperature, very low sulfur impurities content in the material is essential.

TABLE 4

| Battery | 5b | 6b | 7b | 8b | 9b |
|---|---|---|---|---|---|
| Capacity versus initial capacity (%) | 61.4 | 65.1 | 76.7 | 77.4 | 77.9 |

All samples of present example are obtained with less than 100 ppm water content, and are further dry under vacuum at 300° C. for 48 hours to a water content of less than 10 ppm, and then exposed in an enclosure to an atmosphere with a 10% relative humidity provided by a humidity generator (product of Owlstone Inc., USA), while monitoring weight of samples. Water contents after 120 seconds exposure to humid atmosphere are provided in table 5.

TABLE 5

| Samples | C1 | C2 | C3 | C4 | C5 |
|---|---|---|---|---|---|
| Water content (ppm) | 462 | 289 | 93 | 72 | 53 |

The results demonstrate that very low level of sulfur impurities in C—LiFePO$_4$ of the present invention is favorable to limit water-uptake of the material. Without being bound to any theory, the inventors believe that hygroscopic species related to presence of sulfur impurities increase hydrophylicity of the surface.

Magnetic impurities are determined by agitating 150 g samples of C—LiFePO$_4$ in 400 ml isopropanol in presence of a Teflon-coated Fe—Nb—B bar magnet, followed by subsequent analysis of metallic content extract by magnet, prealably mineralized in acidic media, as determined by ICP-OES. Magnetization is determined by M-H curve measurement for selected C—LiFePO$_4$ sample. Magnetic impurities in ppb of iron relatively to mass of samples and spontaneous magnetization are provided in table 6.

TABLE 6

| Samples | C1 | C2 | C3 | C4 | C5 |
| --- | --- | --- | --- | --- | --- |
| Magnetic impurities (ppb) | 865 | 629 | 233 | 148 | 83 |
| Magnetization (emu/g) | 0.021 | / | 0.0016 | / | 0.0007 |

The results demonstrate that very low level of sulfur impurities in C—LiFePO$_4$ of the present invention is favorable to limit magnetic impurities content.

Zeta potential measurements are conducted for aqueous suspensions with a solid loading of 5 wt. % of C—LiFePO$_4$ samples at neutral pH with a ZetaProbe (product of Colloidal dynamics, USA), as provided in table 7.

TABLE 7

| Samples | C1 | C2 | C3 | C4 | C5 |
| --- | --- | --- | --- | --- | --- |
| Zeta potential (mV) | −34 | −28 | −16 | −9 | −5 |

The results demonstrate that very low level of sulfur impurities in C—LiFePO$_4$ of the present invention is favorable to reduce zeta potential absolute value of the carbon-deposited material of the present invention.

Equivalent synthesis of carbon-deposited material with various content of sulfur impurities are repeated with suitable precursors and stoichiometries to obtained C—LiFe$_{0.97}$Ca$_{0.03}$PO$_4$ (FePO$_4$.2H$_2$O, Li$_2$CO$_3$, and CaHPO$_4$, C-deposit content between 0.89 and 0.98 wt. %, sulfur content between 9 and 786 ppm), C—LiFeO$_{0.29}$Mn$_{0.68}$Zn$_{0.03}$PO$_4$ (Fe$_{0.29}$Mn$_{0.68}$Zn$_{0.03}$PO$_4$.2H$_2$O, Li$_2$CO$_3$, C-deposit content between 0.92 and 0.97 wt. %, sulfur content between 13 and 634 ppm), C—LiFePO$_4$ (Fe$_3$(PO$_4$)$_2$, Li$_3$PO$_4$, C-deposit content between 0.81 and 1.15 wt. %, sulfur content between 15 and 504 ppm), C—LiMnPO$_4$ (Mn$_3$(PO$_4$)$_2$, Li$_3$PO$_4$, C-deposit content between 0.89 and 0.95 wt. %, sulfur content between 15 and 703 ppm). High temperature storage and cycling, measurements of water-uptake, magnetic impurities content, spontaneous magnetization, and zeta potential similarly conclude that sulfur impurities content of less than 80 ppm and preferably S/C ratio of less than 0.8% are beneficial to the performances of the carbon-deposited material of the present invention.

As comparative experiments, ten batches of LiFePO$_4$ are prepared by adding at 25° C. under stirring a 0.3 M LiOH.H$_2$O aqueous solution to a solution of 0.1 M FeSO$_4$.7H$_2$O and 0.1 M H$_3$PO$_4$ in 50 vol % water and 50 vol % DMSO. Then the temperature of the solution is increased up to the solvent's boiling point, which is 108 to 110° C., whereby LiFePO$_4$ begins to precipitates. After one hour, the precipitate is filtered and washed with H$_2$O. A thermal treatment is finally performed by putting the dry precipitate at 500° C. for 3 hours in a slightly reducing N$_2$/H$_2$ (95/5) gas flow. A thermal CVD step is then performed on as-obtained ten batches in the furnace tube of a rotary kiln (product of Zhengzhou CY Scientific Instrument Co., type CY-R1200X-100IC), tube is flushed with dry nitrogen and heat up to 200° C. at 10° C./mn, keeping the temperature for 60 mn and then continuously flushed with a gas mixture of vaporized benzene and argon (containing 30% by volume of benzene). After heating up to 640° C. at 20° C./mn, keeping the temperature for 1 hour, carbon-deposited LiFePO$_4$ is obtained. Sulfur and carbon content in each batch is carried out by combustion analysis in a carbon/sulfur analyzer (sold by LECO Corporation). C—LiFePO$_4$ batches with carbon deposit content between 0.92 and 1.08 wt. %, and sulfur impurities content between 24 and 682 ppm are obtained. High temperature storage and cycling, similarly conclude that sulfur impurities content of less than 80 ppm and preferably S/C ratio of less than 0.8% are beneficial to the performances of the LiFePO$_4$ including a carbon deposit obtained by a thermal CVD process with a gas-phase carbon source.

Example 3

Material_a1 synthesis is repeated as in example 1, with high purity FePO$_4$.2H$_2$O (100 kg), battery grade Li$_2$CO$_3$ (1:2 molar ratio), and Pluronic® P-123 (2 wt. % versus FePO$_4$.2H$_2$O, poly(ethylene glycol)-poly(propylene glycol)-poly(ethylene glycol) triblock copolymers, product of BASF) precursors, milled under nitrogen in 200 liters deaerated methanol with a MasterMill 18 submersible basket mill (product of Netzsch). After solvent evaporation, material (referred as material_a3) is placed in ceramic crucibles and treated under a stream of dry, oxygen-free nitrogen in a roller hearth kiln at 600° C. for 60 minutes, and further cooled and stored under nitrogen.

Carbon-deposited material is obtained with 0.32 wt. % of carbon (as determined by LECO) and is composed as determined by XRD analysis of 72.1 wt. % of LiFePO$_4$ with remaining phases of Li$_3$PO$_4$ and Fe$_3$(PO$_4$)$_2$ with 1:1 molar ratio, Fe(III) is not detected by Mössbauer analysis.

A 2 kg batch of material_a3 is further nanomilled in deionized and deaerated water as carrier fluid with a Netschz Alpha® 8 Neos® stirred media mill, connected to a circulation tank, equipped with a ceramic grinding chamber to avoid metallic contamination, and filled with 100 μm yttria-stabilized zirconia beads. Water contains 0.7 wt. % Carbowax™ polyethylene glycol 4000 surfactant (product of Dow Chemical) and 0.3 wt. % ascorbic acid relatively to material_a3. Nanomilling is performed during 60 mn with a grinding energy of 0.37 kWh per kg material_a3, heat is removed through the walls of its milling compartment by cooling water.

Slurry is spray dried with compressed air in a MOBILE MINOR™ spray dryer equipped with a COMBI-NOZZLE™ (products of GEA Niro), during spray drying the gas inlet temperature is 275° C., the outlet temperature is 105° C. Spray dried material is then dried under vacuum at 100° C. for 24 hours and stored under nitrogen (referred as material_a3_1). Gas phase carbon deposition is continuously performed in a rotary kiln equipped with a carbon tube continuously flushed with a gas mixture of 10% propylene in nitrogen on a batch of material_a3_1, with heating zone at 640° C., spray dried material is supplied by a controlled screw feeder, and stored under nitrogen at the exit of the kiln. Carbon-deposited LiFePO$_4$ is obtained with characteristics as disclosed in table 8.

TABLE 8

Sample D1

| | | | |
|---|---|---|---|
| Nanomilled median primary particle size (nm) | 94 | L/D | 1.04 |
| Nanomilled particle PSD span | 2.13 | BET (m$^2$/g) | 7.8 |
| C—LiFePO$_4$ D$_{50}$ (μm) | 7.6 | Conductivity (S · cm$^{-1}$) | 0.13 |
| C—LiFePO$_4$ porosity (%) | 28 | Water content (ppm) | 91 |
| C—LiFePO$_4$ sulfur content (ppm) | 32 | Magnetic impurities (ppb) | 231 |
| C-deposit wt. % | 0.97 | Tap density (g/cm$^3$) | 1.69 |
| I$_D$/I$_G$ ratio | 0.73 | Press density (g/cm$^3$) | 2.63 |
| S/C ratio (%) | 0.33 | Specific initial capacity (mAh/g) (a) | 165.8 |

(a) as determined with a lithium metal battery as disclosed in example 1

Spray drying experiments are repeated with a spray dryer NL-5 equipped with a RJ-5 Twin Jet nozzle (products of Ohkawara Kakohki Co.) with inlet temperatures between 200 and 250° C., to produce secondary agglomerates of primary particles C—LiFePO$_4$ with a D$_{50}$ between ca. 2 and 20 μm and a L/D spherical shape between ca. 0.95 and 1.05.

Liquid electrolyte lithium ion batteries with a carbon anode are assembled (battery 10-11) as disclosed in example 5, using C—LiFePO$_4$ sample D1 as cathode material, cathode composition is C—LiFePO$_4$/binder/carbon 88/6/6 wt. %.

Battery 10 is subjected at 25° C. to ragone test at intentiostatic discharge rate of C/5, C, 5C, and 10C, charge rate is maintained at C/5. The results are provided in table 9.

TABLE 9

| C-rate | C/5 | C | 5 C | 10 C |
|---|---|---|---|---|
| Specific cathode capacity (mAh/g) | 164.3 | 147.4 | 138.2 | 111.6 |

Figure 7:
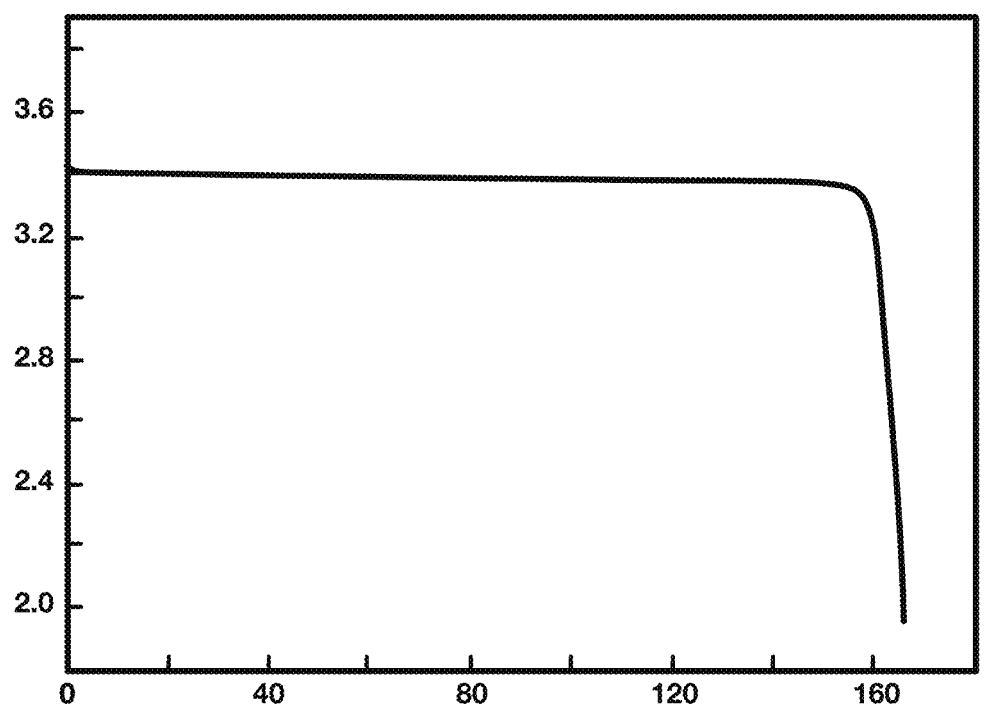
FIG. 7 represents cathode capacity, determined at 25° C. and C/5 discharge rate, for liquid electrolyte battery with a carbon anode and C—LiFePO$_4$ as cathode material. Battery voltage (in Volt vs Li$^+$/Li) is indicated on Y axis and capacity (in mAh/g) is indicated on X axis. Battery 10 is prepared with C—LiFePO$_4$ sample D1, as prepared in example 3.

Discharge curve for discharge at C/5 rate is provided in FIG. 7.

Battery 11 is subjected at −20° C. to intentiostatic discharge rate of C/5, charge rate is maintained at C/5, specific cathode capacity of 109.4 mAh/g is obtained.

Nanomilling, spray drying and thermal CVD process are repeated on numerous material_a3 2 kg batches while modifying process parameters (like nanomilling beads size, time, effective energy, and surfactants, spray drying inlet/outlet temperatures, and nozzles, thermal CVD carbon source) allowing preparation of C—LiFePO$_4$ with different characteristics.

Gas phase carbon deposition is also performed at 700° C. on a batch of material_a3_1 in a fluidized bed reactor, where a gas distributor is used at the bottom of the reactor to homogeneously distribute the gas flow, and a blade stirrer to prevent the occurrence of a gas channel. By adjusting the gas flow rate and the rotating speed, a stable fluidization can be obtained. The reaction is performed during 40 min, with 25% vaporized toluene in nitrogen with a total flow rate of 400 ml/min, to provide a cathode material with a uniform ca. 2 nm graphene-like carbon deposit.

All those experiments shows that it possible to achieve, without any limitation, primary particle size with a median size of 25 to 250 nm, primary particle size distribution with a span of less than 2.5 to 0.5, C—LiFePO$_4$ carbon deposit of 0.2 to 2.5 wt. %, carbon deposit I$_D$/I$_G$ of less than 0.9 to 0.6, graphene-like deposit of 1 to 8 layers, powder conductivity of more than 5·10$^{-2}$ to 5·10$^{-1}$ S·cm$^{-1}$, sulfur impurities content of less than 80 to 20 ppm, magnetic impurities of less than 300 to 100 ppb, water content of less than 200 to 20 ppm, secondary agglomerates of primary particles with BET of less than 11 to 5 m$^2$/g, porosity of 5 to 40%, D$_{50}$ of 2 to 30 μm, span of less than 3 to 1, powder press density of more than 2.4 to 2.8 g/cm$^3$.

Qualification of batteries using various batches of C—LiFePO$_4$ of present invention as cathode material shows that it is routinely possible to achieve at 25° C. capacity in the range of 159-169 mAh/g at a discharge rate of C/5, 145-155 mAh/g at a discharge rate of 1 C, 130-145 mAh/g at a discharge rate of 5 C, and at −20° C. capacity in the range of 100-140 mAh/g at a discharge rate of C/5.

Those values depend on many parameters such as careful optimization of battery electrode manufacturing, electrode calendaring, and electrolyte composition. Machine made industrial batteries confirm it is possible for example to reach 20 C/1 C capacity superior to 90% at 25° C.

Synthesis of sample D1 is repeated, propylene as thermal CVD carbon source is replaced by a gas stream obtained by cracking of polyethylene (PE) chunks in a pyrolysis reactor at 600° C. under a stream of nitrogen. A further experiment is performed with an additional reforming step in a catalyst reactor wherein cracked polyethylene gas stream is further passed through Y-zeolite catalyst bed at 600° C., total aromatic content increase to around 39 wt. % from around 0.5%. The results are provided in table 10.

TABLE 10

| Thermal CVD carbon source | PE cracking | PE cracking + reforming |
|---|---|---|
| Carbon source aromatic content (wt. %) | 0.48 | 38.7 |
| C-deposit content (wt. %) | 1.13 | 1.18 |
| C-deposit I$_D$/I$_G$ | 0.83 | 0.71 |
| C-deposit conductivity (S · cm$^{-1}$) | 0.072 | 0.131 |

Synthesis of sample D1 is repeated with addition of 2 wt. % High Color Furnace #2650 (product of Mitsubishi Chemical) relatively to material_a3 prior nanomilling step. After spray drying and thermal CVD step, as-obtained C—LiFePO$_4$ powder press density is improved by 6.9% and a lithium ion battery similar to battery 11 shows an improvement of 5.7% of specific cathode capacity when subjected at −20° C. to intentiostatic discharge rate of C/5.

Synthesis of sample D1 is repeated with the addition of 0.5 wt. % of triethoxysilypropoxy(polyethyleneoxy)dodecanoate relatively to material_a3 prior to nanomilling step. After spray drying and thermal CVD step, a lithium ion battery similar to battery 10 using this material benchmark with a lithium ion battery using sample D1 as cathode material shows a 6.3% reduction of capacity fading after 2000 cycles when subjected to C/1 intentiostatic cycling at 60° C. between 2 and 3.6 Volt. Experiment is repeated with addition of 1 wt. % Tyzor® TEAZ (ethanolamine zirconium complex, product of Dorf Ketal Chemicals), providing also a beneficial reduction of capacity fading after 2000 cycles at 60° C.

Synthesis of sample D1 is repeated, but prior to nanomilling step, material_a3 is pre-milled during 15 minutes in a Q-03 metal-free circulation attritor filled with 6 mm yttria-stabilized zirconia beads (product of Union Process), D$_{90}$ is reduced to 1.3 μm from an initial value of 26 μm, followed by nanomilling of slurry in Netschz Alpha® 8 Neos® stirred media mill for 40 minutes. Nanomilled particles with a similar median particle size of 98 nm are obtained but particle size distribution span is reduced to 1.28. Moreover, total specific grinding energy is reduced by 26% with pre-milling step and wearing of costly fine nanomilling beads (as determined by content of zirconium after nanomilling in slurry by ICP-OES analysis) is reduced by 34%, with a favorable impact on process cost. After processing similar to sample D1 (spray drying and thermal CVD), a ragone test performed in a lithium ion battery similar to battery 10, demonstrates that nanomilled particles reduce particle size distribution span improves material power performances, for example at a discharge rate of 10 C, cathode capacity is improved by ca. 12%.

Through nanomilling process parameters optimization (such as size of beads, beads loading, material_a loading, multi-stage nanomilling mode of operation, pre-milling stage, surfactants selection, nanomilled material median particle size, or milling energy), inventors demonstrate that is possible to performed synthesis of nanomilled material_a with a span between 0.3 and 3.

Synthesis of sample D1 is repeated, but nanomilled material_a3 (effective grinding energy 0.49 kWh per kg material_a3) is recovered in a filter press, the filter cake dried under vacuum at 100° C. for 24 hours, and stored under nitrogen. Weakly agglomerated nanomilled particles with a 83 nm median primary particle size are obtained, and further subjected to a thermal CVD step at 650° C. with vaporized benzene/nitrogen gas mixture as carbon source. C—$LiFePO_4$ is obtained as sample D2 with a carbon deposit content of 1.3 wt. %, a BET of 12.3 $m^2$/g, a sulfur content of 36 ppm, an $I_D/I_G$ ratio of 0.69, a conductivity of 0.13 $S \cdot cm^{-1}$, a press density of 2.42 $g/cm^3$, a water content of 64 ppm, a magnetic impurities content of 212 ppb.

Synthesis equivalent to material_a3 and related experiments are repeated with suitable precursors and stoichiometries to obtained. C—$LiFe_{0.97}Zn_{0.03}PO_4$, C—$LiFe_{0.3}Mn_{0.7}PO_4$, C—$LiFe_{0.33}Mn_{0.64}Mg_{0.03}PO_4$, C—$LiFe_{0.08}Mn_{0.88}Co_{0.04}PO_4$, C-$LiMnPO_4$, with subsequent nanomilling and thermal CVD process, confirming benefit of carbon-deposited material of the present invention.

Example 4

A hybrid electrode coating (referred as coating 4.1) is prepared as in example 5, using C—$LiFePO_4$ sample D2 of example 3 mixt with $LiCoO_2$ (LCO 983HA, product of Pulead, $D_{50}$ of 14.3 μm, 95 wt. % of total cathode material), cathode composition is (LCO:C—$LiFePO_4$)/binder/carbon 88/6/6 wt. %. A similar reference electrode coating (referred as coating 4.2) with only LCO 983HA as cathode material is also prepared. A further hybrid electrode coating (referred as coating 4.3) with same composition is also prepared with a C—$LiFePO_4$ similar to sample D2, except that sulfur content is 412 ppm (referred as sample D3).

Figure 8:
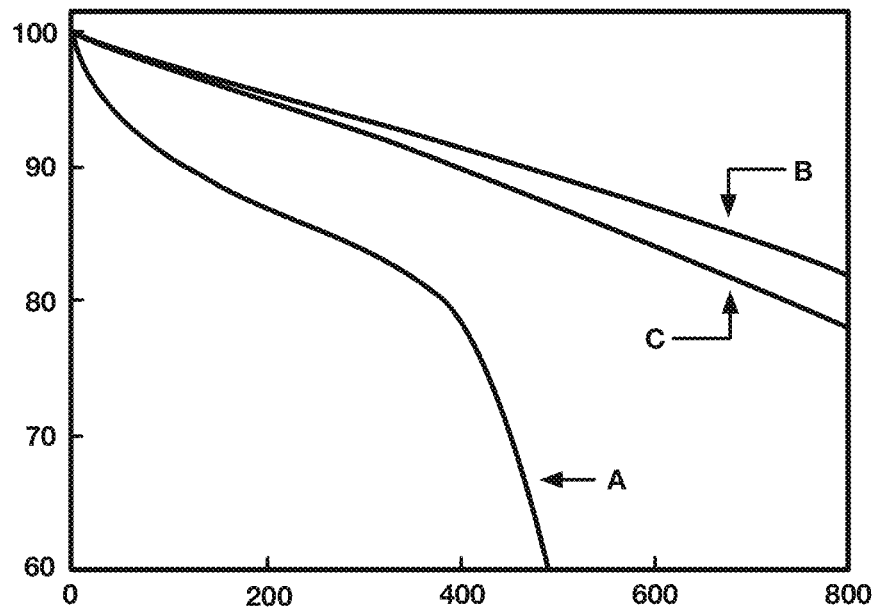
FIG. 8 represents cycling capability, determined at 60° C. and C/1 intentiostatic cycling, for three liquid electrolyte batteries with a carbon anode, and either hybrid electrode with LCO and C—LiFePO$_4$ as cathode material, or bare LCO as cathode material. Battery capacity (in mAh/g) is indicated on Y axis and cycle number is indicated on X axis, initial capacity is determined at C/5 at 25° C. Curve A illustrates cycling capabilities of bare LCO as cathode material, curve B of hybrid electrode with C—LiFePO$_4$ (36 ppm sulfur content) and LCO as cathode material, and curve C of hybrid electrode with C—LiFePO$_4$ (412 ppm sulfur content) and LCO as cathode material, as prepared in example 4.

Liquid electrolyte lithium ion batteries with a carbon anode are assembled as disclosed in example 5, batteries are subjected to C/1 intentiostatic cycling at 60° C. between 2.6 and 4.35 Volt. Cycling curves for coating 4.1 (curve B), 4.2 (curve A), and 4.3 (curve C) are provided in FIG. 8.

The results demonstrate that carbon-deposited cathode material of the present invention used as a coating for oxides cathode benefit of very low content of sulfur impurities, to maintain excellent performances at high temperature.

Similar batteries (3) with coating 4.1 (hybrid cathode) and 4.2 (bare LCO) are subjected to nail test (1 m/mn) at 60° C. after charging at 4.3 Volt (C/10 rate), batteries with hybrid cathode pass test (0/3 failure), those with bare LCO fail test (3/3 failure) with rapid ignition of cells.

Similar electrodes coating and corresponding lithium ion batteries are prepared by replacing LCO 983HA with core-shell $Li_{1.05}Mg_{0.025}NiO_2$ coated with a $LiCoO_2$ layer (referred as core-shell substituted LNO, as prepared according to example 7 of U.S. Pat. No. 7,381,496, 5 mol % $LiCoO_2$, 92 wt. % of total cathode material for hybrid electrodes with samples D2 and D3). Hybrid electrodes with C—$LiFePO_4$ samples D2 and D3 presents better cycling capabilities (CR intentiostatic cycling at 60° C. between 2.8 and 4.3 Volt), capacity fading after 300 cycles for hybrid electrodes is reduced by 87% (sample D2) and 73% (sample D3) relatively to electrode using bare core-shell substituted LNO cathode material.

Synthesis of sample D2 of example 3 is repeated but instead of thermal CVD step, nanomilled material_a3 obtained after filter press is mixed in water with 6 wt. % of lactose. After drying, carbon deposit is obtained by heat treatment at 700° C. for 1 hour under a stream of nitrogen, C—$LiFePO_4$ (referred as Sample Dref) is obtained with a carbon deposit content of 1.42 wt. % and a conductivity of around $10^{-3}$ S·cm, and used to prepare equivalent hybrid electrodes coating and lithium ion batteries.

Lithium ion batteries using similar (LCO:C—$LiFePO_4$) hybrid electrode coating with respectively C—$LiFePO_4$ samples D2 and Dref are used to performed DC impedance measurement at 3.7 Volt with increasing discharge rate at 25° C., results are provided in table 11 relatively to DC impedance of similar lithium ion battery at 3.7 Volt using bare LCO 983HA, ratio of sample D2 and Dref conductivity relatively to LCO 983HA ($\sigma$_carbon/$\sigma$_ox) is also provided.

TABLE 11

| C-rate | 1 C | 5 C | 10 C | 20 C | 30 C | $\sigma$_carbon/$\sigma$_ox |
|---|---|---|---|---|---|---|
| Relative DC impedance D2 (%) | <1 | <3 | −3 | −7 | −21 | >10 |
| Relative DC impedance Dref (%) | 5 | 16 | 37 | 103 | 204 | <$10^{-1}$ |

The results demonstrate that carbon-deposited cathode material of the present invention used as a coating for oxides cathode benefit of its high conductivity and improves power performances of batteries using such hybrid electrodes.

Similar electrodes coating and corresponding lithium ion batteries are prepared by replacing LCO 983HA with a full concentration gradient (FCG) NMC811 oxide cathode material (product of Posco®, 92 wt. % of total cathode material for hybrid electrode with sample D2), corresponding batteries are subjected to storage trials for 3 days at 85° C., with procedure as disclosed in example 2 (after charging at 4.35 Volt, 25° C., and C/10 rate). Hybrid electrode presents better storage capabilities, capacity loss after storage of hybrid electrode is reduced by 69% relatively to electrode using bare FCG NMC811 cathode material. Similar storage trial with hybrid electrode using C—$LiFePO_4$ sample D3 (386 ppm sulfur content) instead of sample D2 (32 ppm sulfur content) confirms benefit of very low content of sulfur impurities. Performances of lithium ion batteries can be improved by using FCG NMC811 with a surface treatment, for example with an aluminum oxide coating obtained by atomic layer deposition (ca. 15 nm $Al_2O_3$ deposit obtained from trimethylaluminum precursor in a batch fluidized bed reactor), while maintaining benefit on storage at high temperature of hybrid electrode with very low sulfur carbon-deposited material of the present invention.

A hybrid electrode coating for a PHEV battery is prepared as in example 5, using a C—$LiFePO_4$ sample spray dried in NL-5 spray dryer (product of Ohkawara Kakohki Co., $D_{50}$ of 3.7 µm, sulfur content of 32 ppm) as disclosed in example 3, mixt with NMC532 (product of Ecopro Co., 88 wt. % of total cathode material), cathode composition is (NMC532: C—$LiFePO_4$)/binder/carbon 88/6/6 wt. %. A similar reference electrode coating with bare NMC532 as cathode material is also prepared. A further hybrid electrode coating with same composition is also prepared with a similar C—$LiFePO_4$ sample ($D_{50}$ of 3.5 µm), except that sulfur content is 283 ppm.

Figure 9:
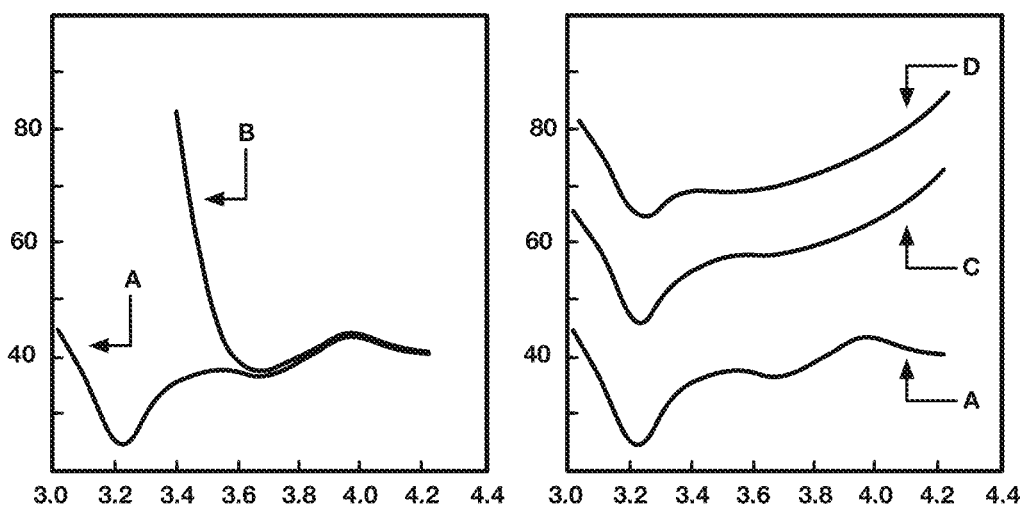
FIG. 9 represents hybrid pulse power capability (HPPC) determined at 25° C. for 10 seconds 3C pulse charge rate, for three liquid electrolyte batteries with a carbon anode, and either hybrid electrode with NMC532 and C—LiFePO$_4$ as cathode material, or bare NMC532 as cathode material. Battery voltage (in Volt vs Li$^+$/Li) is indicated on Y axis and area specific impedance (ASI in Ω·cm$^2$) is indicated on X axis. Curve A illustrates HPPC input data of hybrid electrode with C—LiFePO$_4$ (32 ppm sulfur content) and NMC532 as cathode material, curve B of bare NMC532 as cathode material, curve C of same hybrid electrode after 200 cycles at 60° C. and C/1 intentiostatic cycling, and curve D for hybrid electrode with C—LiFePO$_4$ (283 ppm sulfur content) and NMC532 as cathode material after 200 cycles at 60° C. and CR intentiostatic cycling, as prepared in example 4.

HPPC pulse power performances (3 C, 10 seconds charge pulse, 25° C.) experiments are then performed on lithium ion batteries. HPPC results (area specific impedance ASI in $\Omega \cdot cm^2$ versus cell voltage) are provided in FIG. 9 for hybrid electrode (low sulfur cathode material) and bare NMC532 electrode, respectively on curves labeled A and B, result for hybrid electrode with high sulfur cathode material is similar to low sulfur one. HPPC experiments are repeated after 200 cycles at 60° C. (CR intentiostatic cycling between 2.8 and 4.4 Volt), results are provided on FIG. 9 for hybrid electrode on curve C (low sulfur), and curve D (high sulfur). The results demonstrate that carbon-deposited cathode material of the present invention benefit of very low content of sulfur impurities, to maintain excellent performances at high temperature, while high conductivity of carbon deposit improved charge and discharge pulse power performances at low state of charge (SOC) as measured by lower ASI value.

Example 5

Preparation of Lithium Metal Liquid Electrolyte Batteries

Cathode material, polyvinylidene fluoride resin as a binder (Kynar® HSV 900, product of Atochem) and C-NERGY™ Super C45 graphite powder as conductive material (product of Imerys) are mixed in N-methylpyrrolidone (NMP) with a laboratory planetary vacuum mixer in order to prepare a positive electrode slurry. The mixture obtained is subsequently deposited, using a Gardner® device, on a sheet of aluminum carrying a carbon-treated coating (product of Coveris Advanced Coating) and the film deposited is dried under vacuum at 80° C. for 24 hours and then stored in a glovebox. Batteries of the "button" type are assembled and sealed in a glovebox, use being made of the carbon-treated sheet of aluminum foil carrying the coating comprising the cathode material of present invention, as battery cathode, a film of lithium, as anode, and a Celgard® 2500 polypropylene separator film having a thickness of 25 µm impregnated with a LBC3237B electrolyte solution (product of Shenzhen CAPCHEM Technology Co., solution of $LiPF_6$ in EC/PC/EMC with vinylidene carbonate as additive).

Preparation of Lithium Ion Liquid Electrolyte Batteries

Cathode material, or two or more cathode materials for hybrid cathode, polyvinylidene fluoride resin as a binder (Kynar® HSV 900, product of Atochem) and C-NERGY™ Super C45 graphite powder as conductive material (product of Imerys) are mixed in N-methylpyrrolidone (NMP) with a planetary vacuum mixer in order to prepare a positive electrode slurry. The slurry is coated on a 20 µm thick aluminum foil carrying a carbon-treated coating (product of Coveris Advanced Coating) with a coating machine, dried, and rolled to form a positive electrode.

Anode material MAG (product of Hitachi Chemical Co.), polyvinylidene fluoride resin as a binder (Solef® 5130, product of Solvay), and C-NERGY™ Super C65 graphite powder as conductive additive (product of Imerys) are mixed (weight ratio 90/8/2) in NMP with a planetary vacuum mixer in order to prepare a negative electrode slurry. The slurry is coated on a 15 µm thick copper foil with a coating machine, dried, and rolled to form a negative electrode.

A 25 µm thick Celgard 2500 polypropylene separator film is inserted between the electrodes, wound, compressed, placed in metallized plastic bags, and electrolyte LBC3033 (product of Shenzhen CAPCHEM Technology Co., solution of $LiPF_6$ in EC/EMC/DEC with vinylidene carbonate as additive) injected prior sealing of lithium ion cell.

Example 6

Machine made pouch cells (300 mAh) with C—$LiFePO_4$ sample spray dried in NL-5 spray dryer (product of Ohkawara Kakohki Co., $D_{50}$ of 3.7 µm, sulfur content of 32 ppm) as disclosed in example 3, coated on NMC622 (product of Umicore, 92% of total cathode material) as cathode material and artificial graphite as anode material are obtained dry, without electrolyte from a battery manufacturer. Additional pouch cells with same composition are also prepared with a similar C—$LiFePO_4$ sample ($D_{50}$ of 3.5 µm), except that sulfur content is 366 ppm. Cells are subsequently cut below the seal and vacuum dried at 80° C. for 14 hours prior to filling with electrolyte. The pouch cells are filled with 1.07 mL LBC3033 electrolyte (product of Shenzhen CAPCHEM Technology Co., solution of $LiPF_6$ in EC/EMC/DEC with vinylidene carbonate as additive) with as additional additive LiFSI (IONEL LF-101, product of Nippon Shokubai Co., 20 mol % of $LiPF_6$ content), in an argon-filled glove box and sealed in the same glove box under vacuum. After electrolyte filling, cells are placed in a 25° C. temperature controlled box, and held at 1.5 V for 24 hours. They are then charged to 3.5 V at C/20 and transferred to a glove box for degassing (cut open below the seal and re-sealed under vacuum). After degassing, they are charged to 4.4 V and then discharged to 2.8 V (C/10 rate), to measure initial specific discharge capacities, and charged back to the same upper charge cutoff voltage. After measurement of cells thickness and resistance, they are finally held at 4.4 V for 1 week at 60° C. Recovery discharge capacities after storage are determined at C/10 rate and 25° C., as well as thickness and resistance of the cells, and provided in table 12 (relatively to measurements prior storage test at 60° C.).

TABLE 12

| | | |
|---|---|---|
| C—$LiPF_4$ sulfur content (ppm) | 312 | 32 |
| Recovery capacity after storage (%) | −3.2 | −1.7 |
| Cell thickness after storage (%) | +6.3 | +3.2 |
| Cell resistance (%) | +88 | +41 |

The results demonstrate that carbon-deposited cathode material of the present invention used as a coating for oxides cathode benefit of very low content of sulfur impurities, to maintain excellent performances at high temperature and reduced gas generation. Similar storage trial with pouch cells using $LiNPO_2F_2$ (product of Foosung Co., 10 mol % of $LiPF_6$ content) instead of LiFSI as electrolyte additives confirms benefit of very low content of sulfur impurities.

Similar 300 mAh pouch cells batteries (2) with coating 4.1 (hybrid cathode) and 4.2 (bare LCO) are subjected to nail test (1 m/mn) at 60° C. after charging at 4.3 Volt (C/10 rate), batteries with hybrid cathode pass test (0/3 failure), those with bare LCO fail test (3/3 failure) with rapid ignition of cells.

A similar reference electrode coating with bare NNIC532 as cathode material is also prepared. A further hybrid electrode coating with same composition is also prepared with a similar C—LiFePO$_4$ sample (D$_{50}$ of 3.5 μm), except that sulfur content is 283 ppm.

Example 7

High molecular weight polynaphthalenesulfonate sodium salt (DAXAD® 19, product of GEO® Specialty Chemicals, Inc.) is used to prepared sulfonyl chloride intermediate followed by reaction with CF$_3$SO$_2$NH$_2$ (as disclosed generally in US 2002/0009650 A1) to obtained high molecular weight polynaphthalenesulfonyl(trifluoromethanesulfonyl) imide lithium salt (PNSTFSLi) with a purity of +99.8%. As commonly used in cement industry, DAXAD® polymers and equivalent are a cost-effective solution to produce polyelectrolytes including a —SO$_2$NSO$_2$CF$_3$ delocalized anion. Polyelectrolytes can also be obtained by reaction of formaldehyde with 2-naphtalenesulfonyl(trifluoromethane-sulfonyl)imide (prepared by reaction of commercial 2-naphtalenesulfonyl with CF$_3$SO$_2$NH$_2$).

All the manipulations are carried out in a glove box under an inert and anhydrous atmosphere. 36.7 g of a terpolymer based on ethylene oxide, methyl-glycidyl ether and allylglycidyl ether and 6.2 g of bis(trifluoromethanesulfonimide) lithium salt are added to 164 ml of acetonitrile. The salt and terpolymer concentration are adjusted so as to give an oxygen over lithium molar ratio (O/Li) of 40/1. To 20 ml of this mother solution, 0.9 ml of a solution obtained by dissolving 4.5 g of bis(trifluoromethanesulfonimide) lithium salt in 20 ml of commercial polyoxyethylene glycol diacrylate of molecular weight 700 (available from Aldrich) is added. The mixture of these two solutions is then stirred at room temperature for about 3 hours, PNSTFSLi (10% by weight of polymer), AEROSIL® R 812 fumed hydrophobic silica (1.5% by weight of polymer), and benzoyl peroxide (2% by weight of polymer) are added and the solution is again stirred for about 1 hour. After being coated as a film on a polypropylene film, the material is heated under an inert atmosphere at 85° C. for 24 hours to produce polymer electrolyte with a thickness of 12 μm.

Lithium metal polymer batteries (LMP) are made using a negative electrode of metallic lithium 15 μm thick, laminated on a current collector of 8 μm nickel. The electrolyte consists of previously disclosed polymer electrolyte membrane. The positive electrode contains a mixture of C—LiFePO$_4$ cathode material, LITX® 200 (product of Cabot Corporation) and a terpolymer containing bis(trifluoromethane-sulfonimide) lithium salt in a molar ratio O/Li=30 (49/3/48% by volume), said positive electrode having a capacity of 6 C/cm$^2$. The composite material is solvent coated on an 8 μm aluminum current collector. The lithium metal polymer battery is assembled by hot pressing at 80° C. under a vacuum.

Lithium metal polymer batteries are prepared using C—LiFePO$_4$ sample similar to material D2 of example 3 with characteristics as disclosed in table 13.

TABLE 13

| Samples | LFP1 | LFP2 |
| --- | --- | --- |
| Nanomilled median primary particle size (nm) | 132 | 134 |
| C—LiFePO$_4$ D$_{50}$ (μm) | 11.8 | 12.3 |
| C—LiFePO$_4$ sulfur content (ppm) | 493 | 54 |
| C-deposit wt. % | 1.12 | 1.07 |
| Conductivity (S · cm$^{-1}$) | 0.093 | 0.12 |
| BET | 9.8 | 9.1 |
| Battery | LMP1 | LMP2 |
| Capacity (mg/cm$^2$) | 4.6 | 4.6 |
| Porosity (%) | 7 | 3 |
| Zeta potential (mV) | −32 | −12 |

The results demonstrate that carbon-deposited cathode material of the present invention with very low sulfur content of sulfur impurities also benefit performances of lithium metal batteries. Especially, lower zeta potential allows production of low porosity cathode material, moreover high electronic conductivity allows to reduce the quantity of electronic conductive additives, and lower battery resistance.

Example 8

Liquid electrolyte batteries with a metallic lithium anode are assembled (battery IL-1 and IL-2) as disclosed in example 5, with liquid electrolyte replaced by 0.13LiFSI0.87PYR14 (PYR14 stand for 1-butyl-1-methylpyrrolidinium bis(fluorosulfonyl)imide, 87 mol %), cathode compositions are C—LiFePO$_4$/binder/carbon 88/6/6 wt. %. Both batteries use equivalent C—LiFePO$_4$ cathode material (secondary agglomerates with D$_{50}$ of ca. 7 μm, D$_{50}$ of primary particle size of ca. 154 nm, carbon content of ca. 0.96 wt. % from CVD with propylene precursor) except that IL-1 C—LiFePO$_4$ contains 46 ppm sulfur and IL-2 486 ppm sulfur. Electrode capacity and initial specific discharge capacity (1$^{st}$ discharge) determined by electrochemical measurement at C/5 are equivalent for both batteries. Batteries are then subjected to 2 C galvanostatic cycling at 80° C. between 2 and 3.6 Volt, after 500 cycles battery residual capacity is 78%, and only 66% for battery IL-2.

The results demonstrate that carbon-deposited cathode material of the present invention with very low sulfur content of sulfur impurities also benefit performances of lithium secondary batteries using ionic liquids as electrolyte.

Process B Examples

Comparative Example 1

Carbon-deposited LiFePO$_4$ (product of Pulead Technology Industry Co., grade P600A, 1.37 wt. % carbon content, D$_{90}$ of 4.9 μm) is nanomilled in deionized and deaerated water as carrier fluid with a Netschz MiniCer® stirred media mill, connected to a circulation tank, equipped with a ceramic grinding chamber to avoid metallic contamination, and filled with 400 μm yttria-stabilized zirconia beads. Water contains 0.5 wt. % Tween® 20 surfactant (polyoxyethylene (20) sorbitan monolaurate, product of Croda) relatively to P600A. After 120 mn with a grinding energy of 0.46 kWh per kg P600A (heat is removed through the walls of its milling compartment by cooling water), a sample of slurry (AC-1) transfer to a PSD analyzer demonstrate that LiFePO$_4$ particles with a median primary particle size of 184 nm are obtained, subsequent TEM analysis demonstrate that original carbon deposit is abraded from LiFePO$_4$ surface during nanomilling and remained in the material as a carbon residue. Water is evaporated under vacuum with a rotary evaporator and nanomilled LiFePO$_4$ is then subjected to drying in a vacuum oven at a temperature of 100° C. overnight. Then, the LiFePO$_4$ is deagglomerated in a laboratory rotor mill (Fritsch Pulverisette 14 equipped with "iron-free" conversion kit).

A liquid electrolyte battery with a metallic lithium anode is assembled as disclosed in example 5, cathode composition is LiFePO$_4$/binder/Ketjenblack EC-300J 70/10/20 wt. %, it is necessary to add relatively high amount of high surface area carbon to ensure percolation of conductive network with nanomilled low conductivity LiFePO$_4$. The capacity of the cathode of the battery expressed in mg of electroactive material per cm$^2$ of the surface of the cathode is 2.77 mg/cm$^2$. Electrochemical measurement at C/25 and 25° C. shows that 122 mAh/g of reversible capacity is realized.

30 g of nanomilled LiFePO$_4$ are placed in the furnace tube of a rotary kiln (product of Zhengzhou CY Scientific Instrument Co., type CY-R1200X-100IC), the mixture is then treated as disclosed in US 2002/0195591 A1 (example 2), therefore tube is flushed with dry argon and heat up to 200° C. at 10° C./mn, keeping the temperature for 30 mn and then subjected to thermal CVD process by flushing furnace tube with a mixture of 6% propene gas in argon. After heating up to 675° C. at 10° C./mn, keeping the temperature for 1 hour, carbon-deposited LiFePO$_4$ is obtained with 2.65 wt. % carbon, as determined by LECO measurement.

A liquid electrolyte battery with a metallic lithium anode is assembled, as disclosed in example 5, cathode composition is C—LiFePO$_4$/binder/carbon 88/6/6 wt. % (capacity 4.6 mg/cm$^2$). Electrochemical measurement at C/5 and 25° C. shows that 158 mAh/g of initial specific discharge capacity is realized. A liquid electrolyte lithium ion battery with a carbon anode and same cathode is also assembled (battery 1) as disclosed in example 5.

Comparative Example 2

P600A nanomilling is repeated as in comparative example 1, by replacing water by isopropanol as carrier fluid (slurry AC-2, LiFePO$_4$ particles with a D$_{50}$ of 186 nm are obtained), followed by subsequent thermal CVD process with propene gas to form carbon-deposited LiFePO$_4$ (2.73 wt. % carbon).

A liquid electrolyte battery with a metallic lithium anode is assembled, as disclosed in example 5, cathode composition is C—LiFePO$_4$/binder/carbon 88/6/6 wt. % (capacity 4.6 mg/cm$^2$). Electrochemical measurement at C/5 and 25° C. shows that 157 mAh/g of initial specific discharge capacity is realized. A liquid electrolyte lithium ion battery with a carbon anode and same cathode is also assembled (battery 2) as disclosed in example 5.

Figure 10:
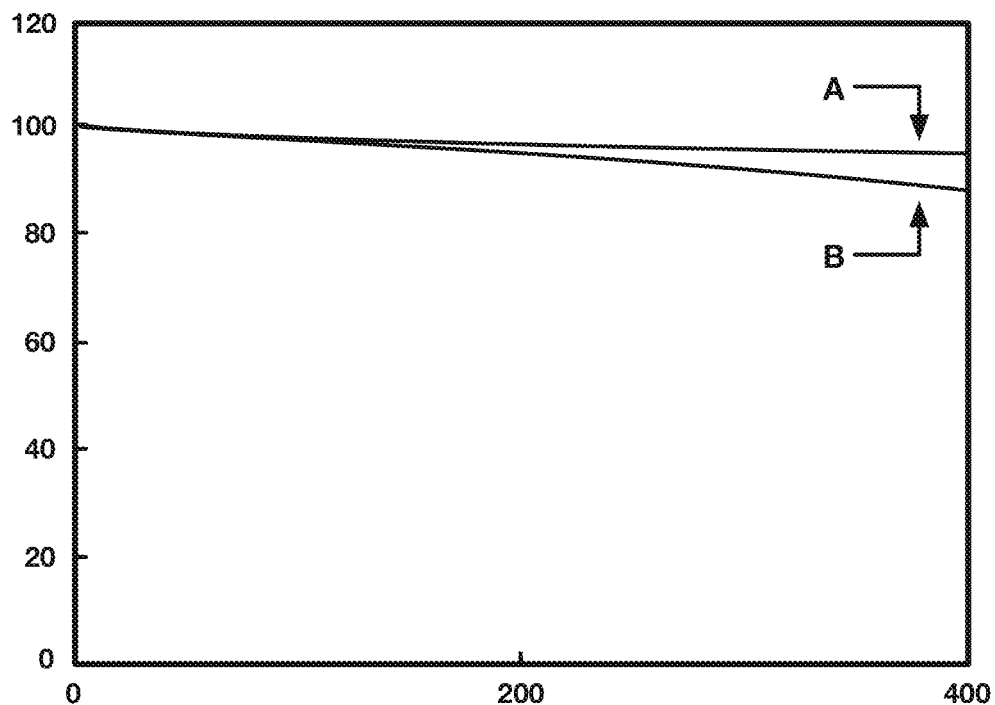
FIG. 10 represents cycling capability, determined at 60° C. and C/4 intentiostatic cycling, for two liquid electrolyte batteries with a carbon anode and C—LiFePO$_4$ as cathode material, as prepared in comparative example 1 and 2. Battery capacity (in mAh/g) is indicated on Y axis and cycle number is indicated on X axis, initial capacity is determined at C/5 and 25° C. with a lithium metal battery. Battery 1 is prepared with C—LiFePO$_4$ comprising a bead nanomilling step in water (curve B), battery 2 with C—LiFePO$_4$ comprising a bead nanomilling step in isopropanol (curve A).

Batteries 1 and 2 are then subjected to C/4 intentiostatic cycling at 60° C. between 2 and 3.6 Volt, cycling curves are represented in FIG. 10. The results demonstrate that capacity fading at 60° C. is reduced for the C—LiFePO$_4$ comprising a nanomilling synthesis step in isopropanol (curve A) instead of water (curve B).

Example 1

FePO$_4$.2H$_2$O (200 g, product of Changsha Hecom Chemical Co., battery grade, D$_{90}$ of 2.92 μm) and Li$_2$CO$_3$ (2:1 molar ratio, product of Chengdu Chemphys Chemical Industry Co., battery grade, D$_{90}$ of 2.84 μm), Brij® 35 (3.5 wt. % relatively to FePO$_4$.2H$_2$O, product of Croda), and deaerated isopropanol (50 wt. % of FePO$_4$.2H$_2$O content) are weighed and placed in a zirconia cylindrical container with 5 mm zirconia ball (ball-to-powder weight ratio of 2:1) and ground in a Retsch planetary ball mill PM 100 for 30 mn under an argon atmosphere at a rotation speed of 400 rpm. After grinding, the slurry is evaporated and dried under vacuum at 80° C. The mixture is then treated, as disclosed in US 2002/0195591 A1 (example 10), under a stream of dry, oxygen-free nitrogen in the furnace tube of a kiln (product of Zhengzhou CY Scientific Instrument Co., type OTF-1200X-III-SHG) with heating rate of 10° C./mn up to 600° C., keeping the temperature for 60 minutes.

Carbon-deposited material is obtained with 0.38 wt. % of carbon (as determined by LECO) and is composed as determined by XRD analysis of 75.2 wt. % of LiFePO$_4$ with remaining phases of Li$_3$PO$_4$ and Fe$_3$(PO$_4$)$_2$ with 1:1 molar ratio, Fe(III) is not detected by Mössbauer analysis, material is referred as material_a1. LiFePO$_4$ content can be express as dimensionless conversion rate ratio of as-obtained LiFePO$_4$ versus the theoretical amount, in present case conversion rate is 75.2%.

Synthesis is repeated by performing a dry milling under nitrogen of precursors in a tungsten carbide vial with 10 mm tungsten carbide balls (ball-to-powder weight ratio of 3:1) in Retsch planetary ball mill PM 100 for 60 mn under an argon atmosphere at a rotation speed of 300 rpm. After similar heat treatment, carbon-deposited material is obtained with 0.33 wt. % of carbon (as determined by LECO), LiFePO$_4$ conversion rate is 72.1%, with remaining phases of Li$_3$PO$_4$ and Fe$_3$(PO$_4$)$_2$ with 1:1 molar ratio, material is referred as material_a1_1.

A liquid electrolyte battery with a metallic lithium anode is assembled as disclosed in example 5, cathode composition is material_a1/binder/carbon 88/6/6 wt. % (capacity 4.5 mg/cm$^2$). Electrochemical measurement at C/5 (assuming a capacity equal to LiFePO$_4$ theorical capacity) and 25° C. shows that 67 mAh/g of initial specific discharge capacity is realized with a medium discharge voltage of 2.85 Volt. The results demonstrate that material_a1 present poor electrochemical properties.

Material_a1 is nanomilled in water as fluid carrier as in comparative example 1 with 300 μm yttria-stabilized zirconia beads (Tween® 20 surfactant, 90 mn nanomilling, 0.48 kWh per kg material_a1 grinding energy, non carbon-deposited nanomilled particles with a median primary particle size of 186 nm are obtained, slurry A) and in isopropanol as fluid carrier as in comparative example 2 with 300 μm yttria-stabilized zirconia beads (Tween® 20 surfactant, 90 mn nanomilling, 0.44 kWh per kg material_a1 grinding energy, non carbon-deposited nanomilled particles with a median primary particle size of 192 nm are obtained, slurry B). In both cases, abraded carbon from LiFePO$_4$ surface remains in the composition as a carbon residue.

Slurries A and B are spray dried with compressed nitrogen via a two fluid nozzle (product of Shanghai Pilotech, spray dryer model YC-015A with inert loop), during spray drying the gas inlet temperature is 200° C., the outlet temperature is 96° C. Gas phase carbon deposition is then performed on spray dried nanomilled material from slurries A and B, as in comparative example 1, but with a mixture of 3% acetylene gas in nitrogen instead of propylene/argon gas mixture, to obtained samples C-A and C-B. Carbon-deposited olivine LiFePO$_4$ (as determined by XRD) are obtained with carbon deposit content as resumed in Table 1 (as determined by LECO). Carbon deposit content is easily corrected of carbon residue content obtained during material_a1 synthesis by performing LECO measurement prior and after thermal CVD process.

TABLE 1

| Sample | C-A | C-B |
|---|---|---|
| C-deposit wt. % | 1.25 | 1.15 |
| $I_D/I_G$ ratio | 0.84 | 0.78 |

Thermal CVD processes are repeated on sample B (spray dried nanomilled material_a1 in isopropanol as fluid carrier) with different concentration of acetylene, propylene, and vaporized benzene in nitrogen and various flow of gas mixture flushing the tube. LECO measurements demonstrate that C—LiFePO$_4$ with carbon deposit content between 0.21 and 2.49 wt. % are obtained.

Carbon deposit process is also repeated on sample B (spray dried nanomilled material_a1 in isopropanol as fluid carrier) in a rotary batch reactor, suitable amount of propylene gas is injected in tube kiln, tube inlet/outlet gas valve closed, and thermal CVD process performed for 1 hour at 725° C. (C—LiFePO$_4$ with 1.09 wt. % carbon deposit).

Figure 11:
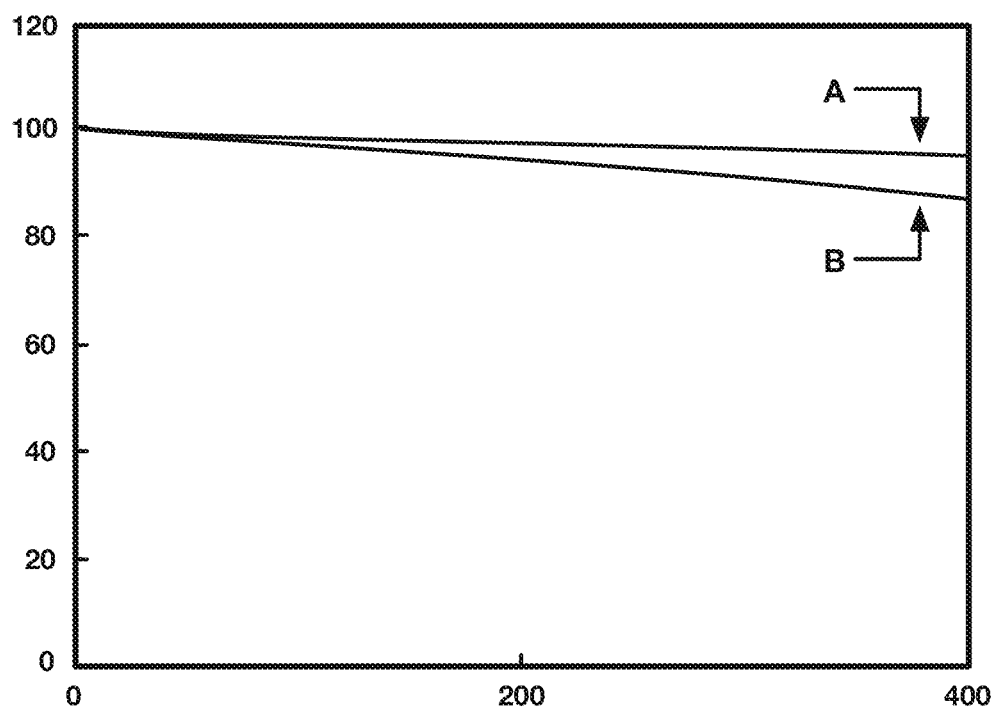
FIG. 11 represents cycling capability, determined at 60° C. and C/4 intentiostatic cycling, for two liquid electrolyte batteries with a metallic lithium anode and C—LiFePO$_4$ as cathode material, as prepared in example 1. Battery capacity (in mAh/g) is indicated on Y axis and cycle number is indicated on X axis, initial capacity is determined at C/5 and 25° C. with a lithium metal battery. Battery 3 is prepared with C—LiFePO$_4$ comprising a bead nanomilling step in water (curve B), battery 4 with C—LiFePO$_4$ comprising a bead nanomilling step in isopropanol (curve A).

Liquid electrolyte batteries with a metallic lithium anode are assembled as disclosed in example 5, cathode compositions are C—LiFePO$_4$/binder/carbon 88/6/6 wt. %. Electrode capacity and initial specific discharge capacity (1$^{st}$ discharge) determined by electrochemical measurement at C/5 are provided in Table 2. Liquid electrolyte lithium ion battery with a carbon anode and same cathode are also assembled (battery 3 with sample C-A and battery 4 with sample C-B) as disclosed in example 5. Batteries 3 and 4 are then subjected to C/4 galvanostatic cycling at 60° C. between 2 and 3.6 Volt, cycling curves are represented in FIG. 11. The results demonstrate that capacity fading at 60° C. is reduced for the C—LiFePO$_4$ comprising a nanomilling step in isopropanol (curve A) as carrier fluid instead of water (curve B).

TABLE 2

| Sample | C-A | C-B |
|---|---|---|
| Battery | 3 | 4 |
| Capacity (mg/cm$^2$) | 4.8 | 4.7 |
| 1$^{st}$ discharge (mAh/g) | 162 | 163 |

Synthesis equivalent to material_a1 are repeated with suitable precursors and stoichiometries to obtained C—LiFe$_{0.97}$Mg$_{0.03}$PO$_4$ (FePO$_4$.2H$_2$O, Li$_2$CO$_3$, and MgHPO$_4$, conversion rate 74%, 0.35 wt. % carbon C—LiFe$_{0.3}$Mn$_{0.7}$PO$_4$ (Fe$_{0.3}$Mn$_{0.7}$PO$_4$.2H$_2$O, Li$_2$CO$_3$, conversion rate 75%, 0.38 wt. % carbon), C—LiMnPO$_4$ (Mn$_3$(PO$_4$)$_2$, Li$_3$PO$_4$, conversion rate 69%, 0.27 wt. % carbon), with subsequent nanomilling and thermal CVD process.

Material_a1_1 (dry milling of precursors) is treated as material C-B (nanomilling in isopropanol as fluid carrier, spray drying, followed by thermal CVD process with acetylene as carbon source) to produce a material with similar characteristic, further used as a cathode material in a liquid electrolyte lithium ion battery with a carbon anode (cathode capacity 4.8 mg/cm$^2$, 1$^{st}$ discharge 164 mAh/g). Battery is subjected to C/4 galvanostatic cycling at 60° C. between 2 and 3.6 Volt. After 400 cycles, capacity relatively to initial specific discharge capacity is 7% lower for cathode material comprising a dry milling versus a wet milling of precursors.

Example 2

Material_a1 synthesis is repeated as in example 1, with various FePO$_4$.2H$_2$O batches (500 g FePO$_4$.2H$_2$O per synthesis), followed by alcohol-based nanomilling during 90 mn with 200 μm yttria-stabilized zirconia beads, and spray drying of suspension.

For each batch, 300 g of nanomilled material is placed in the furnace tube of a rotary kiln (product of Zhengzhou CY Scientific Instrument Co., type CY-R1200X-100IC), tube is flushed with dry nitrogen and heat up to 200° C. at 10° C./mn, keeping the temperature for 60 mn and then continuously flushed with a gas mixture of vaporized benzene and argon (containing 30% by volume of benzene). After heating up to 640° C. at 20° C./mn, keeping the temperature for 1 hour, carbon-deposited LiFePO$_4$ is obtained. Sulfur and carbon content in each batch is carried out by combustion analysis in a carbon/sulfur analyzer (sold by LECO Corporation), results are provided in table 3.

Liquid electrolyte lithium ion batteries with a carbon anode are assembled (battery 5a-9a and 5b-9b) as disclosed in example 5, using C—LiFePO$_4$ samples of table 3 as cathode material, cathode composition is C—LiFePO$_4$/binder/carbon 88/6/6 wt. %. Batteries 5a-9a are subjected to high temperature storage test, allowing accelerated degradation mechanism of batteries components and to evaluate influence of key-parameters.

Initial specific discharge capacities before storage are determined by electrochemical measurement at C/5 and 25° C. as provided in table 3. Then after charging up to 3.6 V at C/10 rate and 25° C., batteries are stored for 3 days at 85° C. and recovery discharge capacities after storage are determined at C/5 rate and 25° C., as provided in table 3.

TABLE 3

| Samples | C1 | C2 | C3 | C4 | C5 |
|---|---|---|---|---|---|
| Nanomilled material D$_{50}$ (nm) | 140 | 142 | 141 | 139 | 142 |
| C—LiFePO$_4$ D$_{50}$ (μm) | 7.2 | 7.4 | 7.6 | 7.3 | 7.5 |
| C—LiFePO$_4$ sulfur content (ppm) | 745 | 339 | 71 | 34 | 13 |
| C-deposit wt. % | 1.26 | 1.11 | 1.02 | 1.03 | 1.04 |
| S/C ratio (%) | 5.91 | 3.05 | 0.70 | 0.33 | 0.12 |
| BET | 7.8 | 6.8 | 6.2 | 6.1 | 6.1 |
| Battery | 5a/b | 6a/b | 7a/b | 8a/b | 9a/b |
| Capacity (mg/cm$^2$) | 4.7 | 4.6 | 4.6 | 4.6 | 4.7 |
| Specific capacity before storage (mAh/g) | 162 | 162 | 163 | 163 | 164 |
| Recovery capacity after storage (mAh/g) | 93 | 102 | 142 | 144 | 146 |

The results demonstrate that unexpectedly very low level of sulfur impurities in C—LiFePO$_4$ of the present invention is critical to ensure excellent C—LiFePO$_4$ electrochemical properties.

Figure 12:
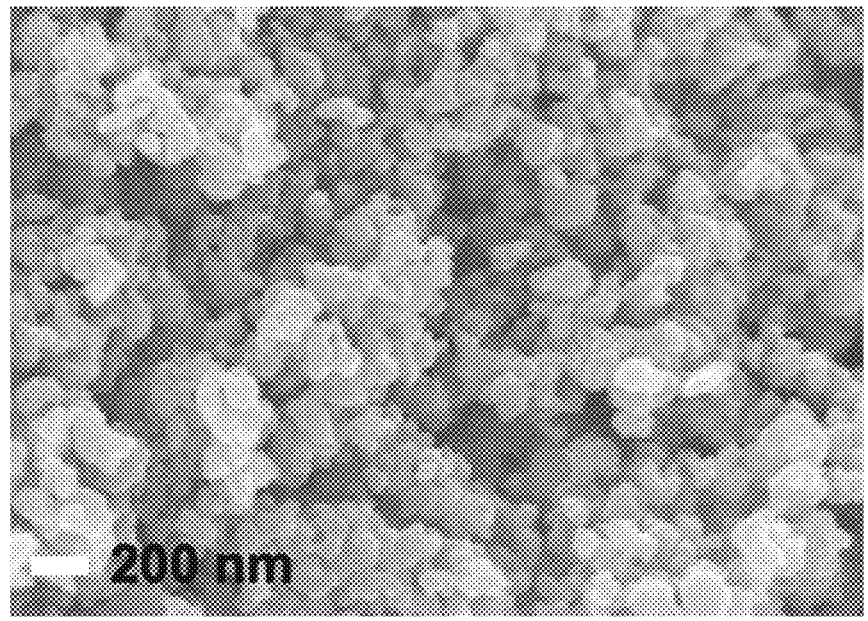
FIG. 12 represents the SEM microscopy observation of primary particles after bead nanomilling in isopropanol as fluid carrier, as prepared in example 2.
Figure 13:
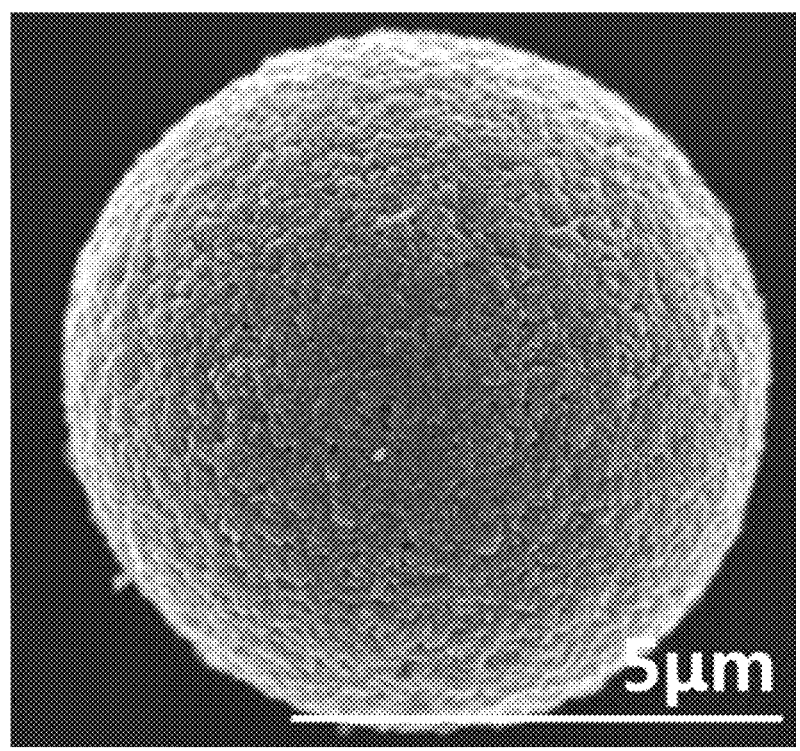
FIG. 13 represents the SEM microscopy observation of a carbon deposited secondary agglomerates of primary particles, as prepared in example 2.
Figure 14:
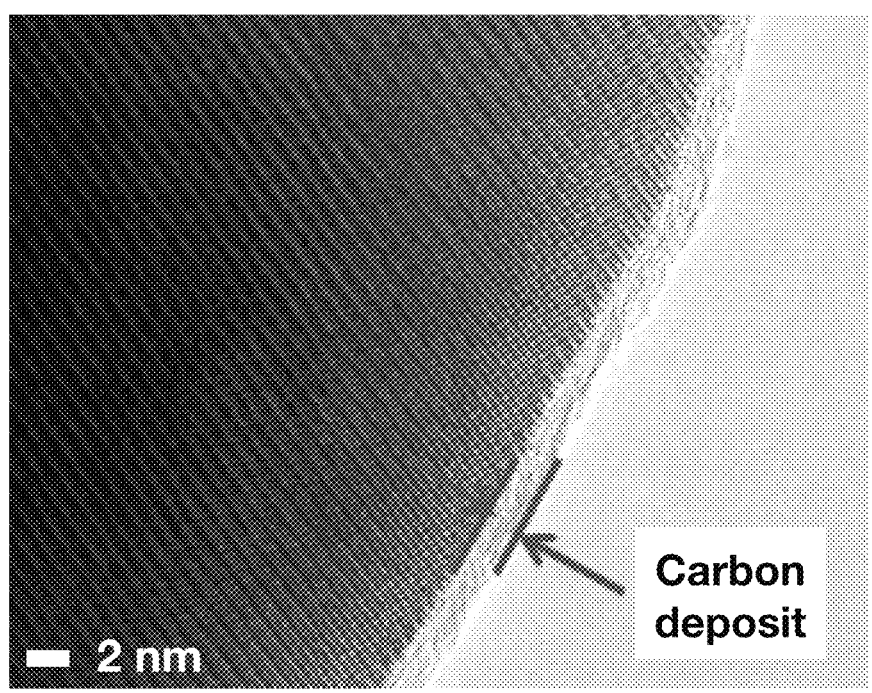
FIG. 14 represents the TEM image of a C—LiFePO$_4$ carbon deposit layer obtained by thermal CVD process with a gas-phase carbon source, as prepared in example 2.

For sample C5, SEM image of primary particles after nanomilling is provided in FIG. 12, SEM image of C—LiFePO$_4$ secondary agglomerates of primary particles in FIG. 13, and TEM image of carbon deposit in FIG. 14.

Carbon deposit purity of sample C5 as estimated by Raman analysis is superior to 99.9 wt. %.

Figure 15:
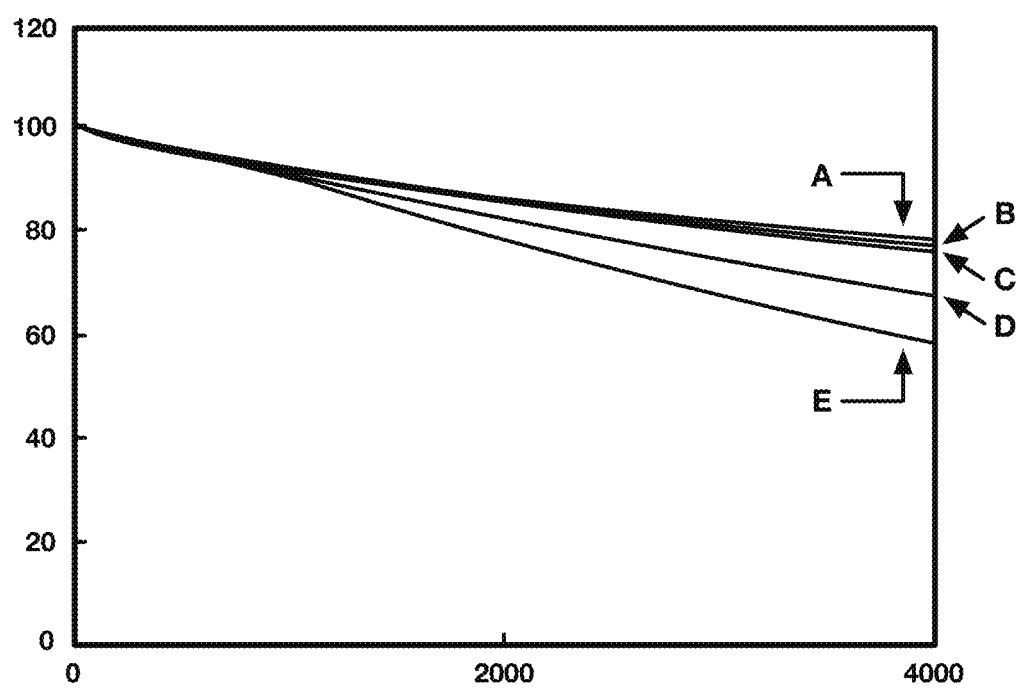
FIG. 15 represents cycling capability, determined at 60° C. and C/1 intentiostatic cycling, for five liquid electrolyte batteries with a carbon anode and C—LiFePO$_4$ as cathode material. Battery capacity (in mAh/g) is indicated on Y axis and cycle number is indicated on X axis, initial capacity is determined at C/5 at 25° C. Battery 5b is prepared with 745 ppm sulfur content C—LiFePO$_4$ (curve E), 6b with 339 ppm sulfur content (curve D), 7b with 71 ppm sulfur content (curve C), 8b with 34 ppm sulfur content (curve B), and 9b with 13 ppm sulfur content (curve A), as prepared in example 2.

Batteries 5b-9b are subjected to C/1 intentiostatic cycling at 60° C. between 2 and 3.6 Volt, cycling curves are represented in FIG. 15 (curve A for sample C5, B for C4, C for C3, D for C2, and E for C1). The results confirm that to produce carbon-deposited cathode material of the present invention with excellent performances at high temperature, very low sulfur impurities content in the material is essential.

All samples of present example are obtained with less than 100 ppm water content, and are further dry under vacuum at 300° C. for 48 hours to a water content of less than 10 ppm, and then exposed in an enclosure to an atmosphere with a 10% relative humidity provided by a humidity generator (product of Owlstone Inc., USA), while monitoring weight of samples. Water contents after 120 seconds exposure to humid atmosphere are provided in table 5.

TABLE 5

| Samples | C1 | C2 | C3 | C4 | C5 |
|---|---|---|---|---|---|
| Water content (ppm) | 411 | 256 | 81 | 63 | 43 |

The results demonstrate that very low level of sulfur impurities in C—$LiFePO_4$ of the present invention is favorable to limit water-uptake of the material. Without being bound to any theory, the inventors believe that hygroscopic species related to presence of sulfur impurities increase hydrophylicity of the surface.

Magnetic impurities are determined by agitating 150 g samples of C—$LiFePO_4$ in 400 ml isopropanol in presence of a Teflon-coated Fe—Nb—B bar magnet, followed by subsequent analysis of metallic content extract by magnet, prealably mineralized in acidic media, as determined by ICP-OES. Magnetization is determined by M-H curve measurement for selected C—$LiFePO_4$ sample. Magnetic impurities in ppb of iron relatively to mass of samples and spontaneous magnetization are provided in table 6.

TABLE 6

| Samples | C1 | C2 | C3 | C4 | C5 |
|---|---|---|---|---|---|
| Magnetic impurities (ppb) | 732 | 509 | 133 | 68 | 42 |
| Magnetization (emu/g) | 0.019 | / | 0.0013 | / | 0.0006 |

The results demonstrate that very low level of sulfur impurities in C—$LiFePO_4$ of the present invention is favorable to limit magnetic impurities content.

Zeta potential measurements are conducted for aqueous suspensions with a solid loading of 5 wt. % of C—$LiFePO_4$ samples at neutral pH with a ZetaProbe (product of Colloidal dynamics, USA), as provided in table 7.

TABLE 7

| Samples | C1 | C2 | C3 | C4 | C5 |
|---|---|---|---|---|---|
| Zeta potential (mV) | −32 | −29 | −14 | −9 | −5 |

The results demonstrate that very low level of sulfur impurities in C—$LiFePO_4$ of the present invention is favorable to reduce zeta potential absolute value of the carbon-deposited material of the present invention.

Equivalent synthesis of carbon-deposited material with various content of sulfur impurities are repeated with suitable precursors and stoichiometries to obtained C—$LiFe_{0.97}Ca_{0.03}PO_4$ ($FePO_4.2H_2O$, $Li_2CO_3$, and $CaHPO_4$, C-deposit content between 0.86 and 1.01 wt. %, sulfur content between 10 and 686 ppm), C—$LiFe_{0.29}Mn_{0.68}Zn_{0.03}PO_4$ ($Fe_{0.29}Mn_{0.68}Zn_{0.03}PO_4.2H_2O$, $Li_2CO_3$, C-deposit content between 0.91 and 0.96 wt. %, sulfur content between 9 and 734 ppm), C—$LiMnPO_4$ ($Mn_3(PO_4)_2$, $Li_3PO_4$, C-deposit content between 0.89 and 0.96 wt. %, sulfur content between 12 and 603 ppm). High temperature storage and cycling, measurements of water-uptake, magnetic impurities content, spontaneous magnetization, and zeta potential similarly conclude that sulfur impurities content of less than 80 ppm and preferably S/C ratio of less than 0.8% are beneficial to the performances of the carbon-deposited material of the present invention.

As comparative experiments, ten batches of $LiFePO_4$ are prepared by adding at 25° C. under stirring a 0.3 M $LiOH.H_2O$ aqueous solution to a solution of 0.1 M $FeSO_4.7H_2O$ and 0.1 M $H_3PO_4$ in 50 vol % water and 50 vol % DMSO. Then the temperature of the solution is increased up to the solvent's boiling point, which is 108 to 110° C., whereby $LiFePO_4$ begins to precipitates. After one hour, the precipitate is filtered and washed with $H_2O$. A thermal treatment is finally performed by putting the dry precipitate at 500° C. for 3 hours in a slightly reducing $N_2/H_2$ (95/5) gas flow. A thermal CVD step is then performed on as-obtained ten batches in the furnace tube of a rotary kiln (product of Zhengzhou CY Scientific Instrument Co., type CY-R1200X-100IC), tube is flushed with dry nitrogen and heat up to 200° C. at 10° C./mn, keeping the temperature for 60 mn and then continuously flushed with a gas mixture of vaporized benzene and argon (containing 3% by volume of benzene). After heating up to 640° C. at 20° C./mn, keeping the temperature for 1 hour, carbon-deposited $LiFePO_4$ is obtained. Sulfur and carbon content in each batch is carried out by combustion analysis in a carbon/sulfur analyzer (sold by LECO Corporation). C—$LiFePO_4$ batches with carbon deposit content between 0.92 and 1.08 wt. %, and sulfur impurities content between 24 and 682 ppm are obtained. High temperature storage and cycling, similarly conclude that sulfur impurities content of less than 80 ppm and preferably S/C ratio of less than 0.8% are beneficial to the performances of the $LiFePO_4$ including a carbon deposit obtained by a thermal CVD process with a gas-phase carbon source.

Example 3

Material_a1 synthesis is repeated as in example 1, with high purity $FePO_4.2H_2O$ (100 kg), battery grade $Li_2CO_3$ (1:2 molar ratio), and Pluronic® P-123 (2 wt. % versus $FePO_4.2H_2O$, poly(ethylene glycol)-poly(propylene glycol)-poly(ethylene glycol) triblock copolymers, product of BASF) precursors, milled under nitrogen in 200 liters deaerated methanol with a MasterMill 18 submersible basket mill (product of Netzsch). After solvent evaporation, material (referred as material_a3) is placed in ceramic crucibles and treated under a stream of dry, oxygen-free nitrogen in a roller hearth kiln at 600° C. for 60 minutes, and further cooled and stored under nitrogen.

Carbon-deposited material is obtained with 0.35 wt. % of carbon (as determined by LECO) and is composed as determined by XRD analysis of 73.7 wt. % of $LiFePO_4$ with remaining phases of $Li_3PO_4$ and $Fe_3(PO_4)_2$ with 1:1 molar ratio, Fe(III) is not detected by Mössbauer analysis.

A 2 kg batch of material_a3 is further nanomilled in deaerated isopropanol as carrier fluid with a Netschz Alpha® 8 Neos® stirred media mill, connected to a circulation tank, equipped with a ceramic grinding chamber to avoid metallic contamination, and filled with 100 μm yttria-stabilized zirconia beads. Isopropanol contains 1 wt. % Carbowax™ polyethylene glycol 4000 surfactant (product of Dow Chemical) relatively to P600A. Nanomilling is performed during 60 mn with a grinding energy of 0.34 kWh per kg material_a3, heat is removed through the walls of its milling compartment by cooling water.

Slurry is spray dried with compressed nitrogen in a closed-cycle design MOBILE MINOR™ spray dryer equipped with a COMBI-NOZZLE™ (products of GEA Niro), during spray drying the gas inlet temperature is 275° C., the outlet temperature is 105° C. Spray dried material is then dried under vacuum at 100° C. for 24 hours and stored under nitrogen (referred as material_a3_1). Gas phase carbon deposition is continuously performed in a rotary kiln equipped with a carbon tube continuously flushed with a gas mixture of 10% propylene in nitrogen on a batch of material_a3_1, with heating zone at 640° C., spray dried material is supplied by a controlled screw feeder, and stored under nitrogen at the exit of the kiln. Carbon-deposited $LiFePO_4$ is obtained with characteristics as disclosed in table 8.

TABLE 8

| Sample D1 | | | |
|---|---|---|---|
| Nanomilled median primary particle size (nm) | 92 | L/D | 1.05 |
| Nanomilled particle PSD span | 1.42 | BET (m$^2$/g) | 7.6 |
| C—$LiFePO_4$ $D_{50}$ (μm) | 7.2 | Conductivity (S · cm$^{-1}$) | 0.12 |
| C—$LiFePO_4$ porosity (%) | 26 | Water content (ppm) | 82 |
| C-$LiFePO_4$ sulfur content (ppm) | 29 | Magnetic impurities (ppb) | 86 |
| C-deposit wt. % | 0.95 | Tap density (g/cm$^3$) | 1.67 |
| $I_D/I_G$ ratio | 0.75 | Press density (g/cm$^3$) | 2.65 |
| S/C ratio (%) | 0.31 | Specific initial capacity (mAh/g) (a) | 165.6 |

(a) as determined with a lithium metal battery as disclosed in example 1

Spray drying experiments are repeated with a spray dryer NL-5 equipped with a RJ-5 Twin Jet nozzle (products of Ohkawara Kakohki Co.) with inlet temperatures between 200 and 250° C., to produce secondary agglomerates of primary particles C—$LiFePO_4$ with a $D_{50}$ between ca. 2 and 20 μm and a L/D spherical shape between ca. 0.95 and 1.05.

Liquid electrolyte lithium ion batteries with a carbon anode are assembled (batter 10-11) as disclosed in example 5, using C—$LiFePO_4$ sample D1 as cathode material, cathode composition is C—$LiFePO_4$/binder/carbon 88/6/6 wt. %.

Battery 10 is subjected at 25° C. to ragone test at intentiostatic discharge rate of C/5, C, 5 C, and 10 C, charge rate is maintained at C/5. The results are provided in table 9.

TABLE 9

| C-rate | C/5 | C | 5C | 10C |
|---|---|---|---|---|
| Specific cathode capacity (mAh/g) | 164.8 | 147.9 | 139.2 | 113.6 |

Figure 16:
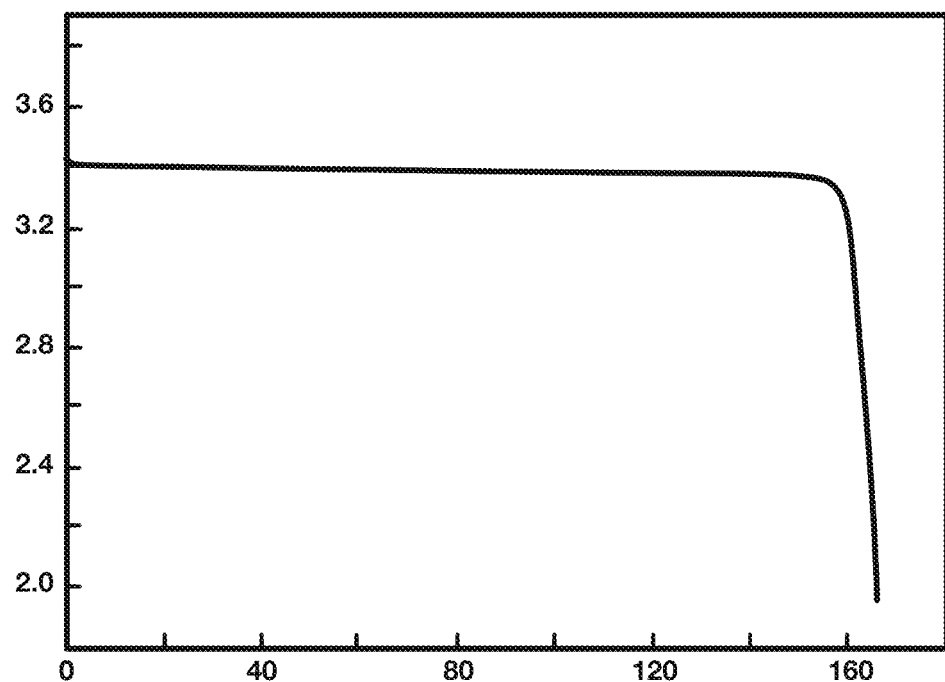
FIG. 16 represents cathode capacity, determined at 25° C. and C/5 discharge rate, for liquid electrolyte battery with a carbon anode and C—LiFePO$_4$ as cathode material. Battery voltage (in Volt vs Li$^+$/Li) is indicated on Y axis and capacity (in mAh/g) is indicated on X axis. Battery 10 is prepared with C—LiFePO$_4$ sample D1, as prepared in example 3.

Discharge curve for discharge at C/5 rate is provided in FIG. 16.

Battery 11 is subjected at −20° C. to intentiostatic discharge rate of C/5, charge rate is maintained at C/5, specific cathode capacity of 112.1 mAh/g is obtained.

Synthesis of sample D1 is repeated, but material_a3 nanomilling is performed in methanol and ethanol instead of isopropanol as fluid carrier, providing carbon deposited cathode material with equivalent performances.

Nanomilling, spray drying and thermal CVD process are repeated on numerous material_a3 2 kg batches while modifying process parameters (like nanomilling beads size, time, alcohol chemistry, effective energy, and surfactants, spray drying inlet/outlet temperatures, and nozzles, thermal CVD carbon source) allowing preparation of C—$LiFePO_4$ with different characteristics.

Gas phase carbon deposition is also performed at 700° C. on a batch of material_a3_1 in a fluidized bed reactor, where a gas distributor is used at the bottom of the reactor to homogeneously distribute the gas flow, and a blade stirrer to prevent the occurrence of a gas channel. By adjusting the gas flow rate and the rotating speed, a stable fluidization can be obtained. The reaction is performed during 40 min, with 25% vaporized toluene in nitrogen with a total flow rate of 400 ml/min, to provide a cathode material with a uniform ca. 2 nm graphene-like carbon deposit.

All those experiments shows that it possible to achieve, without any limitation, primary particle size with a median size of 25 to 250 nm, primary particle size distribution with a span of less than 2.5 to 0.5, C—$LiFePO_4$ carbon deposit of 0.2 to 2.5 wt. %, carbon deposit $I_D/I_G$ of less than 0.9 to 0.6, graphene-like deposit of 1 to 8 layers, powder conductivity of more than $5·10^{-2}$ to $5·10^{-1}$ S·cm$^{-1}$, sulfur impurities content of less than 80 to 20 ppm, magnetic impurities of less than 300 to 50 ppb, water content of less than 200 to 20 ppm, secondary agglomerates of primary particles with BET of less than 11 to 5 m$^2$/g, porosity of 5 to 40%, $D_{50}$ of 2 to 30 μm, span of less than 3 to 1, powder press density of more than 2.4 to 2.8 g/cm$^3$.

Qualification of batteries using various batches of C—$LiFePO_4$ of present invention as cathode material shows that it is possible to achieve at 25° C. capacity in the range of 159-169 mAh/g at a discharge rate of C/5, 145-155 mAh/g at a discharge rate of 1 C, 130-145 mAh/g at a discharge rate of 5 C, and at −20° C. capacity in the range of 100-140 mAh/g at a discharge rate of C/5.

Those values depend on many parameters such as careful optimization of battery electrode manufacturing, electrode calendaring, and electrolyte composition. Machine made industrial batteries confirm it is possible for example to reach 20 C/1 C capacity superior to 90% at 25° C.

Synthesis of sample D1 is repeated, propylene as thermal CVD carbon source is replaced by a gas stream obtained by cracking of polyethylene (PE) chunks in a pyrolysis reactor at 600° C. under a stream of nitrogen. A further experiment is performed with an additional reforming step in a catalyst reactor wherein cracked polyethylene gas stream is further passed through Y-zeolite catalyst bed at 600° C., total aromatic content increase to around 39 wt. % from around 0.5%. The results are provided in table 10.

TABLE 10

| Thermal CVD carbon source | PE cracking | PE cracking + reforming |
|---|---|---|
| Carbon source aromatic content (wt. %) | 0.42 | 39.3 |
| C-deposit content (wt. %) | 1.11 | 1.14 |
| C-deposit $I_D/I_G$ | 0.82 | 0.70 |
| C-deposit conductivity (S · cm$^{-1}$) | 0.073 | 0.134 |

Synthesis of sample D1 is repeated with addition of 2 wt. % Colour Black FW 200 (product of Orion Engineered Carbons GmbH) relatively to material_a3 prior nanomilling step. After spray drying and thermal CVD step, as-obtained C—LiFePO$_4$ powder press density is improved by 8.7% and a lithium ion battery similar to battery 11 shows an improvement of 6.8% of specific cathode capacity when subjected at −20° C. to intentiostatic discharge rate of C/5.

Synthesis of sample D1 is repeated with the addition of 0.25 wt. % of phenyltrimethoxysilane relatively to material_a3 prior to nanomilling step. After spray drying and thermal CVD step, a lithium ion battery similar to battery 10 using this material benchmark with a lithium ion battery using sample D1 as cathode material shows a 9.3% reduction of capacity fading after 2000 cycles when subjected to CR intentiostatic cycling at 60° C. between 2 and 3.6 Volt. Experiment is repeated with addition of 1 wt. % Tyzor® NPZ (n-propyl zirconate in n-propanol, product of Dorf Ketal Chemicals), providing also a beneficial reduction of capacity fading after 2000 cycles at 60° C.

Synthesis of sample D1 is repeated, but prior to nanomilling step, material_a3 is pre-milled during 15 minutes in a Q-03 metal-free circulation attritor filled with 6 mm yttria-stabilized zirconia beads (product of Union Process), $D_{90}$ is reduced to 1.1 μm from an initial value of 22 μm, followed by nanomilling of slurry in Netschz Alpha® 8 Neos® stirred media mill for 40 minutes. Nanomilled particles with a similar median particle size of 94 nm are obtained but particle size distribution span is reduced to 1.03. Moreover, total specific grinding energy is reduced by 28% with pre-milling step and wearing of costly fine nanomilling beads (as determined by content of zirconium after nanomilling in slurry by ICP-OES analysis) is reduced by 36%, with a favorable impact on process cost. After processing similar to sample D1 (spray drying and thermal CVD), a ragone test performed in a lithium ion battery similar to battery 10, demonstrates that nanomilled particles reduce particle size distribution span improves material power performances, for example at a discharge rate of 10 C, cathode capacity is improved by ca. 17%.

Through nanomilling process parameters optimization (such as size of beads, beads loading, material_a loading, multi-stage nanomilling mode of operation, pre-milling stage, surfactants selection, nanomilled material median particle size, or milling energy), inventors demonstrate that is possible to performed synthesis of nanomilled material_a with a span between 0.3 and 3.

Synthesis of sample D1 is repeated, but nanomilled material_a3 (effective grinding energy 0.49 kWh per kg material_a3) is recovered in a filter press, the filter cake dried under vacuum at 100° C. for 24 hours, and stored under nitrogen. Weakly agglomerated nanomilled particles with a 81 nm median primary particle size are obtained, and further subjected to a thermal CVD step at 650° C. with vaporized benzene/nitrogen gas mixture as carbon source. C—LiFePO$_4$ is obtained as sample D2 with a carbon deposit content of 1.4 wt. %, a BET of 13.3 m$^2$/g, a sulfur content of 33 ppm, an $I_D/I_G$ ratio of 0.68, a conductivity of 0.14 S·cm$^{-1}$, a press density of 2.44 g/cm$^3$, a water content of 34 ppm, a magnetic impurities content of 96 ppb.

Synthesis equivalent to material_a3 and related experiments are repeated with suitable precursors and stoichiometries to obtained C—LiFe$_{0.97}$Zn$_{0.03}$PO$_4$, C—LiFe$_{0.3}$Mn$_{0.7}$PO$_4$, C—LiFe$_{0.33}$Mn$_{0.64}$Mg$_{0.03}$PO$_4$, C—LiFe$_{0.08}$Mn$_{0.88}$Co$_{0.04}$PO$_4$, C—LiMnPO$_4$, with subsequent nanomilling and thermal CVD process, confirming benefits of carbon-deposited material of the present invention.

Example 4

A hybrid electrode coating (referred as coating 4.1) is prepared as in example 5, using C—LiFePO$_4$ sample D2 of example 3 mixt with LiCoO$_2$ (LCO 983HA, product of Pulead, $D_{50}$ of 14.3 μm, 95 wt. % of total cathode material), cathode composition is (LCO:C—LiFePO$_4$)/binder/carbon 88/6/6 wt. %. A similar reference electrode coating (referred as coating 4.2) with only LCO 983HA as cathode material is also prepared. A further hybrid electrode coating (referred as coating 4.3) with same composition is also prepared with a C—LiFePO$_4$ similar to sample D2, except that sulfur content is 386 ppm (referred as sample D3).

Figure 17:
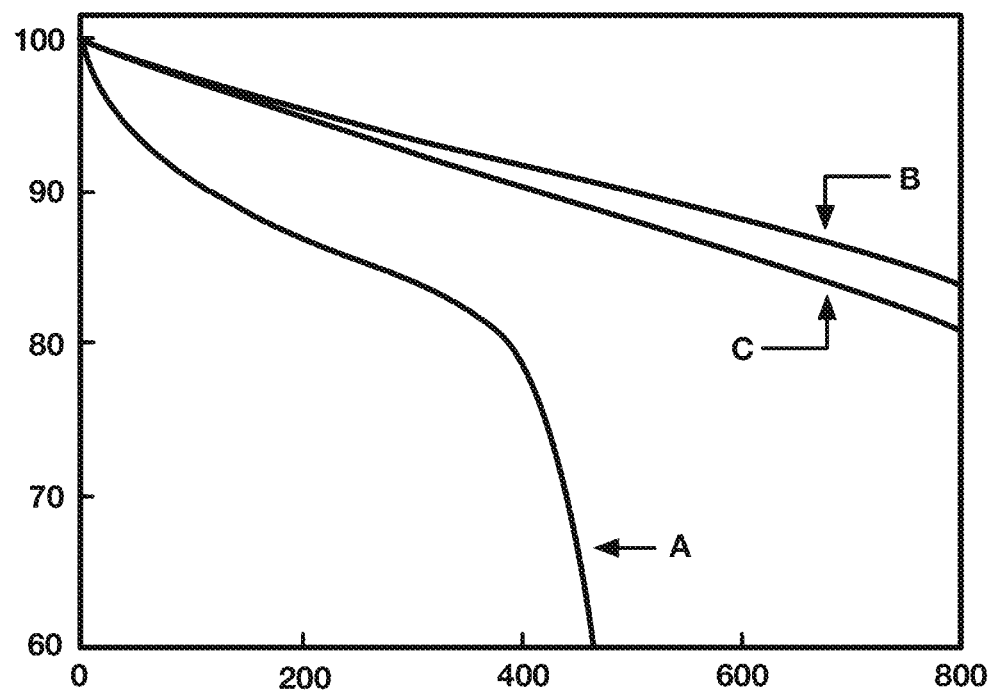
FIG. 17 represents cycling capability, determined at 60° C. and C/1 intentiostatic cycling, for three liquid electrolyte batteries with a carbon anode, and either hybrid electrode with LCO and C—LiFePO$_4$ as cathode material, or bare LCO as cathode material. Battery capacity (in mAh/g) is indicated on Y axis and cycle number is indicated on X axis, initial capacity is determined at C/5 at 25° C. Curve A illustrates cycling capabilities of bare LCO as cathode material, curve B of hybrid electrode with C—LiFePO$_4$ (33 ppm sulfur content) and LCO as cathode material, and curve C of hybrid electrode with C—LiFePO$_4$ (386 ppm sulfur content) and LCO as cathode material, as prepared in example 4.

Liquid electrolyte lithium ion batteries with a carbon anode are assembled as disclosed in example 5, batteries are subjected to C/1 intentiostatic cycling at 60° C. between 2.6 and 4.35 Volt. Cycling curves for coating 4.1 (curve B), 4.2 (curve A), and 4.3 (curve C) are provided in FIG. 17.

The results demonstrate that carbon-deposited cathode material of the present invention used as a coating for oxides cathode benefits of very low content of sulfur impurities, to maintain excellent performances at high temperature.

Similar batteries (3) with coating 4.1 (hybrid cathode) and 4.2 (bare LCO) are subjected to nail test (1 m/mn) at 60° C. after charging at 4.3 Volt (C/10 rate), batteries with hybrid cathode pass test (0/3 failure), those with bare LCO fail test (3/3 failure) with rapid ignition of cells.

Similar electrodes coating and corresponding lithium ion batteries are prepared by replacing LCO 983HA with core-shell Li$_{1.05}$Mg$_{0.025}$NiO$_2$ coated with a LiCoO$_2$ layer (referred as core-shell substituted LNO, as prepared according to example 7 of U.S. Pat. No. 7,381,496, 5 mol % LiCoO$_2$, 92 wt. % of total cathode material for hybrid electrodes with samples D2 and D3). Hybrid electrodes with C—LiFePO$_4$ samples D2 and D3 presents better cycling capabilities (C/1 intentiostatic cycling at 60° C. between 2.8 and 4.3 Volt), capacity fading after 300 cycles for hybrid electrodes is reduced by 88% (sample D2) and 72% (sample D3) relatively to electrode using bare core-shell substituted LNO cathode material.

Synthesis of sample D2 of example 3 is repeated but instead of thermal CVD step, nanomilled material_a3 obtained after filter press is mixed in water with 6 wt. % of lactose. After drying, carbon deposit is obtained by heat treatment at 700° C. for 1 hour under a stream of nitrogen, C—LiFePO$_4$ (referred as Sample Dref) is obtained with a carbon deposit content of 1.32 wt. % and a conductivity of around 10$^{-3}$ S·cm, and used to prepare equivalent hybrid electrodes coating and lithium ion batteries.

Lithium ion batteries using similar (LCO:C—LiFePO$_4$) hybrid electrode coating with respectively C—LiFePO$_4$ samples D2 and Dref are used to performed DC impedance measurement at 3.7 Volt with increasing discharge rate at 25° C., results are provided in table 11 relatively to DC impedance of similar lithium ion battery at 3.7 Volt using bare LCO 983HA, ratio of sample D2 and Dref conductivity relatively to LCO 983HA (σ_carbon/σ_ox) is also provided.

TABLE 11

| C-rate | 1 C | 5 C | 10 C | 20 C | 30 C | σ_carbon/σ_ox |
|---|---|---|---|---|---|---|
| Relative DC impedance D2 (%) | <2 | <3 | −4 | −6 | −22 | >10 |
| Relative DC impedance Dref (%) | 6 | 18 | 34 | 98 | 234 | <10$^{-1}$ |

The results demonstrate that carbon-deposited cathode material of the present invention used as a coating for oxides cathode benefits of its high conductivity and improves power performances of batteries using such hybrid electrodes.

Similar electrodes coating and corresponding lithium ion batteries are prepared by replacing LCO 983HA with a full concentration gradient (FCG) NMC811 oxide cathode material (product of Posco®, 92 wt. % of total cathode material for hybrid electrode with sample D2), corresponding batteries are subjected to storage trials for 3 days at 85° C., with procedure as disclosed in example 2 (after charging at 4.35 Volt, 25° C., and C/10 rate). Hybrid electrode presents better storage capabilities, capacity loss after storage of hybrid electrode is reduced by 71% relatively to electrode using bare FCG NMC811 cathode material. Similar storage trial with hybrid electrode using C—LiFePO$_4$ sample D3 (356 ppm sulfur content) instead of sample D2 (33 ppm sulfur content) confirms benefit of very low content of sulfur impurities. Performances of lithium ion batteries can be improved by using FCG NMC811 with a surface treatment, for example with an aluminum oxide coating obtained by atomic layer deposition (ca. 15 nm Al$_2$O$_3$ deposit obtained from trimethylaluminum precursor in a batch fluidized bed reactor), while maintaining benefit on storage at high temperature of hybrid electrode with very low sulfur carbon-deposited material of the present invention.

A hybrid electrode coating for a PHEV battery is prepared as in example 5, using a C—LiFePO$_4$ sample spray dried in NL-5 spray dryer (product of Ohkawara Kakohki Co., D$_{50}$ of 3.7 µm, sulfur content of 38 ppm) as disclosed in example 3, mixt with NMC532 (product of Ecopro Co., 88 wt. % of total cathode material), cathode composition is (NMC532: C—LiFePO$_4$)/binder/carbon 88/6/6 wt. %. A similar reference electrode coating with bare NMC532 as cathode material is also prepared. A further hybrid electrode coating with same composition is also prepared with a similar C—LiFePO$_4$ sample (D$_{50}$ of 3.6 µm), except that sulfur content is 251 ppm.

Figure 18:
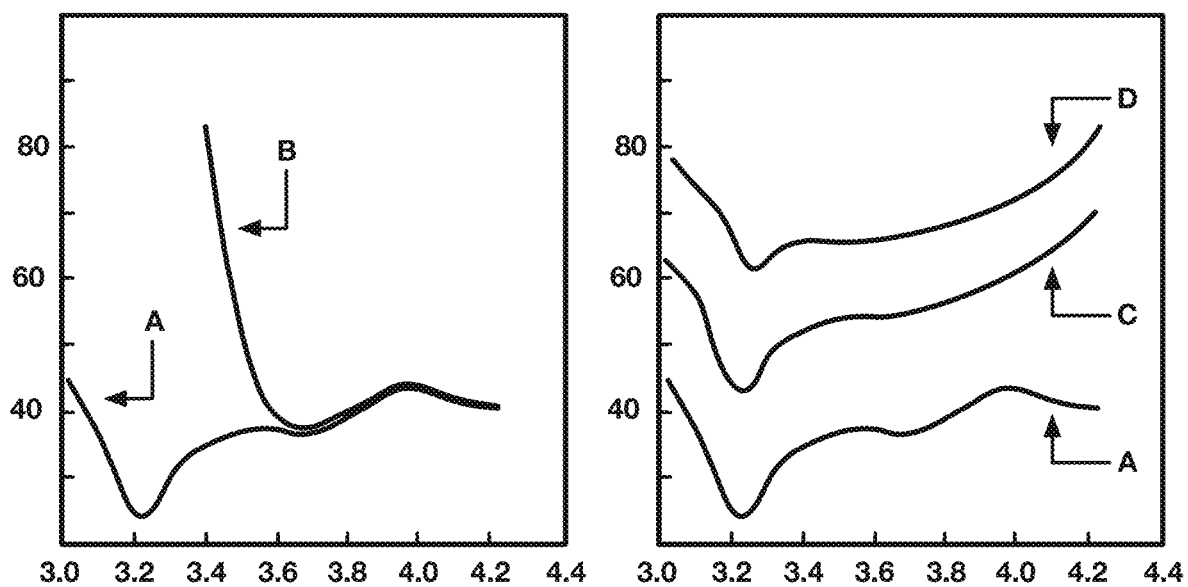
FIG. 18 represents hybrid pulse power capability (HPPC) determined at 25° C. for 10 seconds 3C pulse charge rate, for three liquid electrolyte batteries with a carbon anode, and either hybrid electrode with NMC532 and C—LiFePO$_4$ as cathode material, or bare NMC532 as cathode material. Battery voltage (in Volt vs Li$^+$/Li) is indicated on Y axis and area specific impedance (ASI in Ω·cm$^2$) is indicated on X axis. Curve A illustrates HPPC input data of hybrid electrode with C—LiFePO$_4$ (38 ppm sulfur content) and NMC532 as cathode material, curve B of bare NMC532 as cathode material, curve C of same hybrid electrode after 200 cycles at 60° C. and C/1 intentiostatic cycling, and curve D for hybrid electrode with C—LiFePO$_4$ (251 ppm sulfur content) and NMC532 as cathode material after 200 cycles at 60° C. and C/1 intentiostatic cycling, as prepared in example 4.

HPPC pulse power performances (3 C, 10 seconds charge pulse, 25° C.) experiments are then performed on lithium ion batteries as disclosed in example 5. HPPC results (area specific impedance ASI in Ω·cm$^2$ versus cell voltage) are provided in FIG. 18 for hybrid electrode (low sulfur cathode material) and bare NMC532 electrode, respectively on curves labeled A and B, result for hybrid electrode with high sulfur cathode material is similar to low sulfur one. HPPC experiments are repeated after 200 cycles at 60° C. (C/1 intentiostatic cycling between 2.8 and 4.4 Volt), results are provided on FIG. 18 for hybrid electrode on curve C (low sulfur), and curve D (high sulfur). The results demonstrate that carbon-deposited cathode material of the present invention benefits of very low content of sulfur impurities, to maintain excellent performances at high temperature, while high conductivity of carbon deposit improved charge and discharge pulse power performances at low state of charge (SOC) as measured by lower ASI value.

Example 5

Preparation of Lithium Metal Liquid Electrolyte Batteries

Lithium metal liquid electrolyte batteries are prepared according to the following procedure. At least one cathode material of the present invention, HFP-VF$_2$ copolymer (Kynar® HSV 900, supplied by Atochem) and an EBN-1010 graphite powder (supplied by Superior Graphite) are ball milled in a jar mill with zirconia beads in N-methylpyrrolidone (NMP) for 10 hours in order to prepare a slurry, and to obtain a dispersion composed of the cathode/HFP-VF$_2$/ graphite 80/10/10 by weight mixture. The mixture obtained was subsequently deposited, using a Gardner® device, on a sheet of aluminum carrying a carbon-treated coating (supplied by Exopack Advanced Coating) and the film deposited was dried under vacuum at 80° C. for 24 hours and then stored in a glovebox. Batteries of the "button" type were assembled and sealed in a glovebox, use being made of the carbon-treated sheet of aluminum carrying the coating comprising the cathode material of present invention, as battery cathode, a film of lithium, as anode, and a separator having a thickness of 25 µm (supplied by Celgard) impregnated with a 1M solution of LiPF$_6$ in an EC/DEC 3/7 mixture.

Lithium ion liquid electrolyte batteries are prepared according to the following procedure. At least one cathode material of the present invention, HFP-VF$_2$ copolymer (Kynar® HSV 900, supplied by Atochem) and an EBN-1010 graphite powder (supplied by Superior Graphite) are ball milled in a jar mill with zirconia beads in N-methylpyrrolidone (NMP) for 10 hours in order to prepare a slurry, and to obtain a dispersion composed of the cathode/HFP-VF$_2$/ graphite 80/10/10 by weight mixture. The mixture obtained was subsequently deposited, using a Gardner® device, on a sheet of aluminum carrying a carbon-treated coating (supplied by Exopack Advanced Coating) and the film deposited was dried under vacuum at 80° C. for 24 hours and then stored in a glovebox. Batteries of the "button" type were assembled and sealed in a glovebox, use being made of the carbon-treated sheet of aluminum carrying the coating comprising the cathode material of present invention, as battery cathode, a film of lithium, as anode, and a separator having a thickness of 25 µm (supplied by Celgard) impregnated with a 1M solution of LiPF$_6$ in an EC/DEC 3/7 mixture.

Example 6

Machine-made pouch cells (300 mAh) with C—LiFePO$_4$ sample spray dried in NL-5 spray dryer (product of Ohkawara Kakohki Co., D$_{50}$ of 3.9 µm, sulfur content of 36 ppm) as disclosed in example 3, coated on NMC622 (product of Umicore, 92% of total cathode material) as cathode material and graphite as anode material are obtained dry, without electrolyte. Additional pouch cells with same composition are also prepared with a similar C—LiFePO$_4$ sample (D$_{50}$ of 3.3 µm) except that sulfur content is 476 ppm. Cells are subsequently cut below the seal and vacuum dried at 80° C. for 14 hours prior to filling with electrolyte. The pouch cells are filled with 1.07 mL LBC3033 electrolyte (product of Shenzhen CAPCHEM Technology Co., solution of LiPF$_6$ in EC/EMC/DEC with vinylidene carbonate as additive) with as additional additive LiFSI (IONEL LF-101, product of Nippon Shokubai Co., 20 mol % of LiPF$_6$ content), in an argon-filled glove box and sealed in the same glove box under vacuum. After electrolyte filling, cells are placed in a 25° C. temperature controlled box, and held at 1.5 V for 24 hours. They are then charged to 3.5 V at C/20 and transferred to a glove box for degassing (cut open below the seal and re-sealed under vacuum). After degassing, they are charged to 4.4 V and then discharged to 2.8 V (C/10 rate), to measure initial specific discharge capacities, and charged back to the same upper charge cutoff voltage. After measurement of cells thickness and resistance, they are finally held at 4.4 V for 1 week at 60° C. Recovery discharge capacities after storage are determined at C/10 rate and 25° C., as well as thickness and resistance of the cells, and provided in table 12 (relatively to measurements prior storage test at 60° C.).

TABLE 12

| | | |
|---|---|---|
| C—LiFePO$_4$ sulfur content (ppm) | 476 | 36 |
| Recovery capacity after storage (%) | −3.9 | −1.6 |
| Cell thickness after storage (%) | +7.3 | +3.1 |
| Cell resistance (%) | +85 | +37 |

The results demonstrate that carbon-deposited cathode material of the present invention used as a coating for oxides cathode benefit of very low content of sulfur impurities, to maintain excellent performances at high temperature and reduced gas generation. Similar storage trial with pouch cells using LiNPO$_2$F$_2$ (product of Foosung Co., 10 mol % of LiPF$_6$ content) instead of LiFSI as electrolyte additives confirms benefit of very low content of sulfur impurities.

Example 7

High molecular weight polynaphthalenesulfonate sodium salt (DAXAD® 19, product of GEO® Specialty Chemicals, Inc.) is used to prepared sulfonyl chloride intermediate followed by reaction with CF$_3$SO$_2$NH$_2$ (as disclosed generally in US 2002/0009650 A1) to obtained high molecular weight polynaphthalenesulfonyl(trifluoromethanesulfonyl) imide lithium salt (PNSTFSLi) with a purity of +99.8%. As commonly used in cement industry, DAXAD® polymers and equivalent are a cost-effective solution to produce polyelectrolytes including a —SO$_2$NSO$_2$CF$_3$ delocalized anion. Polyelectrolytes can also be obtained by reaction of formaldehyde with 2-naphtalenesulfonyl(trifluoromethane-sulfonyl)imide (prepared by reaction of commercial 2-naphtalenesulfonyl with CF$_3$SO$_2$NH$_2$)

All the manipulations are carried out in a glove box under an inert and anhydrous atmosphere. 36.7 g of a terpolymer based on ethylene oxide, methyl-glycidyl ether and allylglycidyl ether and 6.2 g of bis(trifluoromethanesulfonimide) lithium salt are added to 164 ml of acetonitrile. The salt and terpolymer concentration are adjusted so as to give an oxygen over lithium molar ratio (O/Li) of 40/1. To 20 ml of this mother solution, 0.9 ml of a solution obtained by dissolving 4.5 g of bis(trifluoromethanesulfonimide) lithium salt in 20 ml of commercial polyoxyethylene glycol diacrylate of molecular weight 700 (available from Aldrich) is added. The mixture of these two solutions is then stirred at room temperature for about 3 hours, PNSTFSLi (10% by weight of polymer), AEROSIL® R 812 fumed hydrophobic silica (1.5% by weight of polymer), and benzoyl peroxide (2% by weight of polymer) are added and the solution is again stirred for about 1 hour. After being coated as a film on a polypropylene film, the material is heated under an inert atmosphere at 85° C. for 24 hours to produce polymer electrolyte with a thickness of 12 μm.

Lithium metal polymer batteries (LMP) are made using a negative electrode of metallic lithium 15 μm thick, laminated on a current collector of 8 μm nickel. The electrolyte consists of previously disclosed polymer electrolyte membrane. The positive electrode contains a mixture of C—LiFePO$_4$ cathode material, LITX® 200 (product of Cabot Corporation) and a terpolymer containing bis(trifluoromethane-sulfonimide) lithium salt in a molar ratio O/Li=30 (49/3/48% by volume), said positive electrode having a capacity of 6 C/cm$^2$. The composite material is solvent coated on an 8 μm aluminum current collector. The lithium metal polymer battery is assembled by hot pressing at 80° C. under a vacuum.

Lithium metal polymer batteries are prepared using C—LiFePO$_4$ sample similar to material D1 of example 3 with characteristics as disclosed in table 13.

TABLE 13

| Samples | LFP1 | LFP2 |
|---|---|---|
| Nanomilled median primary particle size (nm) | 134 | 138 |
| C—LiFePO$_4$ D$_{50}$ (μm) | 11.7 | 12.8 |
| C—LiFePO$_4$ sulfur content (ppm) | 397 | 51 |
| C-deposit wt. % | 1.14 | 1.02 |
| Conductivity (S · cm$^{-1}$) | 0.081 | 0.12 |
| BET | 9.9 | 9.3 |
| Battery | LMP1 | LMP2 |
| Capacity (mg/cm$^2$) | 4.6 | 4.6 |
| Porosity (%) | 8 | 2 |
| Zeta potential (mV) | −35 | −13 |

The results demonstrate that carbon-deposited cathode material of the present invention with very low sulfur content of sulfur impurities also benefit performances of lithium metal batteries. Especially, lower zeta potential allows production of low porosity cathode material, moreover high electronic conductivity allows to reduce the quantity of electronic conductive additives, and lower battery resistance.

The invention claimed is:

1. A carbon deposited alkali metal oxyanion particulate composition characterized in that:
    carbon deposit is obtained by at least one thermal chemical vapor deposition process with a gas-phase carbon source, and wherein carbon deposit is in the form of graphene carbon deposit with 1 to 8 layers of said graphene carbon deposit; and
    sulfur impurities content of said carbon deposited alkali metal oxyanion is less than 80 ppm, based on total weight of carbon deposited alkali metal oxyanion.

2. The carbon deposited alkali metal oxyanion according to claim 1, wherein alkali metal oxyanion median primary particle size is less than 500 nm.

3. The carbon deposited alkali metal oxyanion according to claim 1, wherein alkali metal oxyanion median primary particle size is between 25 and 250 nm.

4. The carbon deposited alkali metal oxyanion according to claim 3, wherein carbon deposited alkali metal oxyanion is in the form of carbon deposited spherical secondary agglomerates of alkali metal oxyanion primary particles.

5. The carbon deposited alkali metal oxyanion according to claim 4, wherein porosity of secondary agglomerates is between 5 and 40%.

6. The carbon deposited alkali metal oxyanion according to claim 4, wherein BET of secondary agglomerates is comprised between 3 and 13 m$^2$/g.

7. The carbon deposited alkali metal oxyanion according to claim 4, wherein BET of secondary agglomerates is <13 m$^2$/g.

8. The carbon deposited alkali metal oxyanion according to claim 4, wherein D$_{50}$ of secondary agglomerates is ≤9 μm.

9. The carbon deposited alkali metal oxyanion according to claim 4, wherein secondary agglomerates press density is comprised between 2.4 and 3 g/cm$^3$.

10. The carbon deposited alkali metal oxyanion according to claim 1, wherein water content of said carbon deposited alkali metal oxyanion is less than 200 ppm, based on total weight of carbon deposited alkali metal oxyanion.

11. The carbon deposited alkali metal oxyanion according to claim 10, wherein water content is less than 100 ppm, based on total weight of carbon deposited alkali metal oxyanion.

12. The carbon deposited alkali metal oxyanion according to claim 11, wherein content of magnetic impurities of said carbon deposited alkali metal oxyanion is less than 300 ppb, based on total weight of carbon deposited alkali metal oxyanion.

13. The carbon deposited alkali metal oxyanion according to claim 1, wherein conductivity of said carbon deposited alkali metal oxyanion is more than $5.10^{-2}$ S.cm$^{-1}$.

14. The carbon deposited alkali metal oxyanion according to claim 1, wherein carbon deposit is composed of at least 99.95 wt. % of carbon, based on total weight of carbon deposit.

15. The carbon deposited alkali metal oxyanion according to claim 1, wherein carbon deposit content of said carbon deposited alkali metal oxyanion is less than 2.0 wt. %, based on total weight of carbon deposited alkali metal oxyanion.

16. The carbon deposited alkali metal oxyanion according to claim 1, wherein carbon deposit content of said carbon deposited alkali metal oxyanion is between 0.2 and 1.2 wt. %, based on total weight of carbon deposited alkali metal oxyanion.

17. The carbon deposited alkali metal oxyanion according to claim 1, wherein thickness of carbon deposit is between 0.3 and 3.7 nm.

18. The carbon deposited alkali metal oxyanion according to claim 1, wherein carbon deposit is in the form of graphene deposit with 2 to 5 layers of said graphene carbon deposit.

19. A carbon deposited alkali metal oxyanion particulate composition characterized in that:
   carbon deposit is obtained by a thermal chemical vapor deposition process with a gas-phase carbon source, and wherein carbon deposit content of said carbon deposited alkali metal oxyanion is less than 1.2 wt. % based on total weight of carbon deposited alkali metal oxyanion; and
   dimensionless ratio of sulfur impurities content relatively to carbon deposit content of said carbon deposited alkali metal oxyanion, both expressed in ppm based on total weight of carbon deposited alkali metal oxyanion, is less than 0.8%.

20. Carbon deposited alkali metal oxyanion according to claim 19, wherein carbon deposit is in the form of a continuous, adherent, and uniform deposit.

* * * * *